US009928559B2

(12) United States Patent
Lahmi et al.

(10) Patent No.: US 9,928,559 B2
(45) Date of Patent: Mar. 27, 2018

(54) METHOD FOR WATERMARKING THE TEXT PORTION OF A DOCUMENT

(71) Applicant: SEND ONLY OKED DOCUMENTS (SOOD), Neuilly sur Seine (FR)

(72) Inventors: Paul Lahmi, Paris (FR); Patrice Denis, Saint Medard d'Aunis (FR); Yan Diacono, Puteaux (FR); Jean-Marc Ogier, Chatelaillon Plage (FR)

(73) Assignee: SEND ONLY OKED DOCUMENTS (SOOD) (FR)

( * ) Notice: Subject to any disclaimer, the term of this patent is extended or adjusted under 35 U.S.C. 154(b) by 0 days.

(21) Appl. No.: 14/776,912

(22) PCT Filed: Mar. 14, 2014

(86) PCT No.: PCT/IB2014/000356
§ 371 (c)(1),
(2) Date: Sep. 15, 2015

(87) PCT Pub. No.: WO2014/140770
PCT Pub. Date: Sep. 18, 2014

(65) Prior Publication Data
US 2016/0035060 A1    Feb. 4, 2016

(30) Foreign Application Priority Data

Mar. 15, 2013 (FR) .................................. 13 52330

(51) Int. Cl.
G06F 17/00 (2006.01)
G06T 1/00 (2006.01)
(52) U.S. Cl.
CPC .... G06T 1/0028 (2013.01); *G06T 2201/0051* (2013.01); *G06T 2201/0062* (2013.01);
(Continued)

(58) Field of Classification Search
CPC .......................... G06F 17/211; G06K 2209/01
(Continued)

(56) References Cited

U.S. PATENT DOCUMENTS 5,936,636 A * 8/1999 Gelfenbain ........... G06F 17/214
345/467
2003/0118211 A1  6/2003 Eguchi et al.
(Continued)

FOREIGN PATENT DOCUMENTS

EP    1953752    8/2008
EP    2402885    1/2012

OTHER PUBLICATIONS

Jack T Brassil et al: "Copyright Protection for the Electronic Distribution of Text Documents", Proceedings of the IEEE, IEEE. New York, US, vol. 87, No. 7, Jul. 1, 1999 (Jul. 1, 1999), XP011044225, ISSN: 0018-9219.
(Continued)

Primary Examiner — Jamara Franklin
(74) Attorney, Agent, or Firm — The Belles Group, P.C.

(57) ABSTRACT

A method for watermarking a document containing at least one text portion comprising the following steps: —determining a specific character font comprising, for at least one character, an original graphic and at least one variation, each of the variations being associated with a different value, said character being termed encodable characters; —using the specific character font to encode an item of information in the text portion of the document, by replacing at least one original graphic with a variation, the original graphic and the variation or variations being identified as a single character by a first optical character recognition process referred to as standard OCR and identified as a plurality of characters by a second optical character recognition process referred to as specific OCR that is capable of determining if the represented character is the original graphic or one of the varia-
(Continued)

tions of same and, if so, making it possible to determine the variation that is represented, a strict order relationship being defined on the encodable characters in order to establish the order in which the encodable characters are to be processed during the decoding phase.

38 Claims, 22 Drawing Sheets

(52) U.S. Cl.
CPC ............... *H04N 2201/3281* (2013.01); *H04N 2201/3284* (2013.01)

(58) Field of Classification Search
USPC ......... 235/375, 494; 358/1.11; 382/181, 182
See application file for complete search history.

(56) References Cited

U.S. PATENT DOCUMENTS

2006/0075241 A1    4/2006  Deguillaume et al.
2009/0136082 A1    5/2009  Zandifar et al.

OTHER PUBLICATIONS

International Search Report for PCT/IB2014/000356 dated Apr. 23, 2014. WO.

\* cited by examiner

Encoding process

Decoding process not associated with a "marking" on a "material document" or an "electronic image document"

Process associated with a "marking" on a "material document" or an "electronic image document"

Decoding process not associated with a marking for a "descriptive electronic document"

Decoding process associated with a "marking" for a "descriptive electronic document"

| Uncoded original character | Character coding 0 (variant 1) | Character coding 1 (variant 2) | Character coding 2 (variant 3) | Character coding 3 (variant 4) |
|---|---|---|---|---|
| a | a | a | a | a |
| b | b | b | b | b |
| e | e | e | e | e |
| 4 | 4 | 4 | 4 | 4 |

FIG. 3

Example of encoding on selection of characters

| Character variant 1 | Character variant 2 | Associated binary code | Base 16 | Base 15 | Base 14 | Base 13 | Base 10 |
|---|---|---|---|---|---|---|---|
| 1 | 1 | 0,0,0,0 | 0 | Not used | Not used | Not used | Not used |
| 1 | 2 | 0,0,0,1 | 1 | 0 | Not used | Not used | Not used |
| 1 | 3 | 0,0,1,0 | 2 | 1 | 0 | 0 | Not used |
| 1 | 4 | 0,0,1,1 | 3 | 2 | 1 | 1 | Not used |
| 2 | 1 | 0,1,0,0 | 4 | 3 | 2 | 2 | 0 |
| 2 | 2 | 0,1,0,1 | 5 | 4 | 3 | 3 | 1 |
| 2 | 3 | 0,1,1,0 | 6 | 5 | 4 | 4 | 2 |
| 2 | 4 | 0,1,1,1 | 7 | 6 | 5 | 5 | 3 |
| 3 | 1 | 1,0,0,0 | 8 | 7 | 6 | Not used | 4 |
| 3 | 2 | 1,0,0,1 | 9 | 8 | 7 | 6 | 5 |
| 3 | 3 | 1,0,1,0 | 10 | 9 | 8 | 7 | 6 |
| 3 | 4 | 1,0,1,1 | 11 | 10 | 9 | 8 | 7 |
| 4 | 1 | 1,1,0,0 | 12 | 11 | 10 | 9 | 8 |
| 4 | 2 | 1,1,0,1 | 13 | 12 | 11 | 10 | 9 |
| 4 | 3 | 1,1,1,0 | 14 | 13 | 12 | 11 | Not used |
| 4 | 4 | 1,1,1,1 | 15 | 14 | 13 | 12 | Not used |

FIG. 4
General principle of encoding

Principle of encoding a unitary message with simple structure

Principle of encoding a unitary message with simple structure and CRC

Principle of encoding a unitary message with simple structure and fixed usable length Principle of encoding a unitary message with fixed useful length and CRC Principle of encoding unitary messages including different sub-sequences with a simple structure Principle of encoding unitary messages including different sub-sequences with a simple structure and CRC

FIG. 7

Spatial disposition of encoding sub-sequences

SS1: Occurrence of first encoding sub-sequence

SS2: Occurrence of second encoding sub-sequence

SS3: Occurrence of third encoding sub-sequence

Lorem ipsum dolor sit amet, consectetuer adipiscing elit. Maecenas porttitor congue massa. Fusce posuere, magna sed pulvinar ultricies, purus lectus malesuada libero, sit amet commodo magna eros quis urna. Nunc viverra imperdiet enim. Fusce est. Vivamus a tellus. Pellentesque habitant morbi tristique senectus et netus et malesuada fames ac turpis egestas. Proin pharetra nonummy pede. Vivamus a mi. Morbi neque. Aliquam erat volutpat. Integer ultrices lobortis eros.

FIG. 8

Photographic zones self-sufficient
for detecting a complete set of encoding sub-sequences Video scaling zones self-sufficient for detecting a complete set of encoding sub-sequences Definitions of elementary radicals or zones enabling complementary encodings Prior art relating to RAD/LAD and OCR technologies Principle of additive colour synthesis as used in display devices Principle of subtractive colour synthesis as used in printing devices Kinetic components Binary image, information pixel 0 or 1

4-connexity: there are 5 distinct 4-connex components 8-connexity: there is only one 8-connex component

FIG. 15

Ordering of characters

15 A- Before processing

Ceci est un texte d'exemple dans lequel on peut trouver des exemples d'ordonnancement problématiques.

☐ Box enclosing a character
⋯ Unitary line

15 B- After processing

Ceci est un texte d'exemple dans lequel on peut trouver des exemples d'ordonnancement problématiques.

METHOD FOR WATERMARKING THE TEXT PORTION OF A DOCUMENT

The invention concerns on the one hand a method of encoding computer type information superimposed on the text portion of a document and on the other hand the corresponding decoding method. This encoding and decoding is particularly suitable for managing the authentication of a document and for securing any process of reproduction of this document, the information superimposed in this way on the text being in particular able to serve as "rules" for reproduction of said document. This technology is particularly relevant to rendering permanent any transfer of information linked to a document when the latter is flashed, i.e. photographed or videoed, by a portable device such as a smartphone (intelligent telephone) or digital tablet.

There exist at present various digital watermarking technologies for inserting computer type data into a document. As a general rule, these techniques utilize document portions rich in information such as images or if the document is insufficiently rich necessitate the superimposition of a frame for supporting the watermark. Indeed, in the case of a color image, each pixel is RGB (red, green, blue) coded with a coding level for each of these colors having a value from 0 to 255, which allows effective encoding subject to elementary variations at each of these points. The insertion of a simple or 2D bar code can also be substituted for this watermarking.

In the case of the text portion of a document, each elementary point is originally either black and represents the form or white and represents the ground. Although it is possible to assign each point of such a text portion a gray level value from 0 to 255, that value is somewhat unreliable because it does not result from real coding but from a measurement itself depending on the printing quality and the method of acquisition, which is generally digitization. The difficulty of separating the "added" information and the inherent digitization and/or printing noise are therefore obstacles to this type of strategy.

There therefore exists a requirement for a solution that enables the watermarking of such documents without degrading their esthetics, the watermarked document being virtually identical visually to the same non-watermarked document.

Such a solution enabling the watermarking of a text portion should be simple to implement and necessitate very little computing power. This would make it possible to insert the watermarking phase into a process of producing a large number of documents without slowing it down. This may be the case for batch production by a service (telephone, electricity, etc.) provider linked to customer invoices.

In order to better define the field of use of our invention, we summarize some basic concepts referred to in previous patents. Indeed the watermarking proposed for the present invention is particularly suited to the application of these patents.

Reference may be made in particular to FR2732532 which introduces the concept of "sensitive documents", i.e. a set of documents reproduction of which is not free as opposed to "classic documents" the reproduction of which is not subject to constraints or restrictions.

Our work has enabled us to define a more sophisticated way of transmitting documents with authentication. "Authenticated documents" represent one of the four categories of "sensitive documents" listed in FR2732532. The "author documents" also listed in FR2732532 are also relevant in the context of the present invention since adding a watermark specific to each copy converts the latter into a "authenticatable copy". The speed of the proposed encoding is also effective for defining "rules" in the context of "confidential documents" also listed with the additional advantage that the latter are difficult for a malicious user to neutralize.

We summarize hereinafter a number of definitions from the above patents that will be usable in certain aspects of the disclosure of our invention.

We should first define the various types of documents on which our invention impacts, and in particular we can make a first distinction by considering the media used to make it possible to distinguish "material documents" and "immaterial documents".

A "material document" is a document in its form printed on a medium similar to paper by any existing or future technical means such as, non-limitingly, offset printing and/or printing by a printer controlled by an information system possibly completed by additional elements such as handwritten elements and any combinations of these means. The medium could be standard paper or any other medium that can be printed in this way in order to obtain a physical document. The format has no impact on this definition: an A4 or A3 format document (standard format in Europe), letter format document (standard format in America) and any other standard or non-standard format, single-sided or double-sided or made up of a plurality of sheets or even a book remains a "paper document" including if the medium has nothing to do with paper: synthetic material, metallic material or material made of any substance.

Unlike a "material document", an "electronic document" is an "immaterial document". It can take a number of forms.

An "electronic document" may be in the form of a computer file in a format that can be displayed directly such as the PDF format and such that printing this document produces a "material document" visually identical to this document when it is displayed on a computer type screen. In a non-limiting way this screen can be the screen associated with or controlled by a desktop or laptop computer or tablet or any other screen managed by a computer intelligence such as the screens of smartphones (intelligent telephones). The format of this type of file is important for the remainder of the description of the patent, and it is therefore necessary to distinguish two types of "electronic document" formats, and this format can also qualify other "electronic documents", namely "image electronic documents" and "descriptive electronic documents".

The file format of "image electronic documents" emphasizes the viewing of the document and lists all the elementary constituents of this document linked to the display of the document, for example the definition of a certain number of pixels or any set of graphical elements enabling reconstitution of the image of the document with a view to displaying it on a screen or printing it. In this case, the "unitary characters" are not identifiable by a direct analysis of the file but could be detected by OCR (optical character recognition) technologies applied to the complete image of a page or to a portion thereof. As a general rule, we will consider as "image electronic documents" any electronic document where the characters cannot be determined by a direct analysis of the content of the file but must be retrieved indirectly from images that this document makes it possible to reconstitute. For example, documents in the Tiff or JPEG format are as a general rule "image electronic documents".

The file format of "descriptive electronic documents" emphasizes the identification of the components of the document and the positioning of each of its components in the pages of the document. As a general rule, we will consider as "descriptive electronic documents" any documents the format of which makes it possible to identify the "unitary characters" that constitute it without having to reconstitute the image thereof or the images that it materializes in the event of printing or display. For example, documents in WORD format (.doc, .docx . . . ), EXCEL format (.xls, .xlsx . . . ) or PDF format are as a general rule "descriptive electronic documents" when they result from a computer process. There nevertheless exist certain cases in which these same documents are "image electronic documents", in particular when these documents are the result of a digitization operation or incorporate external resources.

In some cases, "descriptive electronic documents" take the form of a declarative type file, such as an XML file, for example, which in this case includes a certain number of items of data and formatting instructions. These elements may be defined either explicitly in the file or implicitly via calling on external data systems and the use of appropriate algorithms. By extrapolation, a document may be limited to a collection of information on condition that a computer intelligence is capable of using appropriate algorithms to produce either an "electronic document" that is displayable as defined above or a "material document" as defined above by adding to this data complementary data and/or defined formatting operations managed by this computer intelligence and/or by one or more third party information systems relating thereto.

A document displayed on a computer screen is both similar to a "material" document when it is associated with its screen medium and an "electronic document" when it is associated with a computer type file or the like as defined above. A document displayed on any type of screen is therefore a "material document" when it is for example photographed or videoed by a device such as a smartphone, for example. It is on the other hand considered as an "electronic document" when the user viewing it decides to save it or to transmit it via an information system.

A "conceptual document" is all of the information necessary for obtaining an "electronic document" and/or a "material document". A "conceptual document" is materialized by a set of computer data, whether the latter is stored on the same physical file, the same database or a plurality of these elements is divided across a set of storage units distributed across different computer media such as one or more computer files or the like and/or databases or the like themselves present on one or more information systems. This data may be integrated into a computer object such as an XML file, for example. This data may integrate formatting definition elements. In this case formatting consists in the definition of the presentation of the data when the latter is integrated into an "electronic document" and/or a "material document".

In the context of the invention an "exploitable document" is a document to which the decoding steps of the invention can be applied. These steps are of a kind executed by a computer; they necessitate the recognition of graphical elements and/or graphical characteristics. This document will be in an "electronic document" form enabling such recognition. If the document to be processed is a "material document", an "exploitable document" will therefore be obtained by a digitization phase, either through use of a scanner or by taking a photograph or an equivalent operation. The format of the "electronic document" obtained must allow the decoding phases by graphical analysis of the result of digitization. If the document to be processed is already an "electronic document", this document is an "exploitable document" if the explicit decoding phases of the present invention can where applicable detect therein the "marks" and/or the "rules" present or, generally speaking, any encoding portion intended to be decoded.

The above definitions are complemented by general technical definitions:

A "requesting unit" is an entity that takes the decision to encode a "conceptual document". The "requesting unit" may be human, i.e. a user or any person or group of persons having defined a requirement for encoding compatible with the present invention applied to a document for a particular functional aim. The "requesting unit" may equally be any computer or other process which during the process of creating a "material document" and/or an "electronic document" necessitates encoding compatible with the present invention.

The "rules" element when it is inserted in a "sensitive document" enables the reproduction system to identify the reproduction rules and restrictions associated with this document subject to reproduction, this definition resulting from my previous patents. This information may include not only referencing information for reaching previously stored information associated with the document subjected to reproduction. In this case, the "rules" may equally be defined in a manner complementary to the other referencing elements classically inserted into the document in the form of one-dimensional or two-dimensional bar codes, for example, or even data inserted in a visually exploitable form such as a contract number. Any computer type information, i.e. any information that can be processed by a computer type algorithm in order to enable this algorithm to respond to a request for reproduction of a "sensitive document" in order to manage the methods and the restrictions of such reproduction, is referred to hereinafter by the term "rules". These "rules" are graphically defined on a "material document". For an "electronic document", they are defined freely on condition that any "material document" obtained from this medium can integrate "rules" defined graphically either via a standard printing process or via a specific printing process ensuring the transposition of the rules of the electronic document into rules in the printed document, whether these two occurrences are identical or not.

The "mark" element when it is inserted in a "sensitive document" enables a reproduction system incorporating appropriate technology to detect the "sensitive" nature of the document subject to reproduction independently of the decoding of the "rules", this definition resulting from my previous patents. In the case of a "material document", the "marks" are graphical elements integrated into the general graphics of the document and that can be detected by a phase of digitization of this document and by direct searching in the result of this digitization. The digitization of a "paper document" consists of modeling a document as a set of points or the like with particular attributes for each of them such as color attributes. The result of this digitization makes it possible to transform this "material document" into an "image electronic document" that may be subjected to appropriate computer processing such as for example the possibility of displaying this document on a computer type screen. There exist at present numerous methods for modeling a "material document" after digitization, and the following formats may be cited in a non-limiting manner: TIFF, JPEG, PDF. In the case of an "electronic document", the "mark" may be integrated as a specific attribute such as for example the definition of a computer value stored in the body of the "electronic document" or in a dedicated area. It may equally correspond to elementary modifications of the content of the document proper which in this case could correspond to the "mark" of the material document obtained by direct printing of the "electronic document".

A "LAD/RAD system" (LAD: automatic document reading, RAD: automatic document recognition) is mainly applied to the result of digitization of a "material document" and consists in recognizing or identifying its structure possibly by identification of the form used. Various techniques exist for RAD or generally LAD; our invention being able to implement this type of technology, we summarize this prior art hereinafter before disclosing our invention.

"OCR" (optical character recognition). Various techniques exist. Our invention implementing this type of technology, we summarize this prior art hereinafter before disclosing our invention.

Here we propose to outline the prior art concerning image interpretation in the context of the application to automatic document reading (LAD/RAD) and optical character recognition (OCR):

The following definition of the prior art refers to FIG. 11.

The interpretation of digital images in the broad sense is generally based on chaining appropriate operators, aiming to reconstruct high-level semantic information from the pixels resulting from the acquisition process. The forms of processing most widely used can most often be broken down into layers depending on the level of abstraction concerned. The number of levels may be more or less variable, depending on the authors, but it is nevertheless possible to disengage relatively stable invariants that are characteristic of a classical analysis system.

These invariants can be integrated into highly varied strategies, depending on the priorities defined by the development teams. Two major categories of methodologies are therefore found in the literature and on the "classic" market.

Firstly, there are bottom up approaches, the principle of which is to start from the pixel and to go to the object, progressively grouping together in accordance with homogeneity or connection criteria the pixel information of the image to construct high-level semantic objects (example: pixel→character→word→line→paragraph→page, in the case of a simple printed text page).

There also are contrary approaches, top down approaches, the principle of which is to apply homogeneity and connection criteria to progressively break down the image of the document into elements of ever simpler nature, to arrive at the elementary components of the page.

Other, more original approaches rely on so-called "heterarchic" or "cyclic" mechanisms consisting in alternating these different approaches as a function of intentions or consistency or recognition quality criteria.

These major method categories all rely on elementary processing components the outlines of which are described hereinafter. FIG. 11 is a block diagram summarizing these major steps of a bottom up approach. In accordance with a relatively "classic" scheme, it is therefore possible to distinguish the low-level operators aiming to filter/restore the image. They consist in identifying the nature of the deterioration and its parameters in order to improve the quality of the image in respect of subsequent processing. Depending on the objective, different classes of processing may be integrated at this level. Among these it is possible to cite contrast enhancement techniques. These tools generally consist in redeploying the histogram of the image over an optimum analysis range when the images are of relatively low information content, generally because of the acquisition conditions. This type of situation is encountered when scenes are underexposed or the sensor does not supply information with sufficient discrimination for the remainder of the operations. Filtering techniques also come into this processing category. They aim to eliminate the disturbances introduced during acquisition/digitization of the image. Different kinds of noise are encountered (additive, multiplicative, impulse, etc.) and the methodologies used are generally adapted accordingly. Their aim may also be to "binarize" the image if the designer of the analysis system does not wish to use the binarization "black box" supplied with the sensor, generally a scanner. Indeed, although the binarization algorithms supplied with the acquisition devices have seen real progress through integrating the dynamic of the histogram, they remain relatively unsuitable if the image includes local characteristics that cannot be analyzed by these global techniques. In particular these global binarization tools raise problems for the segmentation of locally dense documents, such as certain cards, envelopes, newspapers or forms. The major problem arising from these techniques is the segmentation of the characters, which if the binarization process is poorly executed may be joined to one another or to elements that are not part of the text layer. This step can prove decisive for the remainder of the operations because the management of the text information connected to other elements is a very delicate processing phase. Finally, also encountered at this processing level are restoration tools aiming to eliminate noise and/or fuzziness from the image, such deterioration generally being introduced by the acquisition device and conditions. Generally speaking, most techniques used at this level aim to be "blind or semi-blind", i.e. entailing minimum introduction of a priori knowledge. Such is the entire problematic of the inverse problems.

These processing operations precede an information segmentation phase aiming to separate the information aspect from the background of the image.

Complementing the methods referred to above there is then a raft of processes for extracting elementary information from the image, with a view to starting the information structuring phase. In document analysis, these segmentation techniques generally rely on data relating to knowledge of the properties of the information looked for. This data may concern attributes inherent to the objects looked for, such as geometrical characteristics of the shapes to be recognized: size of forms, areas, etc. Connex component extractors are then used to separate the information layers.

As a general rule, there is then encountered a set of processing operations the aim of which is to extract primitives for recognition. Depending on the context, the techniques used can either be rendered operational directly on the forms to be recognized or necessitate a segmentation phase beforehand (the term segmentation is also employed here, even though it is not an operation of the same type, because here it is a question of breaking the usable information down into "elementary particles" that are simple to recognize).

In the case of printed documents, the text information may simply be segmented, the characters naturally being separated from one another during printing. Simply extracting the connex components from the document is sufficient to extract the characters. In cases of this kind, the primitive extraction techniques are applied directly to the forms materialized by the connex components.

In other cases, such as the recognition of handwritten cursive script, for example, the problem of extraction of primitives for recognition is more delicate because the forms to be recognized are connected to one another. The techniques generally applied then aim to "chop" the information into "pieces" (form-form segmentation operation) and to feed the recognition device with the "pieces" resulting from segmentation. Depending on the nature of the problem analyzed, the pieces could be letters, groups of letters or portions of letters generally referred to as graphemes (this term will be used with this meaning in the remainder of the patent). Although the cursive characters resulting from handwriting are not potentially bearers of information in the sense of our invention, their recognition in a document that includes encoding in accordance with our invention makes it possible for example to identify annotations added to a "sensitive document" and to be able to associate them with appropriate processing.

During these processing phases, these steps preceding recognition are generally combined with phases of extraction of information on the objects to be recognized. In the case of unconnected characters, for example, the tools for extraction of connex components previously mentioned therefore make it possible to extract a lot of information usable for recognition (center of gravity, eccentricity, etc.).

In the case of cursive handwriting, the segmentation phase can make it possible to proceed to coding of the analyzed information for subsequent recognition steps. For example, in handwriting, the graphemes extracted will be matched with graphemes stored in databases (examples of graphemes: a stem or stroke of a letter, a loop, etc.) and their sequential chaining may be stored (example: a stem followed by a loop may constitute an index for recognition of the handwritten letter "k"). This sequential chaining is generally used in subsequent processing phases in probabilistic mechanisms, for example (example of sequential chaining: in the case of recognition of checks, the probability of having the word "fifty" before the word "hundred" is zero: if the recognition process tends to take this type of decision, information on these transition probabilities can then be used to reject the information).

Depending on the context concerned, there may follow a method of characterization of the forms before recognition. These characterization methods aim to represent the image of the forms to be recognized in a stable space facilitating recognition. Some approaches use the image directly to represent the forms, but these approaches generally suffer from the problem of stability, and often run into difficulties as soon as it is necessary to process problems of invariance of scale or orientation.

The techniques used to characterize the forms are generally "structural" or "statistical". The structural approaches attempt to represent the forms via structural information of the form, such as the number of line ends, the number of nodes of the skeleton, or the number of concavities, etc. The structural information may also in some cases concern the topological relations that may exist between elementary primitives constituting the forms. As appropriate, information bases are then constituted representing the forms to be recognized in "characteristics vectors" form and the recognition phase then amounts to seeking in the base that which most closely approximates an unknown form. In other cases, the forms to be recognized could be described by states in a graph and probabilistic or syntactic mechanisms then make it possible to proceed to recognition.

The statistical approaches also aim to represent the forms in another, stable space enabling recognition to follow. The techniques generally used may rely on more or less sophisticated mathematical tools to represent the forms (frequency-based representation, representation by geometrical moments, by invariants, etc.). In this type of situation, the output from this step is generally a description of the forms by descriptors vectors that can be used for recognition.

The step following this characterization phase is generally a recognition phase that depends on how the form has been characterized. If the forms to be recognized are described in structural form, a syntactic analysis or a structural analysis can make it possible to proceed through recognition (in simplified terms, a syntactic analysis may be compared to the analysis of the structure of a phrase that is correct or not depending on how the words are strung together).

Depending on the nature of the problem, probabilistic methods could equally be used here to proceed to recognition.

If the forms are described by vectors coming from mathematical transforms—statistical approaches—the recognition problematic then consists in comparing the vectors representing unknown forms with those representing forms known a priori. It is then a question of measuring resemblances between characteristics vectors in n-dimensional spaces (n corresponding to the number of characteristics retained to represent a form). The decision is then generally based on criteria of the distance between the forms to be recognized and the unknown forms to make a decision. The techniques used may then rely on highly varied mechanisms, such as probabilistic classification, connection-based (neuronal) approaches, fuzzy methods, etc., or a combination/merging of these approaches. The current reference methods in the matter of recognition are generally support vector machines (SVM) and connection-based techniques on the basis of recurrent neural networks.

This technology for identification of an unknown form to associate it with a known value by a statistical analysis of a characteristics vector is referred to as "statistical classification" hereinafter and when OCR uses such a recognition method to recognize an unknown character to identify it against known characters it is referred to as "OCR using a statistical classification method" hereinafter.

Depending on the methodology employed, the output from these techniques may be the "class" of the recognized object, possibly associated with a confidence or probability linked to the decision.

It goes without saying that in these recognition mechanisms preliminary steps are necessary for the system to "learn" to recognize the forms to be analyzed. The learning methods are also highly variable depending on the recognition technique adopted.

Where statistical recognition methods are concerned, the approaches are very often referred to as "supervised" and consist in bringing to the input of the recognition device a large base of labeled samples representative of the problem and calibrating the recognition system using these samples.

For example, in character recognition, a labeled character base could be used (for which the response that the recognition system should produce is known). These bases are generally very large because they condition the subsequent processing. The size of these bases is directly proportional to the size of the vectors representing the forms (to alleviate a problem referred to as the dimensionality curse).

Where the structural recognition methods are concerned, the approach is somewhat the same and consists in bringing to the system bases of elements known a priori.

Note here that, depending on the recognition device concerned, the systems will or will not be in a position to proceed to "incremental" qualified learning, enabling the system to learn dynamically new samples or to correct errors that it may have committed that would be detected by the user. In many systems, the learning is non-incremental and is based on an upstream learning phase that is not challenged thereafter.

The problem with the interfaces is multi-faceted according to whether it is the man-machine interface that is considered or the interfaces between the processes involved in the chain.

In the case of the man-machine interface, the aim will be to enhance the ergonomics of the device for the correction and learning phases, either through phases dedicated to correction or via interactive corrections.

In the case of interfaces between processes, the aim will be to define the most generic possible formalisms in standard formats (for example XML) to guarantee the greatest flexibility and the interchangeability of the software components involved in the chain.

This "interface" aspect is essential when considering systems having incremental learning capabilities because the human operator interferes with the device to assist it in the construction of its solution.

All these complex mechanisms are generally integrated into more or less dynamic systems that are based on numerous kinds of knowledge in very different categories.

Among these, knowledge in the field concerning the problematic analyzed and its specifics are generally buried in the code of the device, making evolution and adaptation of the system difficult. Innovative approaches aim to externalize this knowledge and to make it as independent as possible of the recognition device so that the latter is organized dynamically as a function of each application.

Other knowledge categories are implicitly used in such devices, such as the knowledge of an image processing expert, who has the know-how to chose an image processing operator as a function of the context and who knows how to set its parameters. Some approaches also attempt to externalize this knowledge so that the image processing part is self-adapting as a function of the context.

Depending on the context analyzed, numerous paths are therefore possible at each step of the chain. As indicated above, the implementation of a processing chain involves numerous types of knowledge that it is of fundamental importance to externalize to guarantee that the system is perennial, adaptable and evolvable. Indeed, as a function of the context encountered, the processing chain deployed and its parameters can be very varied.

The present invention enables the text portion of a document to be used to encode computer type information that can itself inter alia serve as "rules" as defined above. To facilitate the description of the invention, the following concepts are explained:

A "strict order relation" is a mathematical concept. In the present case, a "strict order relation" is defined when for two distinct elements of the same kind it is possible to associate an index such that:

if x is the first element, if y is the second element, if f is the function enabling association of an index (in our case a positive integer is sufficient, although any other type of data is compatible) such that f(x) is the index associated with x, if x is considered to precede y in the classification method adopted, then it is strictly true that f(x)<f(y) (i.e. f(x) is different from f(y)), this relation is transitive, i.e. if x precedes y and y precedes z according to the classification method adopted, then x precedes z, which translates at the level of the associated indices, if f(x)<f(y) and f(y)<f(z) then f(x)<f(z), the relation as we define it is mathematically a total strict order relation, i.e. two elements cannot have the same index if they are distinct.

For simplicity it will be considered hereinafter, unless otherwise stipulated, that the "strict order relations" that will be used to implement the invention correspond to continuous indexations starting from 1. That is to say, the first element identified is associated with 1, the second with 2 and so on using only integer numbers. It is obvious that any other numbering system that is not continuous and does not start from 1 or is not based on integer numbers is equally satisfactory for the implementation of our invention. It is therefore possible to use a form of indexation using relative numbers, decimal numbers or numbers of any kind such that the above definition is respected. Likewise, it is possible to use an n-tuplet, i.e. an element of the form (a1, a2, . . . , an). To create a "strict order relation" of a character in a document, therefore: a1 could identify the page, a2 the line, a3 the word and a4 the position within the word assuming that "strict order relations" can be defined for the pages, for the lines of a page, for the words of a line and then for the characters of a word. In this case a character associated with the n-tuplet (a1,a2,a3,a4) precedes the character associated with an n-tuplet (b1,b2,b3,b4) if a1<b1 or if (a1=b1 and a2<b2) or if ((a1=b1 and a2=b2) and a3<b3) or if ((a1=b1 and a2=b2 and a3=b3) and a4<b4).

A "unitary page" represents the equivalent of the recto side or the verso side of a "material document". The recto page or the verso page may be considered as not forming part of the "material document" if this page is blank, for example, or does not include any information that can be exploited. A "material document" of several pages will therefore include at most as many "unitary pages" as recto faces and verso faces. It is incumbent upon the designer of the original document or the person who will be responsible for incorporating the watermark that is the subject matter of our invention to define which recto and/or verso pages will be "unitary pages". On the "unitary pages" defined in this way, it is possible to define a "strict order relation" that enables page numbers to be defined. This concept is also applicable to "electronic documents" that also identify "unitary pages". These pages generally correspond to the "unitary pages" that will be obtained after printing, although this correspondence is optional. For some documents, the pagination concept does not exist, in which case these "electronic documents" will be considered to be constituted of one and only one "unitary page". Similarly, in some cases, it could be considered that a set of several pages as defined above constitutes the same document or the same sub-document and that, in this case, the encoding should not take account of the pagination, apart from the establishment of a strict order relation, if any. In this case the processes described in relation to the present invention will be applied globally to this document or sub-document in the same way as if it were constituted of a single page. The same recto page or the same verso page may equally be considered to contain a plurality of unitary pages, which must therefore be identifiable during the digitization phase by an appropriate algorithm.

A "unitary line" is a set of words and/or characters that are aligned within the same "unitary page", which means that if a "strict order relation" is defined for the "unitary lines" then:

if two characters belong to the same "unitary line", it is not possible to know which character precedes the other based only on this, if two characters belong to two distinct "unitary lines", it is possible to know which character precedes the other based only on this.

For a given language, or for a set of languages, a "font" is the collection of characters of the alphabet associated with that language or languages, according to a particular graphic defined by the creator of the "font". There are many fonts available at this time, especially since the popularization of word processing software. A non-limiting list could include the Arial, Times, Courier fonts. The use of some of these fonts is subject to author's rights. In the context of the invention, a "font" corresponds to any collection of characters determined independently of the invention or specifically for using the invention, depending or not on usage. A usual "font" could therefore correspond to the integration of characters from a plurality of "fonts" defined in the context of the invention and conversely a "font" defined in the context of the invention could correspond to the integration of characters from a plurality of the usual fonts. If a "font" defined in this way is made to correspond with characters coming from several "fonts", it does not necessarily incorporate all of the characters defined for that plurality of "fonts".

A "font style" represents a specific way of representing the "font". The most common "font style" is therefore the roman style (text in its current version). there also exist bold, italic and "bold italic"; this list is not limiting and some of these styles exist in several variations. Hereinafter it will be considered that a "font" is associated with a single "font style"; "Arial roman" characters therefore belong to a "font" distinct from that which incorporates the "Arial bold" characters. There are therefore as many Arial "fonts" as there are Arial "font styles".

A "font point size" is characteristic of the size of the characters of the corresponding "font". The "point size of a font" classically determines its size expressed in points (in typographic points, this concept coming from printing). For example, the characters of a "font" in 12-point are thicker than the same characters of the same "font" in 10-point (approximately 20% in terms of height and approximately 44% in terms of area).

The "resolution" indicates the precision with which a character is transcribed, primarily in the case of a "material document". Remember that a document displayed on a screen is also considered a "material document" and therefore integrates this concept of resolution. The resolution is generally defined globally for the "material document" but it is not technically impossible for the same document to integrate elements using different "resolutions". The "resolution" is often defined in "dpi" (dots per inch) or PPI (pixels per inch). Today, in the context of printing, resolutions of 300 to 600 dpi are common, and for work of quality a resolution of 1200 dpi may be used. Even more dense resolutions (beyond 1200 dpi) could be used in the future either exceptionally or routinely. The "resolution" can be defined differently according to the direction, and there can also be a horizontal resolution of 600 dpi and a vertical resolution of 300 dpi. On the other hand, for electronic type documents this resolution is associated with the format used: JPEG, TIFF, etc. and parameters associated with these formats that can impact on the quality of the document obtained. For "material document" type documents this quality is itself dependent on the printing technology (paper) or the display technology (screen). Hereinafter the term "resolution" will encompass this concept of precision (dpi/ppi) associated with the format used and/or production technologies (printing/display).

A "unitary character" is the graphical representation of a letter of the alphabet such as a, b, c, d, etc. The lowercase representation of a character (for example a) is a different character from its uppercase representation (A for example), and the lowercase characters and the uppercase characters can be integrated or not into the same "font" in the context of the invention. Likewise the various accented versions of the same letter are as many different "unitary characters", so that "é", "è", "ê" and "e" are four different characters. In the context of our invention when the encoding or decoding processing makes it possible not to take account of the accent, possibly through use of appropriate processing, these variants could be considered as one and the same character. In the Latin languages, some characters may exist in one specific Latin language and not in the other Latin languages. The characters used in the English language therefore do not incorporate accents in a native manner (excluding the dot on the i). The other European languages such as French, Spanish or German integrate a character set virtually identical to that of the English language but insert accents therein (é, è, à, ù, ñ, ö, etc.). In the context of the invention, a "font" could integrate the character variants of more than one language or be defined exclusively for one particular language. The solution could equally be applied to any alphabet including a predefined number of characters such as the Cyrillic alphabet, the Greek alphabet (using the letters of the ancient Greek alphabet such as α, β, etc.), Hebrew, Arabic and simplified Asiatic alphabets including a limited number of basic characters (same order of magnitude as the Latin alphabet). In the context of the solution, a "font" could integrate the characters of different alphabets including or not the integration of a plurality of languages associated with these alphabets or be defined specifically for an alphabet combined or not with the various languages associated with that alphabet. In the same way as for "unitary pages" and "unitary lines", there may be associated with the "unitary characters" a "strict order relation" for resolving the problem of ordering the two characters of the same "unitary line" previously stated.

A "grapheme" is a letter portion and is therefore defined in the context of the invention as a graphical constituent element of a character. The traditional Asiatic alphabets include a large number of characters (up to several thousand) or even an unlimited number (through the possibility of defining new ideograms). However, in this case, it is possible to define these characters by way of a combination of graphemes. Although more numerous than the characters of the Latin alphabet, there is a limited number of these graphemes. This usual technique for traditional Asiatic alphabets may in turn be used for the classic alphabets. It may therefore be considered, for example, that the set of characters from the Latin alphabet uses the same basis of common graphemes. In the various "fonts", the vertical bar of the "d" is the same as that of the "b" that both use the same loop (with a different orientation). Instead of integrating "unitary characters" in the standard way, in the context of our invention, a "font" could be considered as consisting of "graphemes" either exclusively or complementing or combined with "unitary characters" as defined above.

"Unitary encoding" includes the usable part to be decoded, by way of non-limiting example in the context of our invention, the value of "rules" associated with a "unitary page". Associated with this usable part, "unitary encoding" integrates anything else necessary for its exploitation such as, non-exhaustively, the following elements some of which are the subject of specific explanation in the context of the present invention:

a header or equivalent enabling to define the start of encoding to be defined, a termination or equivalent enabling to define the end of encoding to be defined, an index or equivalent enabling to identify an elementary section of an encoding comprising several of them to be identified, a hashing key determined from other elements of the encoding enabling validity to be verified in use; an elementary hashing function is defined for example by a checksum or bank account details; there exist hashing functions defining more sophisticated imprint calculations; the result of the hashing defined in this way may be integrated into the encoding in order to verify the validity of the latter during the decoding phase, encryption in order to prevent the message being decoded freely by non-approved entities.

The encoding proposed in the present invention is a solution perfectly adapted to the concept of "rules" already referred to because the encoding is of a graphical nature when the document is a "material document", and is inserted in the body of the document when it is an "electronic document" type document. Moreover a printed "electronic document" having our encoding is a "material document" integrating this same encoding without necessitating a particular printing process. Because in fact the "rules" of the "electronic document" defined in this way are automatically converted into "rules" of the "material document" produced. This does not exclude designing a printing process specific to the invention for converting an "electronic document" having the encoding of the invention into a "material document" also having the encoding of the invention by ways of transposing or converting the latter that would be specific to it. In this case transposition may be accompanied by a definition of "rules" for the document obtained by printing different from the definition of "rules" of the "electronic document".

The invention consists mainly in

A specific font including a character set sufficient to provide all or part of the text portion of a document and to enable use of this font for encoding information superimposed on the text portion of the document.

Adapting this specific font by selecting a set of characters called "encodable characters" intended potentially to support an encoding portion. The "encodable characters" are identifiable by a suitable optical character recognition (OCR) process referred to as "classic OCR" based on a computer-usable image of the document. For each of the "encodable characters" selected in this way there is predefined a number of graphical variants so that the original character and its variants can be identified as one and the same character by the appropriate "classic OCR" process. Another suitable optical character recognition process called "particular OCR" makes it possible when an "encodable character" has been identified by "classic OCR" to determine if it is the original character or one of its variants and in this case enables the variant represented to be determined. Each variant corresponds to a particular value of the encoding portion supported by the "encodable character". The definition of 4 variants therefore enables the encoding of 2 information bits if the original character is not used for value encoding.

Encoding the document by selecting the "encodable characters" of the text portion constituting it and then defining a strict order relation on these "encodable characters" in order to establish in which order these "encodable characters" will be processed during the decoding phase and then selecting a sufficient sub-set of "encodable characters" to effect the required encoding in the document. Each "encodable character" selected in this way is replaced by the variant corresponding to the value necessary for encoding for the encoding portion to be borne by this character.

Producing the document defined in this way bearing an appropriate encoding superimposed on its text portion.

If this document produced in this way must support processing conditioned by the encoding defined in this way, decoding the document on the basis of its computer image by identifying the "encodable characters" that constitute it by application of a "classic OCR" that is suitable and then establishing a strict order relation on these encodable characters in order to determine their sequence within the document conforming to that defined at the time of encoding. The application of a "particular OCR" to these encodable characters defined by the "classic OCR" makes it possible to determine for each encodable character if it is the original character or one of its variants and in this case to determine which variant is used and consequently which is the encoded value for the encoding portion supported by this encodable character. The set of these values is assembled in accordance with the sequence defined by the strict order relation in order to attempt to reconstruct all or part of the encoding effected. The result of this reconstruction is referred to as the "extracted encoding". Whether it is usable or not, the "extracted encoding" leads to appropriate processing modulated by the value or values constituting it.

The specific font is constructed either on the basis of an existing font or specifically created in the context of the invention.

The proposed encoding consists in starting from an existing "font" or one specially created for the invention to create for some or all of the characters of this "font" a certain number of variants. Each predetermined variant of a given "unitary character" encodes a specific value. The user of the document will therefore be able to read their document in the conventional way without being disturbed by the encoding while a special process linked to the invention could on the basis of computer type processing of this document deduce from it an encoded message independent of the usual direct meaning of the text bearing this message. The computer program may integrate a digitization phase when the document is of the "material document" type.

The number of variants for each encodable character may be fixed or variable. In this case the number of variables depends on the encodable character.

For example a compact character such as the "i" could be associated with fewer variants than the character "m". Likewise the number of variants could depend on the "font point size" used.

The number of variants associated with an encodable character may depend on the point size of the font.

For example the characters of a 12-point font could integrate more variants than a 10-point font, the number of variants being in this case able to depend both on the point size and on the encodable character.

The traditional Asiatic alphabets are more complex to convert in the context of our invention because they include a large number of characters (up to several thousand) or even an unlimited number of characters (through the possibility of defining new ideograms).

In this case it is nevertheless possible to adapt our invention to the "graphemes" used by these characters, which are limited in number even though more numerous than the characters of the Latin alphabet. By considering the most used graphemes it is therefore possible to apply our invention by treating them in a similar way to characters.

One of the preferred embodiments of the invention selects, based on a unique font (for example Arial or Times or one specially designed for application of the invention) and possibly a single point size (for example 12 point), the most used letters having a sufficiently elaborate graphic (which is not the case for the letter "i", for example).

For each of these letters, only a sub-portion of the character could be subjected to the definition of variants; thus only the main portion with no accent or no dot of a character that can be accented could be selected in order to define variants.

From this main portion to define four very similar graphics of the original letter but discernible after printing and then digitization by an appropriate algorithm if the document is of "material document" type. This algorithm must be capable of recognizing for the same letter whether it is the original letter or one of its variants and in this latter case to recognize which of the four predefined variants it is. If the document to be processed is of "electronic document" type, the recognition of the variants can be simplified.

Thus it is possible to encode the equivalent of two information bits per letter. A bit is binary information having the value 0 or 1; 8 bits are required to code a byte. Thus to code the equivalent of one byte, four characters are necessary. Encoding in byte form is one of the possibilities of the invention but is optional.

Encoding as such consists in six steps. It is effected on the "conceptual document" with a view to producing one or more "material documents" and/or one or more "electronic documents". The subsequent steps may be conditioned by the nature of the document or documents to be produced ("material document" and/or "electronic document") and the production means employed.

To effect the encoding on the "conceptual document", an optional first step consists in determining the "unitary pages" that will constitute the documents to be produced. If there exist multiple definitions of "unitary pages" for the documents to be produced and/or if the encoding is not common to all the documents to be produced because of a technical necessity and/or a technological choice, as many encodings as necessary will be carried out producing as many encoded "conceptual documents" as necessary. The subsequent encoding steps unfold for each necessary encoding either independently or by pooling some or all of the processes that can be pooled. This may be the case for the next step (second encoding step), for example.

To effect the encoding of a document, the second step consists in identifying in the "conceptual document" the characters or their equivalents able to support the encoding on the "conceptual document" or on each of the "unitary pages" constituting it. This identification could be limited to only the characters able to support the encoding or a superset of those characters. After this step, a diagnosis is arrived at as to the possibility of encoding the document in its entirety and/or the possibility of encoding some or all of the pages constituting it. Following this diagnosis, the encoding decision and/or the definition of the qualitative parameters of the latter could depend on this diagnosis, whether for the overall document or for the pages constituting it. This diagnosis can therefore impact on the content of the encoding of the document or of each "unitary page" constituting it as well as on the definition of the encoding redundancy. The chaining and/or the execution of some or all of the subsequent steps may be conditional on this diagnosis. In some cases the encoding phase could therefore be closed in the present step.

The third step consists in creating a strict order relation in each of the pages if the document is paginated or in the entirety of the document if this is not the case. The result of this operation amounts to identifying and assigning a serial number to all the characters of the document or of each page. Numbering then makes it possible to know the order of appearance of each character or characters in the page or the document correlated with their identification within the "conceptual document". This strict order relation is defined so that it can be deduced by the decoding algorithm applied to the encoded document whether the latter is in "material document" or "electronic document" form. From the performance point of view, the second step may be executed concomitantly with the first step. In this case, in the event of aborting encoding, the numbering that has been established is not used.

The fourth step consists in defining the content of the "unitary encoding" as such. The exploitable content of the latter and the associated parameter settings may depend on the results of the preceding steps. The associated parameter settings concern in particular the dissemination characteristics of the encoded message, its redundancy, if any, the presence or the definition of its constituent elements such as any encryption and the integration of any hashing result. If the encoding imposes constraints on these parameters, the latter are taken into account in the definition of the step 2 diagnosis.

The fifth step consists in defining the "unitary characters" of the document or of each page thereof that have to be able to bear a portion of the encoded information and the portion of the information coded by each of its characters correlated with the encoding potentiality of these "unitary characters". Each of these characters is replaced by the character corresponding to the encoding to be borne by that character. This substitution does not lead to any modification in the reading as such of the character.

The sixth step consists in producing the document or documents resulting from these encoding steps depending on their nature: "material document" and/or "electronic document". The production means used for this purpose may be specially selected for this use as a function of their technical characteristics. For example, there could be selected only printers using an eligible technology such as inkjet and/or laser and having a compatible printing precision (for example at least 300 dpi or color characteristics). If there is provision for inserting "marks" in the document in order for the latter to be considered as a sensitive document, the latter are introduced in the present step.

Decoding consists in 6 steps that are applied to a "material document" or an "electronic document" or a combination of these types of document.

The first "preliminary conversion" step consists in converting the document to be processed into an "exploitable document". For a "material document", this step may consist in a digitization step.

The second step consists in detecting the "sensitive" nature of the document by the detection of "marks" in the document when the encoding provides for such insertion. The subsequent steps are then conditioned by the result of this search. Thus if the encoding is associated with the insertion of "marks", the other decoding steps are effected only if the detection of the latter is positive in accordance with criteria to be defined. Otherwise, the other steps are chained until an encoding is detected and decoded positively in accordance with criteria to be defined or this search is considered as unfruitful in accordance with criteria to be defined.

The third step consists in defining which are the "unitary pages" of the document to be processed. If pages are defined in this way, each page is processed independently. In the absence of identified pages, the document is processed in its entirety.

The fourth step consists, for each "unitary page" defined by the preceding step, in determining all the "unitary characters" constituting it and liable to bear a portion of the coded information, if any.

The fifth step consists in defining an order relation on the eligible "unitary characters" resulting from the preceding step.

The sixth step consists in extracting the coded information part, if any, borne by each eligible "unitary character" and thanks to the strict order relation reconstituting the encoding effected on each "unitary page" defined in the third step. The result of this step is, for each "unitary page", a diagnosis indicating the presence of an encoding or characterizing the encoding potentiality. It may therefore be indicated that an encoding has been detected but not decoded or decoded in an uncertain manner. If the encoding has been decoded successfully or in an uncertain manner but with a value potentially exploitable despite its lack of absolute reliability, the decoded value is a result of this step for each of the "unitary pages" where such a value can be determined.

The decoding determined in this way may be integrated into a general process of managing reproduction and/or authentication of documents ways that are specific to it.

FIGURES

FIG. 1 shows the process of encoding a document,

FIG. 2A shows the process of decoding a document potentially encoded when the encoding is associated with a "marking" and applies either to a "material document" or to an "image electronic document", FIG. 2B shows the process of decoding a document potentially encoded when the encoding is not associated with a "marking" and applies either to a "material document" or to an "image electronic document", FIG. 2C shows the process of decoding a document potentially encoded when the encoding is associated with a "marking" and applies to a "descriptive electronic document", FIG. 2D shows the process of decoding a document potentially encoded when the encoding is not associated with a "marking" and applies to a "descriptive electronic document", FIG. 3 shows the method of associating a portion of encoding on a character and in the case of the figure for a selection of 4 characters each associated with 4 variants, FIG. 4 shows value encoding using character variants, FIGS. 5 (5A to 5D) show different possible structures of messages in the context of the medium of the encoding that is the subject matter of the invention, FIGS. 6 (6A and 6B) show different possible structures of messages in the context of the medium for the encoding that is the subject matter of the invention when the encoding is effected via a plurality of encoding sub-sequences, FIG. 7 shows the imposition of encoding in a text when that encoding is constituted of multiple sequences, FIG. 8 shows the compatibility of decoding when the latter is constituted of multiple sequences and acquisition is effected by taking a photograph; the figure therefore identifies photographic Zones that are self-sufficient for detecting a complete set of encoding sub-sequences, FIG. 9 shows the decoding compatibility when the latter is constituted of multiple sequences and acquisition is effected by video scanning; the figure therefore identifies video scanning Zones self-sufficient for detecting a complete set of encoding sub-sequences;

FIG. 10 shows the decomposition of a character into graphemes that can support encoded information and the complementary definition of remarkable zones that can also contribute to the definition of an encoding, FIG. 11 illustrates the prior art relating to the RAD/LAD and OCR technologies (figure already explained), FIG. 12 shows the principle of the additive synthesis of colors, used in display devices, this figure is not explained but referred to in the explanation of FIGS. 2A to 2D, FIG. 13 shows the principle of the subtractive synthesis of colors used by printing devices; this figure is not explained but is referred to in the explanation of FIGS. 2A to 2D, FIG. 14 shows the definition of connexity; this figure is not explained but is referred to in the explanation of FIGS. 2A to 2D, FIG. 15 shows the ordering of the characters of a paragraph before and after alignment correction processing; this figure is not explained but is referred to in the explanation of FIGS. 2A to 2D.

For all the figures, the encoding is defined on the basis of use of the text portion of the document to be encoded or decoded. One of the frames of use of the encoding as defined in the present invention is the encoding of "rules" in the sense of the earlier patents already cited. The "sensitive documents" having to integrate such "rules" generally include large text portions or even include only text. In addition to its text portion a document may integrate images, graphics and different multimedia composites especially if the document is of "electronic document" type. All of these elements, which will be referred to as "structural elements", may be disposed in a complementary manner in the document without overlapping or being subject to simple or complex superimposition. There already exist methods for watermarking such "structural elements", in particular for images. During the phase of encoding in the context of the invention, these other than text "structural elements" could be used additionally to support an encoding in accordance with methods already existing or future methods in order to complete or strengthen the encoding effected on the text portion by our method. The same applies to any watermarking also applying to the text portion differing from that which is the subject matter of the invention that might be used in addition to that which is the subject matter of the invention where this makes sense. A "rule" could therefore be in part encoded in the text portion as indicated in the present invention and in part in other "structural elements" of the document using existing or future methods. In this case, the encoding or the decoding defined in our inventions will take account of this complementarity in order:

to decide the portion having to be encoded in the text portion and that having to be encoded in accordance with other watermarking methods in other "structural elements" of the document, to decide the viability of the encoding taking account of the encoding potentiality of the whole of the document, text and non-text portions, to integrate a complementary encoding phase in the non-text "structural elements" using existing or future methods, to integrate a complementary encoding phase in the text "structural elements" using complementary existing or future methods if this makes sense, to integrate complementary decoding phase in the non-text "structural elements" using existing or future methods, to integrate a complementary decoding phase in the text "structural elements" using complementary existing or future methods if this makes sense, to decide the exploitable character of the encoding during the decoding phase taking account of any complementary encoding effected on all of the text and non-text "structural elements".

The text portion that can support the encoding in accordance with the invention is any text using a "font" as defined in the present invention. In some cases, a "unitary character" may be considered as a graphic element, which is the case for example of the lettrines used in ancient documents. Modern documents also allow the design of characters such as more or less complex graphic elements such as, by way of non-limiting example: artistic graphics, use of colors, shading, backgrounds. In this case, these characters may bear a watermark in accordance with existing or future methods generally concerning images, this watermark being exclusive or not of the application of the encoding specific to the invention.

FIG. 1 shows the process of encoding a document. For it to be possible for the document to be encoded, it must include a sufficient text portion and the latter must be compatible with an encoding as defined in the context of the invention. This figure defines a chain of multiple steps the aim of which is to encode a document in accordance with the requirement expressed by a "requesting entity". These steps are defined sequentially in order to facilitate their description, which does not rule out merging these steps or executing them in parallel. This may in particular be of benefit with regard to performance.

If multiple documents may be produced from the same "conceptual document", the steps necessary for the production of each of the documents may be partly or completely pooled, including chronologically. For example, the inventory of the characters of the "conceptual document" could therefore in some cases be effected only once for all the documents to be produced. The encoding process is effected completely for each document to be produced from the "conceptual document". The subsequent steps are defined for a unitary production either for a "material document" or for an "electronic document". These definitions may be adapted for multiple production, whether mixed ("electronic document" and "material document") or not, taking account of the pooling possibilities referred to here.

The first step consists in taking charge of a "conceptual document" that includes the information necessary for the production by a computer process of one or more "material documents" and/or one or more "electronic documents". For each document to be produced, the corresponding pagination is defined, i.e. all of the "unitary pages" that will constitute the document to be produced, this pagination depending on the definitions of the conceptual document, the characteristics of the means of production of the document to be produced, and the parameter settings of the means of production. These parameter settings may be established independently of the current submission and/or specifically for the latter. As the pagination can be determined only during this submission, some of the following steps may therefore be executed before the present step and possibly rectified once the final pagination has been determined if necessary:

the inventory of the characters, the establishing of the strict order relation or predetermination of the latter, the viability diagnosis of the encoding or a first viability diagnosis that may have to be confirmed afterwards, the selection of the encodable characters, the partial or complete encoding of the encodable characters, possibly with provision for rectification, the possible insertion of a "marking", possibly with provision for redefinition.

In accordance with a preferred embodiment of the invention, the encoding is defined for each of the pages identified in step 1. This encoding may be distinct on each of these pages or common to a plurality of pages. It can identify the same document for each of the pages but with variants for each of them; for example, the encoding could therefore identify both the document concerned and the page on which it is inserted.

In accordance with another embodiment, the encoding could be effected so as to straddle the different pages of the same document if this is of benefit. A unitary encoding can therefore be defined for a paysheet that classically uses only one page when it is produced in material document form. In some cases, for example if the number of accounting headings justifies it, this paysheet could necessitate more than one page, often with very little text information on the last page. In this case, there could be defined in accordance with this particular embodiment an encoding covering all of the pages constituting the document as if the latter occupied only one page. In this case the rest of the invention remains unchanged except that, for the processing operations described, the document in its entirety is equivalent to a page in the context of the preferred embodiment.

In some cases it is possible to integrate multiple distinct encodings in the same page. For example, in the case of inserting external citations in a document, in compliance with author's rights, each citation could therefore include its own encoding indicating the origin of the citation and consequently a plurality of distinct citations could be integrated into the same page which could moreover have its own overall encoding. In this case the decoding process has to be capable of interpreting this multiplicity of encodings as normal and if necessary adopt an appropriate process for processing the different encodings present on the page.

The second step consists in drawing up for each "unitary page" the inventory of the encodable "unitary characters", i.e. the characters that can serve to support an encoding in the context of the invention. In one particular embodiment of the invention, instead of being limited to the encodable "unitary characters" alone, this inventory could integrate all or some of the non-encodable "unitary characters"; such an embodiment may be adopted to facilitate establishing a strict order relation in the subsequent steps. The strict order relation of the encodable characters alone can easily be deduced from that defined on the basis of a subset of them. The encodable "unitary characters" are determined as a function of the characteristics of the latter:

"font" used,

"font style" used,

"font point size" used, character as such (a, b, c . . . ), graphic elements of the "unitary character" such as color, gray level, shading or background applied to the character as well as any background element of the "unitary character" (background, graphic, image, etc.), "resolution" used, choice or constraints of the issuer of the document or any other entity associated with the document to be produced having an influence on the eligibility of the characters chosen. For example, some zones of the document can therefore be subject to graphic charter constraints locally prohibiting the modifications that would generate the encoding as defined in the context of the invention. Likewise, some "hashing" procedures calculate a value deduced from the disposition of the graphics elements in the document; if this procedure does not take account of the encoding as described in the context of the invention, the latter will invalidate the value determined by this "hashing", ruling out any check based on the interpretation of this value.

If the page to be encoded includes text portions already encoded, such as citations of external works, for example, the characters constituting these portions already encoded will not be considered as encodable characters for the current "unitary page" unless the overall encoding of the page makes it possible to comply with the constraints imposed by these text portions already encoded whether from the legal or application point of view. Indeed, a text portion already encoded relative to an external citation, for example, can make possible thanks to the automatic or otherwise exploitation of its encoding to identify and access the work from which it is extracted, even to identify the proprietor of the copy that was used to import the passage into the processed document. In this case these coded portions will have to be identified in order for them to be excluded from the encoding specific to the processed page or for their encoding to be redefined in compliance with constraints linked to the insertion of such a passage into the processed document, such as intellectual property constraints, for example.

As a general rule, computer applications are primarily concerned with the variable portion of a document. The fixed portion, which formerly corresponded to the "pre-printed" portion, is often not taken into account by these applications and is therefore rarely integrated into the "conceptual document". In the context of the invention each character of the document to be produced can support encoding whether it is a character forming part of the variable data of the document or the fixed portion similar to a preprinted portion. The fixed texts of the document such as table headers, titles, legal paragraphs can therefore be integrated in the context of the invention into the inventory of the encodable characters. In this case, the encoding steps are adapted so as to be able to bear also on these characters if necessary.

This inventory step makes it possible to reference all of the encodable characters as well as their location, or any equivalent information, enabling substitution thereof by an encoded character during the encoding phase as such. This step is carried out with or without modification of the "conceptual document", the identification of the encodable characters and the definition of their location possibly varying in and/or outside the "conceptual document".

The encoded messages have a usable portion, i.e. the exploitable information, and a technical portion intended to ensure encoding of the usable portion under the best possible conditions.

This step makes it possible to know the number of encodable characters and the encoding potentiality of each of those characters as a function of contextual information (font, point size, resolution, etc.). It is therefore determined if this potentiality is sufficient in relation to the encoding that has to be inserted in each of the identified pages. There must therefore be defined at and/or before this step:

The information that has to be integrated into the encoding according to the definition of the "requesting entity"; this information forms part of the usable portion of the message.

The optional complementary information, according to the definition of the "requesting entity", that can be integrated into the encoding if the corresponding unitary page has a sufficient encoding potentiality; this information forms part of the usable portion of the message.

The information redundancy characteristics imposed on the encoding. Thus it may be imposed that all of the encoding is inserted a minimum number of times in the page: twice, three times or more. This redundancy can also be defined specifically for any information or information group integrated into the encoding, whether that information is optional or not. The redundancy primarily concerns the usable portion of the messages, and the corresponding multiplication of the message in fact leads to the creation of new technical portions.

The structural elements of the encoding. The encoding is carried out in the form of elementary messages the start and the end of which are defined in order that they may be identified, each message integrating all or part of the usable information to be encoded. Outside the usable portion of the encoding, it may therefore be necessary to introduce encoding elements such as message headers and endings that do not encode information but are necessary for the decoding phases and themselves will necessitate the use of encodable characters. Likewise, the encoding may use a plurality of sub-sequences that must also be identified at decoding time. The identification of these sub-sequences also uses encodable characters. This information forms part of the technical portion of the message.

The control characteristics of the encoded information. As decoding might have been done with reading errors, especially on "material document" type documents, it may be necessary to integrate complementary control information such as CRC (cyclic redundancy checks) that are calculated at the time of encoding and integrated in a complementary way into the encoding. Reading this complementary control information at the time of decoding and comparing it to the CRC recomputed using the usable portion of the encoding (outside the CRC) makes it possible to validate or invalidate the decoded message. The effect of adding a CRC or the like is to lengthen the encoded message relative to its usable length. This information forms part of the technical portion of the message.

The encryption parameters; in order not to allow the encoded message to be read easily by unauthorized persons or entities, it may be encrypted. The introduction of encryption or the like generally has the effect of lengthening the encoded message compared to its usable length. This information forms part of the technical portion of the message.

To determine the encoding potentiality of a page, an error margin may be applied in order to simplify this step; the encoding will therefore be considered possible if the encoding potentiality of the page exceeds a certain ratio relative to the minimum encoding necessity that has been identified; for example, if the encoding capacity exceeds 110% of the minimum encoding that has been identified or if it exceeds 50% of the optimum encoding that has been identified.

Step 2 therefore supplies an encoding feasibility diagnosis conditioning the further encoding steps, as follows:

The encoding is possible or not.

If the encoding is possible, these characteristics are defined, namely the usable content of the encoding, the determination of redundancy, whether the latter is defined globally or in a particular way as a function of the usable data concerned, the insertion of control data (CRC) and the characteristics thereof, and the adoption of a method of encryption and its characteristics. All of these parameters define that the end of this step may be refined or redefined partly or completely as the subsequent steps proceed.

The result of the diagnosis is where appropriate communicated to the "requesting entity" either in raw form or in an adapted form. The analysis of this result by the "requesting entity" may have the effect of resubmitting the encoding with the document to be encoded and/or the definition of the encoding adapted or not.

For the pages for which the encoding is considered possible following step 2, the subsequent steps are executed.

For each of the pages for which an encoding has been determined to be possible in the preceding step, the third step consists in establishing a "strict order relation" on the encodable characters identified in the preceding step. This step can use results supplied by the preceding steps. In particular, the identification of the encodable characters may be accompanied by the identification of a position within the page facilitating establishing the order relation.

The strict order relation established in this third step identifies the order of extraction of the characters during the decoding phase.

The order relation is established not as a function of the order of appearance or of writing of each character in the conceptual document or even in the production of the "material documents" and/or "electronic documents" but rather as a function of the ability to identify the latter at the time of decoding the "exploitable document" produced from a "conceptual document".

A first character that would appear before a second character in the "conceptual document" but which during exploitation of the "exploitable document" would be identified after the identification of this second character therefore induces a strict order relation that is the opposite of that determined by direct exploitation of the "conceptual document". This applies to any pair of characters regardless of the position at which they appear in the page currently being processed. To illustrate this point, in the "conceptual document", the page bottom may be defined before its body, at the time of decoding the "exploitable document" produced from this "conceptual document", and the decoding could analyze the page body first before the page bottom.

To establish this strict order relation, a system of axes may be defined in each of the pages to be processed. An orthonormal system with two coordinates x,y establishes for example with a center at the top/left corner of the page an x axis oriented toward the right, a y axis oriented downward, a unit of measurement expressed in millimeters via a decimal value is sufficient. Any other way of determining the center of the system of axes, the axes or the unit, including different units on each axis, is also satisfactory. A system of polar axes (center, angle, distance) is also satisfactory.

If such a system of axes has been determined, the coordinates of each character in the documents to be produced are determined, the strict order relation is defined as a function of these coordinates. In the case of an orthonormal system of axes, a character that will have a vertical coordinate smaller than a second one would therefore be considered as preceding that second character; in the case of equal vertical ordinates, it is the one that will have the smaller abscissa that will be considered as preceding the other one. Analogous rules may be established with polar coordinates: first determination as to the value of the angle, then second determination as to the value of the distance. In all cases the coordinates of the characters are determined by the coordinates of a predefined remarkable point thereof: one of the extremities of the enclosing box (the smallest rectangle inside which the character fits), the center of gravity of the character or any other point that can be determined precisely during the decoding operation. This point may be determined as a function of the design of the character, so it would be possible to choose the center of the occlusion (white portion between the bar and the loop) for a "b" or a "d", the center of any identified portion of the character whether that portion concerns the positive portion representing the shape of the character, for example the black ink on a paper document, or the portion representing the background, in other words that does not correspond to the character, such as the white color of the paper, or any identifiable portion of the latter.

The strict order relation may also be established as a function of the order of reading the document. For this purpose it is established which are the "unitary lines" that will constitute the document to be produced and these lines are numbered as a function of the order in which they appear, that appearing highest on the page having the lowest number and that appearing lowest on the page having the highest number. This numbering if all the lines have the same orientation: for example all the lines are horizontal and are read from left to right. Otherwise, the numbering of the lines must take account of their orientation and position as determined by the position of a remarkable point thereof (extremities, center of gravity, etc.) or any value determined unequivocally on the basis of the identification of the line in the "exploitable document". Each encoding character is identified by the line to which it will belong in the document to be produced and its position in the line determined either by the orientation defined for the latter or by the classic reading direction, for example from left to right on a horizontal line for Latin characters. The strict order relation is then determined firstly by the index of the line and then by the position in the line.

Anticipating the use of a RAD (automatic document recognition) system, it is also possible to define the strict order relation as a function of the type of document concerned. The different zones of the document to be produced are therefore numbered, then the different lines of each of these zones, then the different characters of these lines, all of these numbers (zone plus line plus character) enabling a strict order relation to be defined. If some or all of the characters of the non-variable portions of the document to be produced also potentially support encoding, the zones concerning these characters are integrated into the inventory.

The fourth step is executed on a page if the preceding steps have determined that the encoding is possible on that page. The inventory of the encodable characters having been produced, this step establishes the essential characteristics of the encoding:

Usable content of the encoding.

Definition of the encoding redundancy. This redundancy may be defined globally: all of the usable information is encoded, twice, three times or a number of times to be determined. The redundancy may be defined as a function of the encoded elements: the important encoded information could have a higher level of redundancy than optional or secondary information. It would therefore be possible to define as many levels of redundancy as there are types of encoded information. The definition of the different levels of redundancy is specific to each encoded page unless a constraint in this respect is imposed.

Structure of the encoding, number of elementary messages integrated into the page, usable content of each message, division of the usable information into sub-sequences, structural information such as message headers and endings, typology of the information contained or identification of the encoded sub-sequence.

Any control characteristics of the encoded information: CRC (cyclic redundancy checks) or the like.

If encryption is effected, the parameters of such encryption.

The integration where applicable of the results of a hashing process on all or part of the encoded page or the encoded document.

The fifth step selects the encodable characters that will actually be encoded. The eligible encodable characters were defined in the second step while the number of messages to be encoded in the page and the length of each message were defined in the preceding step. The set of encodable characters of the page constitutes a superset of the characters that will actually be encoded. The selection of the encodable characters in this superset is effected in accordance with any combination of the following criteria:

Regular dissemination in the encoded page.

Dissemination in accordance with an algorithm defined as a function of the number of encodable unitary characters of the page, the length of a unitary encoding and the redundancy. The use of such an algorithm enables the decoding phase to validate the adequacy of the messages decoded to the content of the page processed. In this context, the algorithm can also deduce the redundancy and/or the length of a unitary encoding from the other parameters.

Priority of use of certain unitary characters or certain zones of the page.

Compactness of the encodable characters used for the same structure: message or message portion.

Preferred use or non-use of characters used for key information of the document in the classic reading thereof (apart from encoding).

Preferred use or non-use of characters subjected to a hashing process.

Spacing between the different encoded messages and/or the different portions of the encoded messages.

Integration required or to the contrary encoding prohibited in respect of a message or a message portion on the same constituent element of the encoded page: word, unitary line, zone, etc.

In the preferred embodiment of the invention, each encodable character includes four variants in addition to the same non-encoded character. Accordingly:

The unmodified character itself is not associated with any value.

The first variant may be associated with the value 0 or if binary notation is used the pair (0,0).

The second variant may be associated with the value 1 or if binary notation is used the pair (0,1).

The third variant may be associated with the value 2 or if binary notation is used the pair (1,0), The fourth variant may be associated with the value 3 or if binary notation is used the pair (1,1).

To effect the substitution of characters, the font used by the encodable characters is replaced by a font specifically developed for the invention, this font containing the same characters as a font not used to effect an encoding in accordance with the invention as described. In addition to these "normal" characters, for each encodable normal character, the font integrates as many characters as there are variants necessary for the invention. Thus if there exist 4 variants of "a" encoding the values (0,0), (0,1), (1,0) and (1,1), these four variants are added to the font at other available positions. In this case the encoding of the value on the selected character is effected by an appropriate change in the position of the character in the font of the selected character. Most fonts enable a character to be made to correspond to a value defined by a byte, which allows the incorporation of 256 characters maximum.

In reality, however, because of various constraints, the number of characters that can actually be integrated into a font in this case is less than this value of 256; now, if the usable characters of a font must be multiplied by a factor of 5, this already yields 130 positions (5 times 26) for the lowercase characters and as many for the uppercase characters. If it is required to go beyond the limit of 256, it will therefore be necessary to encode the positions of characters on 2 bytes as is already the case for certain Asiatic fonts. In one particular embodiment of the invention, rather than inserting all the character variants associated with an encoding in the same font, it is possible not to modify the original font, which serves as the reference font, and to create as many fonts as there are variants, i.e. four new fonts in the above case, and the first font created therefore corresponds to all the characters encoding the value (0,0), the second font created corresponds to all the characters encoding the value (0,1), the third font created corresponds to all the characters encoding the value (1,0) and the fourth font created corresponds to all the characters encoding the value (1,1). Thus instead of substituting the appropriate encoded character for the non-encoded character as proposed hereinafter, it suffices in this case to substitute for the reference font the font encoding the appropriate value for each character. This includes the characters not encoding any value for which it may be necessary to re-establish the original font. Indeed, without defining a new font in many cases, the character uses the last font defined.

For technical reasons of scrambling, etc. it is also possible for the same font to integrate characters encoding distinct values or even to integrate both characters not encoding values and characters encoding distinct values. Thus, for example, for the same fonts, the "a" could encode the value 1, the "b" and the "c" not encode a value, the "d" encode a 3, the "e" encode a 2, the "f" a 1, the "g" and the "h" a 4, the "i" a 2, the "j" and the "k" not to encode values, and so on. It would then be necessary to create a sufficient number of fonts in order for all these fonts to integrate all the characters not bearing encoding and for each encodable character each of the variants associated with each potential code of the character. The same character not bearing code or a variant of a character can be duplicated in several of these fonts. The encoding algorithm will then take account of this dissemination of the characters in the different fonts to select the fonts associated with each character using an arbitration algorithm if a plurality of fonts may be associated with the same character to be encoded or not.

To encode a message, the latter must be converted into elementary computer encoding units such as bytes. A byte comprising 8 bits (a bit is a binary value 0 or 1), 4 characters suffice for encoding a byte because each character encodes 2 bits in this embodiment. For a set of 4 characters selected for encoding a byte, it suffices to substitute for the first character its variants encoding the first two bits of the byte to be encoded, the second character its variant encoding bits 3 and 4 of the byte to be encoded, the third character its variants encoding bits 5 and 6 of the byte to be encoded and finally the fourth character its variants encoding bits 7 and 8 of the byte to be encoded.

This system assigns importance to the bits of decreasing weight from left to right in accordance with the big endian information encoding scheme, but it is entirely possible to use the little endian encoding scheme to define the distribution of the various bits of a byte. In "electronic documents", the Latin characters are often encoded in ASCII using one byte. As a byte can assume 256 values, ASCII enables coding of both uppercase and lowercase letters, digits and numerous special characters.

By retaining ASCII coding, it is therefore possible to superimpose on a text another encoded text that is four times less dense. However, it is possible to encode without using ASCII coding. To code only a set of 26 characters, 5 bits are therefore sufficient because 5 bits enable encoding of 32 values and therefore the set of 26 characters plus up to 6 other special characters such as for example a space (blank), a slash or certain punctuation marks. In this case it is possible to code 2 characters using 5 encodable characters. If this is expanded on, retaining the 26 uppercase characters and the 26 lowercase characters and the 10 digits, a total of 62 signs encodable on 6 bits is obtained, because 6 bits enable up to 64 values to be encoded. It is likewise possible to encode two other complementary signs such as @ and –, which makes it possible to encode most URL, for example. In this case three encodable characters are necessary for encoding a character in accordance with our invention.

Generally speaking, with N encodable characters, it is possible to encode up to $4^N$ values. If it is required to encode P characters or digits or the like with Q possible values for each character or digit or the like, it is necessary to chose N so that $Q^P$ is less than $4^N$. The method of encoding and decoding can be implemented by elementary mathematical rules (polynomial calculation).

To avoid decoding confusion, as indicated hereinafter, it may be judicious not to use all the possible encodings. For example, if pairs of encodable characters are used that encode quadruplets of bits from (0,0,0,0) to (1,1,1,1), it is possible to prohibit the use of the quadruplets (0,0,0,0) and (0,0,0,1) in the body of the messages to make the decoding operation secure, as described hereinafter. In this case the pairs of "usable" characters when they encode the body of messages have quadruplets values from (0,0,1,0) to (1,1,1, 1), i.e. 14 positions, so that 2N encodable characters enable encoding of up to $14^N$ values in accordance with this principle. To encode P characters or digits or the like with Q possible values for each character or digit or the like, it will be necessary to chose N so that $Q^P$ is less than $14^N$. The method of encoding and decoding can be implemented by elementary mathematical rules (polynomial calculation).

Based on the above examples it is possible to define numerous encoding rules regardless of the nature of the information to be encoded. The encoding of the usable portion of messages may be identical or not to the encoding of the technical portion of the same messages. The encoding technique may be specific to any chosen section of the message or messages.

The sixth step consists in producing the documents with their encoding. For this step, the term "encoded character" corresponds to a character bearing in addition to its usual meaning a specific coding in accordance with the invention as described above.

In one particular embodiment of the invention, the insertion of specific fonts, such as those including encoded characters as described in the present invention, serves for "marking" the document produced: the detection of a minimum number of characters encoded in accordance with the invention serving as "marking" in this way enabling identification of the document as "sensitive" or as "authenticatable". The threshold beyond which the document is considered as "sensitive" can be defined in absolute terms: for example at least 5 encoded characters in the page. This threshold can also be defined in relative terms: for example if at least 1% of the characters of the page are encoded then the page is considered as a "sensitive document". The detection of non-encoded characters that nevertheless form part of a font specifically defined for the invention can also enable definition of a "marking" by the method defined for the encoded characters. The code borne by the encoded characters in this context constitutes the rules of the "sensitive document".

If the document to be produced is of the "electronic document" type, the fonts used integrating the encoded characters are integrated into the file that is produced. If the fonts integrating the encoded characters become common fonts, this insertion may not be usable. If the document produced must include a marking, the latter is inserted in an appropriate form such as for example the positioning of a specific attribute in the zone reserved for contextual computer data of the file created. As indicated above, the use of a specific font or of a minimum number of encoded characters may equally well serve as "marking". If the encoding that is effected serves as "rules", it may be completed in order to define, directly or indirectly, the restrictions on use or reproduction of the document produced.

These elements complementary to the definition of the rules by the encoding of the characters are inserted in an appropriate form such as for example the positioning of a specific attribute in the zone reserved for contextual computer data of the file created. In accordance with one specific embodiment, the encoding of the characters is not carried out on the "electronic document" type documents but rather defined by contextual attributes in the file; the characters are then encoded only if a copy in "material document" form is requested. This encoding can therefore take place at the time of a request for printing and/or at the time of a request for display on a screen.

If the document to be produced is of the "material document" type, the production parameters such as the "resolution" for printing are adapted or forced in order to be compatible with the encodable characters so that the latter are exploitable during a decoding phase. These parameters could be defined by defining the minimum quality parameters of the decoding phase. For example, these parameters could be the definition of the digitization resolution during operations of decoding the document, this resolution possibly being different from that required at the time of encoding: digitization with a resolution of 600 dpi could be compatible with an encoding effected with a resolution of 300 dpi. If the document produced must include a marking, the latter is inserted in an appropriate form such as for example the insertion of additional graphic elements such as frame elements or a list of dots. As indicated above, the use of a specific font or a minimum number of encoded characters may also serve as "marking". If the encoding effected serves as "rules", the latter may be completed in order to define, directly or indirectly, the restrictions on use or reproduction of the document produced. These elements complementary to the definition of the rules by the encoding of the characters are inserted in a suitable form such as for example watermarking of other graphic parts of the document, insertion of bar codes or the like with one or two dimensions. For the watermarking on the other graphic portions, there already exist for example technologies enabling encoding of the information on images. If in order to encode the "rules" data is encoded in this way on the document in a complementary way to the encoding of the characters, the decoding phase will simultaneously have to identify whether the complementary data is encoded, to identify the zones of this complementary encoding and to extract the complementary encoding defined in this way.

FIGS. 2A shows the process of decoding a document encoded in the context of the invention not coupled to the integration of a "marking" when the document is either a "material document" or an "image electronic document".

Figure 1:
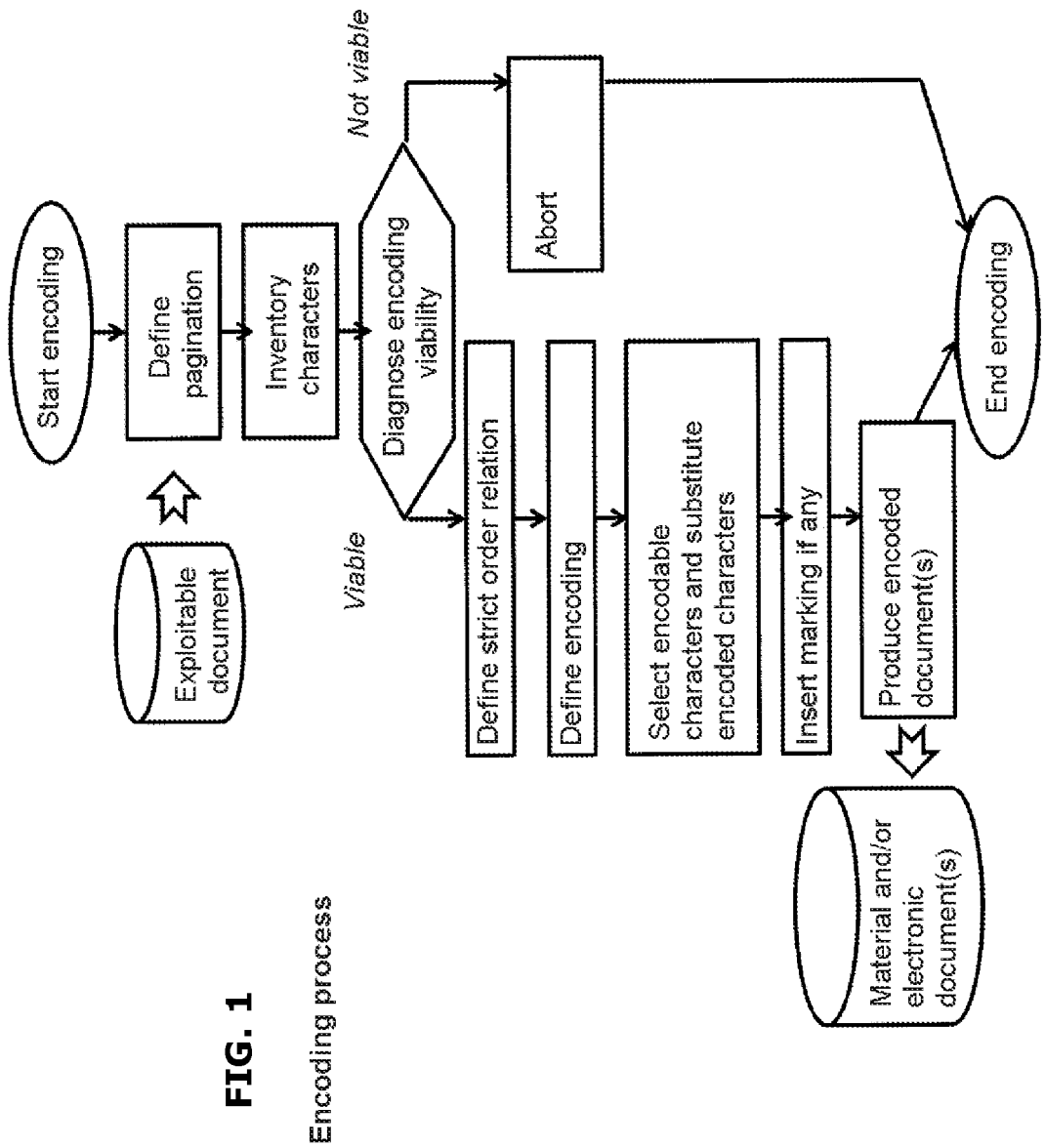

The various steps of this decoding process are effected partially or completely either following an intentional action aiming to extract the encoded information in a document for which it is felt that it integrates an encoding as defined in the context of the invention or at the time of overall processing of a document with a view to its reproduction, independently or not of the presence of encoding as defined in the context of the invention. In all cases such processing may be triggered by a person, an entity or a computer process.

When the steps are effected following an intentional action necessitating the actual presence of an encoding, the corresponding treatment is interrupted if the presence of that encoding is not found or such presence is found but the decoding operation fails to decode it or the code resulting from this decoding operation is not exploitable in the context of the current action. This interruption of processing may be accompanied by any appropriate management operation.

If the steps are effected following a reproduction operation, independently or not of the presence of encoding as defined in the context of the invention, the progress of that operation may then be modulated by the decoding steps if the latter lead to the detection of a code encoded as described in the context of the invention or simply if the presence of an encoding is detected. This modulation may for example have the effect of restricting the reproduction possibilities and/or expanding them with the possibility of obtaining authenticatable and/or authenticated copies in addition to or instead of classic copies, for example. This modulation may be effected via a new man-machine dialog enabling partial or total redefinition of the current reproduction operation integrating the information resulting from the decoding or simply induced by the detection of the presence of an encoding.

The first step consists in converting the document to be decoded into an "exploitable document". This first step may be triggered during a reproduction operation, for example, independently of the potential presence of encoding as defined in the context of the invention. If the reproduction process is authorized to take account of the information in the document potentially encoded in accordance with our invention, this step is adapted so as to be compatible with the present description.

If the document is in "material document" form, it is digitized in order to have a binary representation of this image in a compatible computer format such as Bitmap, Tiff, JPEG or any existing or future format enabling a computer exploitable representation of the document to be obtained. The format used makes it possible to identify each physical page of the "material document" if the latter is made up of a plurality of pages as is the case for example for a paper document printed on both sides or a document consisting of a plurality of sheets of which one or both sides are used.

The definition of the "unitary pages" following the processing may be separate from the definition of the physical pages; for example, it could be considered that the "exploitable document" obtained by digitizing a paysheet includes only one page even if the corresponding "material document" includes a plurality of physical pages. For each of the pages of the "material document", digitization makes it possible to break the latter down into a set of elementary points with geographical location on the page; the location may use a system of axes or the like. Instead of division into elementary points, there exist digitization technologies that use division into unitary elements more complex than points with in some cases partial superimposition possibilities.

Any form of digitization is satisfactory if it makes it possible to apply shape recognition algorithms and in particular optical character recognition (OCR) technologies in the "exploitable document" obtained. This digitization is therefore satisfactory if all of the unitary elements associated with the space occupied in a page of the "material document" by a given "unitary character" enables the algorithm to determine the presence of a unitary character and/or which character is materialized by these unitary elements with a satisfactory level of confidence, i.e. an estimated error rate below a certain threshold.

In one embodiment of the invention, only some characters are the subject of an encoding and those that are not the subject of an encoding do not need to be recognized in the present operation. Accordingly, if neither the uppercase i: "I" nor the lowercase l: "l", nor the digit 1: "1" are encoded, there is no need to distinguish the uppercase i from the lowercase L and the digit 1, which are visually very similar and which may be difficult for OCR to distinguish. In contrast to the classic use of "OCR", the character recognition that may be effected in the context of the invention by "classic OCR" does not seek to decrypt the text such as may have been read. Consequently, "classic OCR" could recognize only the characters likely to bear an encoding. Thus if only the "e" and the "a" are encodable, "classic OCR" could be limited to the recognition of three characters, the "a", the "e" and the "other characters", all the other characters in effect being considered as the same third character by "classic OCR".

For the characters liable to bear an encoding, the division could be considered satisfactory, for example, for the "a" if these characters are indeed identified as "a" in more than 95% of cases, i.e. if the margin of error accepted is 5%. In the context of the invention, it is important that this error margin is minimal. A margin of error greater than 1% leads to difficult or even unsuccessful decoding in many cases. Such a margin of error that is to be deprecated does not render inoperative the decoding as defined in the context of the invention, merely having an effect on the performance thereof.

Classic digitization includes two steps, sampling and quantization. The most classic digitization enables via a first step known as sampling association with a space on the page of a matrix of elementary points for a definition of 300 dpi; for example, the matrix constituted in this way includes 300 rows of points per inch (approximately 2.54 cm), and each row is itself constituted of 300 points per inch, so that there are therefore approximately 90 000 points per square inch (approximately 13 950 points per $cm^2$). This sampling is complemented by a second, quantization step to terminate the digitization. This quantization enables description of all the values that could be assumed by the points defined in the sampling step.

During digitization in binary mode, also referred to as binarization, only two levels of information are retained. By convention each point has the value 1 if it serves to represent form information, in other words in the context of the invention the shape of a character, and 0 if the point represents a background value. Also by convention, black is generally used to represent the ground and white for the form, although the opposite choice is possible.

Digitization can also be effected in grayscale. If quantization of the levels of gray on 8 bits is chosen, in this case each point assumes a value between 0 and 255. The value 0 is generally associated with absolute black and the value 255 with absolute white by analogy with a measurement of luminous intensity, all intermediate values encoding a gray going from the darkest gray (1) to the lightest gray (254). For simplicity, these quantization parameters are retained for the remainder of the description, which nevertheless remains compatible with more complex digitization methods.

The digitization principle may be applied to a paper "material document" when the latter is submitted to a scanner (digitizer), whether the latter is independent or associated with a reproduction device such a photocopier or facsimile machine. This also applies if it is used by a digital still camera whether the latter is independent or associated with computer intelligence, i.e a smartphone ("intelligent" telephone), digital tablet ("FDA") or any type of computer. This still camera may be a device enabling only still photographs to be taken or a device capable of shooting video but used to take still photos, as a camcorder or webcam can be, for example.

In the latter case, either the video device is used to store a photo type single image or it is associated with a specific algorithm that is used to reconstitute the equivalent of a fixed image similar to a photograph from a video sequence or a plurality of photos or images. This algorithm may be integrated directly into the video device or applied after imaging, whether on the device or on external computer intelligence such as a computer.

If the document to be decoded is in "image electronic document" form, the first step consists only in considering this document as an "exploitable document" processed in the next step.

Step 2 consists in distinguishing the different "unitary pages" on the basis of the "exploitable document" obtained in the preceding step. This pagination may be defined directly by the definition of the physical pages, i.e. each recto page and/or each verso page for a document produced from a "material document". If the document is obtained from an "image electronic document", this pagination may also be explicit thanks to the insertion of information or markers identifying a page break. In all cases, pages with no information such as blank pages could be eliminated and not subjected to the processing of the subsequent steps. In the absence of an explicit page definition or a definition leading to an explicit page definition, the pagination could be defined by the definition of a break condition that is conditioned by a particular detection. An "RAD" (automatic document recognition) technique could therefore be applied that creates an implicit page break in each document, optionally complemented by a page break inside each document. This division of pages conforms to what was defined at the time of the encoding in order for the decoding to proceed successfully.

In accordance with particular embodiment of the invention, the definition of pages may be different from what was defined at the encoding stage, the original pagination being redefined following the decoding operation, which in this case makes it possible to retrieve this pagination. In this context, it is therefore possible to defer the definition of the pages if some or all of the encoded characters have been decoded and this decoding alone or in combination with other information obtained from the analysis of the "exploitable document" will enable the definition of pages as defined during the encoding phase. The appearance of a particular encoded sequence in the encoding may therefore define a page break that is effective either on detection of this sequence or on the correlated appearance of a particular superimposed graphic element, upstream or downstream of this sequence.

This may also be the case if the same page includes a plurality of different encodings, as may be the case when citations including their own encoding have been inserted into this page. In this case, the determination of whether the plurality of codes present in the page is normal or not may be deferred and validated by appropriate subsequent processing when the unitary pages will have been really identified.

Step 3 consists in detecting the set of unitary characters of each unitary page if they have been defined in the preceding step or in the whole of the "exploitable document" if this definition is suspended.

To carry out this step, an OCR (optical character recognition) process is effected either by a classic method or by a method specifically adapted to the invention. The aim of this OCR is not to obtain a readable or comprehensible text but to be able to identify each character in order to be able afterwards to detect if the corresponding "unitary character" is encoded and where appropriate what encoding it carries.

If certain characters are not potential supports for encoding, it is therefore not necessary for the OCR applied to identify those characters. Likewise if a plurality of characters have graphics similar to the uppercase letter "O" and the digit "0", the OCR could simply determine that the character is the graphic common to these two character without having to define whether it is the digit or the letter. In this case, if these characters support encoding, to simplify the subsequent steps it might be preferable to use one and the same graphic for these two characters. This means the same graphic for the non-encoded characters and the same graphics for each variant representing the encoding of these characters.

In order to eliminate uncertainties in the recognition of the characters, it is possible, in the classic manner, to run checks on words formed by the characters that have been identified using an appropriate dictionary. It is also possible to effect semantic analyses in order also to remedy recognition uncertainties. There may also be introduced after this OCR step processing for optimizing the strict order relation or relations defined for the analysis of the encoding of the document on characters identified by the OCR.

The corresponding processing example described hereinafter is shown by FIG. 15. Indeed, the preliminary establishing of this relation or these relations on the connex components determining for example unitary lines as well as unitary characters within those unitary lines may cause certain errors in the ordering of the various characters for the subsequent decoding step.

One example is given in the FIG. 15A that is incorporated in diagram 15. Here the first algorithm establishes unitary lines on the basis of the base coordinate of the boxes enclosing the various characters. This example establishes the indices for 6 unitary lines. This configuration may cause errors in that a priori the characters 'p' and 'q' for example should have been ordered in the process of encoding the messages on the same unitary lines as their neighbors. This is the case anyway if the strict order relation cited in the above example is used in which the ordering is given by the coordinates of the center of the occlusion of these characters.

It then appears pertinent to add to this processing step algorithms for merging unitary lines taking account of the results obtained by the classic OCR. This makes it possible afterwards to aggregate correctly the characters that might have caused problems, in this case the 'p' and 'q'. There are finally obtained, as shown in sub-FIG. 15B of FIG. 15, a merging of the unitary lines, the indices no longer running only from 1 to 3, and a re-ordering of the characters within the latter. The description of this example is not limiting on the invention, and merely introduces the fact that it is possible to add one or more processing operations for modifying the results of ordering on the elements analyzed afterwards of additional information obtained in the process of analysis. In the proposed example, this refers to supplementary information of semantic type.

In some alphabets there exist variants of characters formed by adding accents. Thus in the French language, in addition to the lowercase "e" there exist accented variants such as the "é", the "è", the "ê" or the "ë". If the encoding has been effected on the "e" without taking account of the accents, then the OCR should identify only the "e" without taking account of any accents. If among the variants of the same character, such as the accented characters, at least two variants, whether integrating the original character or not, support different encodings, then the OCR should identify the different variants supporting these encodings.

The OCR technique applied could string together some or all of the following steps, which may be executed separately or not in the order indicated or in a different order if that is technically viable:

Seeking the orientation of the page during digitization. The document may have been digitized with an alignment error, i.e. if the "exploitable document" is viewed on a screen, the materialization of a page has undergone a rotation by a non-zero angle relative to the same materialization that could have been effected on the basis of the "conceptual document". This may for example be caused by incorrect positioning by the user when the document is digitized flat on a scanner or poor adjustment of the guides of an automatic scanner, whether the scanner is independent or integrated into a photocopier or a multifunction reproduction device.

Straightening of the page, i.e. applying a rotation opposite that noted during digitization relative to the expected orientation of the "exploitable document". The rotation is effected via an image processing algorithm. The rotation effected on a solid such as is a "material document" in paper form does not produce any distortion in the document in question or at least nothing detectable to the human eye. For rotation of computer images, rotation by even a few degrees potentially leads to a distortion that is often not very noticeable to the human eye but which in the context of the invention can impact on processing performance. Indeed this distortion can impact on the image portion associated with each "unitary character" and lead to additional uncertainty in the recognition thereof, as much in the phase of recognition of the character as such as in the extraction of the associated code if the character is encoded. To avoid or limit this uncertainty:

the straightening may integrate a specific algorithm for limiting this distortion.

the "exploitable document" could not be straightened overall, but the straightening applied instead when the unitary characters are isolated, the optical character recognition (OCR) or code extraction algorithms used on the encoded characters could integrate a correction algorithm taking account of the initial orientation of the page applied either to the page straightened overall or to the unitary characters straightened in isolation, or in the absence of straightening but by integrating the value of the angle into the OCR or code extraction algorithm.

Straightening may also be omitted if the orientation search leads to a document having an inclination angle within a tolerance range. This tolerance range defines intervals with upper and lower bounds on the orientation angle of a document between which the algorithms processing the document are not negatively impacted. In this case, the image is straightened only if the angle detected is outside the tolerance range.

Search for other types of ordinary deformations. The change of orientation is not the only way to add artifacts during the digitization of a document. In the mobile context in particular, the acquisition of a document can introduce other types of geometrical deformations. It must be therefore possible to detect and to correct the modifications introduced into a document by the main geometrical and homological transformations, for example changes of scale, reflections, symmetries and projections before application of each of the OCR. It is therefore possible to apply a first specific correction process before application of the classic OCR and/or another specific process before application of the particular OCR, these two processes being cumulative or not.

One of the correction processes consists in "page cleaning". The digitization operation may cause noise to appear in the "exploitable document" that may impact on the performance of the other operations. Thus if the background of the digitized document is white or considered white, the "exploitable document" could contain noise characterized by gray level or color pixels depending on the choice of quantization, different from the reference used for encoding white, and this noise can conform to a distribution that may or may not be uniform. Likewise the conversion of the image of the document into unitary elements may artificially create noisy spots or clusters of noisy spots that will be considered as information of form, respectively of ground, that can have a non-negligible impact on character recognition (OCR) and/or code extraction performance. In particular, the pixels from the close vicinity of the contours of the characters are important in the calculation of certain characteristics used in the context of the present invention. There exist many algorithms for correcting these noise when reconstituting an image conforming as closely as possible to what is expected, i.e. as faithful as possible to the digitized "material document". Some of these algorithms are applied to the whole of a document, whereas others act locally and therefore in a more targeted manner on specific zones. There also exist hybrid methods combining the advantages of the foregoing two types of approach to respond to particular application requirements. Used too intensively, these noise cleaning processes can cause a loss of information leading to a reduction in character recognition performance and even corrupted code extraction. It is therefore sometimes preferable to retain residual noise on condition that the latter does not interfere too much with subsequent processing steps. It nevertheless appears entirely possible to use these algorithms or any adaptation of them for other processing operations of the present invention in order not to degrade or at least to minimize the impact of degrading character recognition (OCR) and/or code extraction performance.

Figure 12:
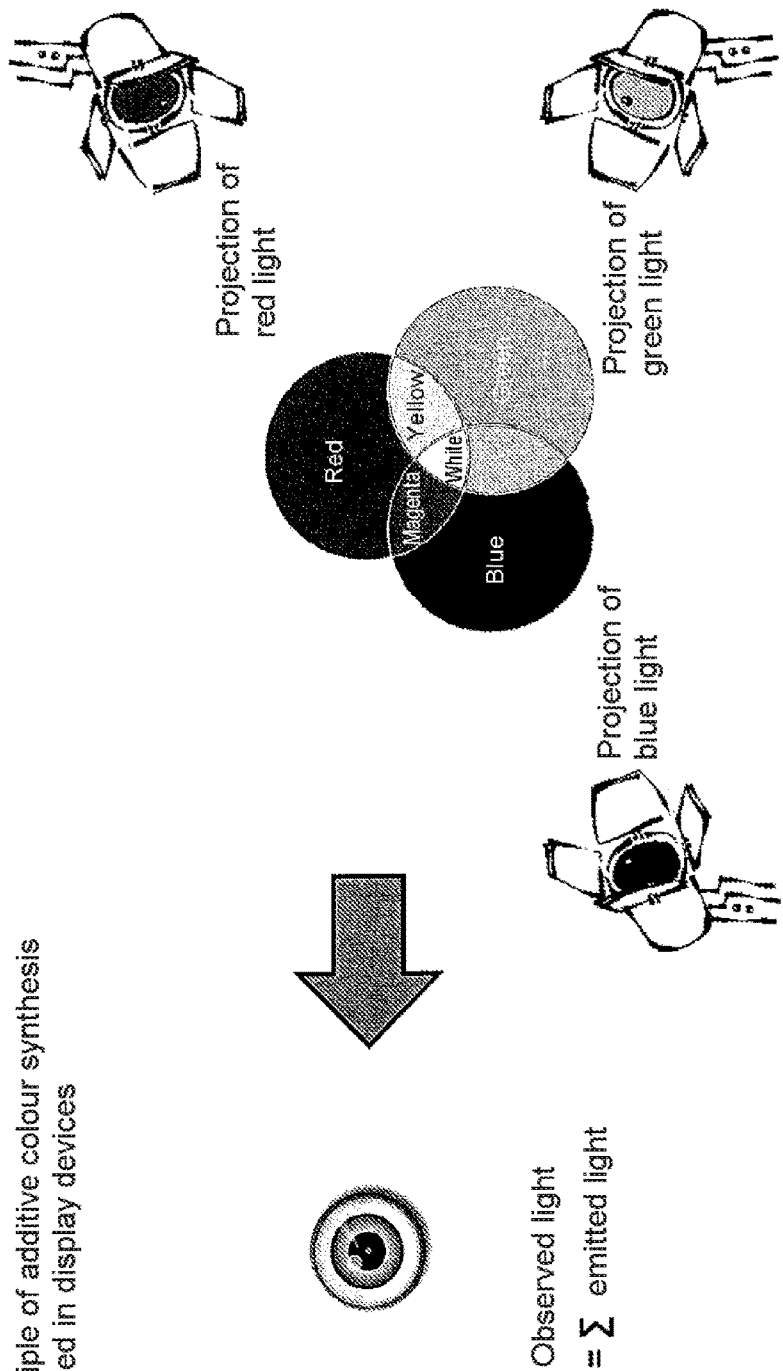
Figure 13:
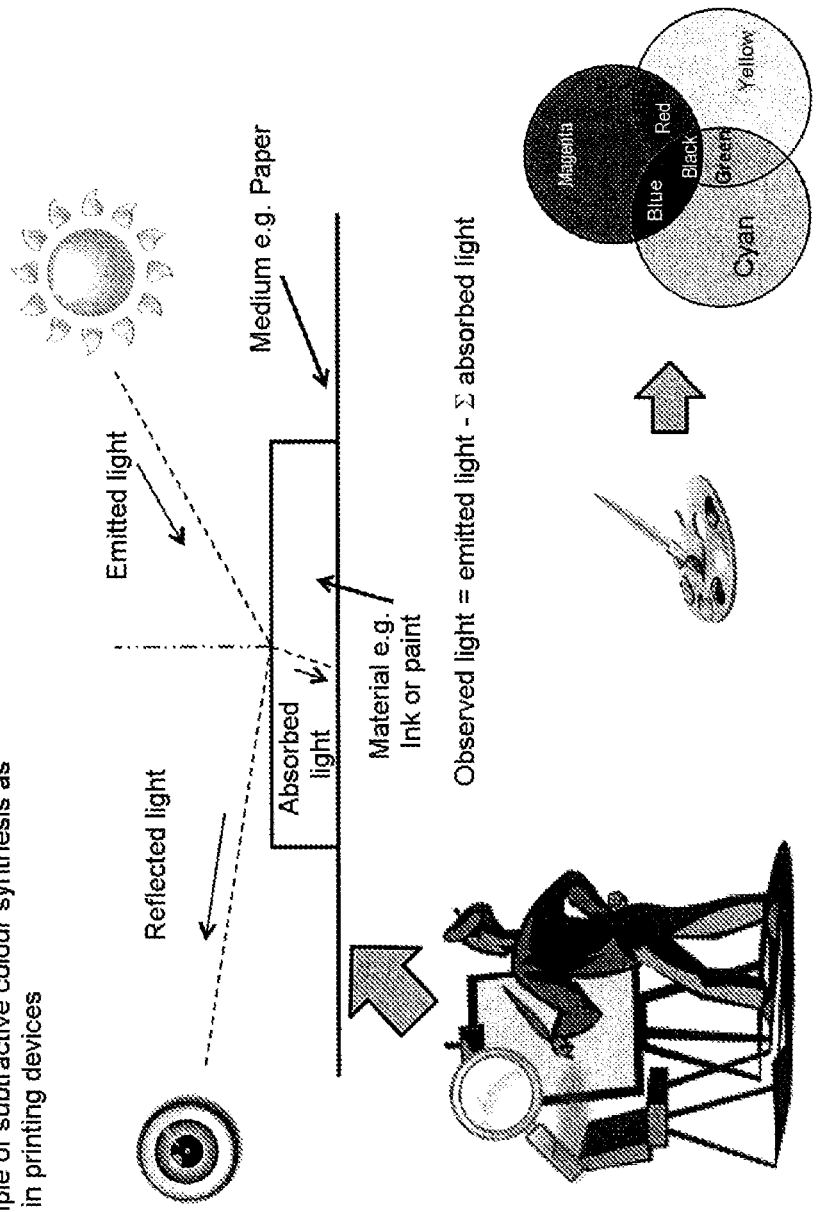

Another of these correction processes is pixelization, on which the mode of transcribing colors may have an impact. The result of digitization is a breakdown into elementary pixels or the like. In binary mode, each pixel is either ground or form, in other words black or white or vice-versa depending on the choices made. If the digitization has been done in grayscale, each pixel has a value that is generally between 0 and 255, for encoding on 8 bits, defining the luminous intensity of the pixel. A pixel may equally represent a color. The color representation space most generally used in computer processing, although other representation choices are possible, is the RGB (red, green, blue) space. In this case a pixel is defined by three values also between 0 and 255 (for 8 bits per channel encoding), for example, each defining the luminous intensity of the pixel on the color channel used in accordance with the additive color synthesis principle. White light is produced by adding a linear combination of red, green and blue light constituting the primary colors of the light spectrum that the human eye is capable of distinguishing. It is necessary to distinguish this formulation of the color, which is used for computer screen type display devices, from that used by printing devices as when going over to media such as paper. FIGS. 12 and 13 illustrate these color addition and subtraction principles applicable either for display on a screen or for printing. Indeed, in the case of paper, the color observed by the human eye no longer corresponds to an addition of the different color channels but to the subtraction of the different wavelengths associated with the pigments of the ink used. This difference of formulation is characterized by the fact that the color associated with a material that does not emit light is caused by the reflection of external light, generally sunlight or artificial lighting, and it absorbs a non-negligible quantity of this light. The eye that looks at the material sees only the reflected part, i.e. the illuminating light less the absorbed light. This is referred to as subtractive color synthesis, as opposed to additive synthesis, and the main primary components are then cyan, magenta and yellow. In order to ensure an equivalence between the colors displayed by display peripherals and the colors printed by printing devices, protocols for the characterization of the set of colors that can be retranscribed by these devices are established for each of them (the term "gamut" is used for this). To have a display device communicate with a printing device and preserve equivalent colors for the human eye, calibration operations are effected using colorimetric probes and gamut profiles of each. There therefore exist matrices for converting from one formalism to the other. It is therefore possible to ensure a relative correspondence between the colors used in a "material document" and their counterparts in the "exploitable document" generated by digitization. There are as many coefficients as colors associated with the digitization phase. This may be an RGB (red, green, blue) breakdown or a CMYB (cyan, magenta, yellow and black) breakdown as specified above but there exist other types of decomposition of colors that may be used as the theoretical formalisms, for example the Lab, Luv, HSV, etc. spaces, or even standardized spaces, for example the color representation spaces used for transmission of TV such as YCrCb spaces or proprietary color spaces such as Adobe's Adobe-RGB or Kodak's ProPhoto-RGB. The subsequent processing may be executed directly on the pixels defined in this way or on redefined pixels. This may in particular be usable in respect of performance issues. For example, to minimize the approximations during the digitization phase, the latter may be effected in grayscale or color (as a general rule, RGB breakdown). The character recognition process and/or the code extraction process may have been optimized to be executed on binary pixels, i.e. either form or ground. To obtain an "exploitable document" respecting this elementary decomposition, a threshold may be applied on the basis of a grayscale image. The pixel could therefore be considered to represent form below a certain value, for example 0 to 25, and ground beyond that value, for example from 26 to 255. Any other threshold value may be applied. This operation is referred to as binarization. Any other binarization method different from one using an overall threshold that can be found in the literature or even specifically defined in the context of digitization is equally applicable, in particular methods using local approaches or even hybrid approaches combining multiple different approaches. Likewise a color image can be converted into a grayscale image by applying a ratio to the different values associated with the elementary colors. Thus if the values R, G, B, are coded form 0 to 255 (8 bits per channel encoding) a coefficient of ⅓ may be applied to each of these values, the sum of the values obtained in this way makes it possible to obtain a gray level value between 0 and 255. Any other coefficient may be applied, whether the sum of these coefficients makes 1 or not. This operation is referred to as color image desaturation by averaging. Any other desaturation method making it possible to go from a color image to a grayscale image is acceptable. It is then possible to apply a binarization process to this grayscale image which therefore makes it possible to obtain an image consisting only of form and ground information.

Decomposition into connex components. In an "exploitable document" that has been pixilated into form and ground elementary pixels, for example black or white, it is possible to identify all the clusters of form points and to inventory them. A cluster of form points is a set of contiguous form pixels, i.e. it is possible to go from one pixel of the cluster to another pixel only by passing through pixels of the cluster. Multiple choices are possible in order to determine the different possible passages from one form pixel to another, and here it is a question of choosing the connexity. The connexity makes it possible to tell if a path exists for going from one pixel to another. In the context of digital images, two pixels may be adjacent but not connex. To simplify our explanation of connexity, see FIG. 14. This is the case for example if 4-connexity is used that defines the pixels at the north, south, east and west locations as neighbors of a central pixel. It is also possible to use 8-connexity which adds to the neighbors of the 4-connexity the north-east, north-west, south-east and south-west pixels as neighbors of the central pixel. These clusters are also referred to as "connex components" because of this concept of connexity. An optional preliminary operation of noise reduction has made it possible to eliminate all the clusters caused by noise. It is possible at this level not to take account of any cluster of form points considered as too small, either because these clusters are considered noise that have been added during the digitization phase but did not form part of the "conceptual document" or because these clusters are too small to be treated as similar to unitary characters. This may be the case of punctuation elements such as the period (".") or the comma (","), as well as certain accentuation elements such as the acute accent (" ") or the grave accent (""). If the encoding of the characters is effected independently of the accent borne by the character, this elimination is of direct benefit. It is possible not to take account of certain clusters that have characteristics such that they cannot correspond to characters; this is the case of structural graphic elements such as lines and tables, for example, images, logos. A first sort linked to the size of the clusters and to certain of their characteristics makes it possible to identify those that can be treated as similar to unitary characters. Some clusters of greater size than a "unitary character" may be retained at this level because they can be associated with character sets that digitization will have merged artificially because too close. The selection of the clusters may take account of the point size of the characters that have to be selected. If the encoding is effected only on 12 point characters, there could therefore be eliminated any cluster that by virtue of its size can correspond only to 14-point or larger characters or 10-point or smaller characters. It is equally possible to eliminate at this level only characters that may correspond to point sizes far from the point size or sizes of fonts that can be encoded and to eliminate the other clusters that may correspond to closer point sizes than in subsequent processing. If only 12-point characters can be encoded, it is possible to eliminate any cluster that may correspond to a 16-point or larger character and to eliminate those corresponding to 13- to 16-point characters in subsequent processing. The resulting clusters are characterized by their enclosing box that enables identification in the page and facilitates establishing a strict order relation.

Application of an OCR (optical character recognition) algorithm to the eligible clusters. This OCR is referred to as "classic OCR" hereinafter. Unlike OCR used to extract a text from a document so as to make it usable by a word processing system, for example, optical character recognition as applied here is not aimed at direct exploitation of the recognized text. It is therefore possible for an English-speaker having no knowledge of any foreign language to apply the method of the invention to a document written in a language other than English and even using an alphabet such as the Greek, Arabic, Hebrew or Asiatic alphabets. Likewise, if the invention is applied to the Latin alphabet, it is possible to effect an encoding using a limited sub-set of characters. It is therefore possible to apply the invention using as encoding symbols only the "a" or only the "a" and the "e" or only any other subset of characters. If only the "a" is liable to support an encoding, the algorithm should therefore only determine if the identified cluster is an "a" or another character, i.e. two possible classes. The number of classes can therefore run from 2 to 26 if limited to only the lowercase letters of the Latin alphabet with no accent, or even 27 if the "other" character is included. This number may be further increased if the panoply of identifiable characters is made larger. Likewise, in contrast to classic OCR, which has to distinguish the uppercase "O" from the digit "0", for example, OCR in the context of the invention could consider that these two characters are one and the same if the encoding variants are considered identical. Any classic OCR system can therefore be applied as well as any OCR system developed specifically in the context of the invention, integrating known technologies or not, and enabling character recognition within the limits acceptable for the invention.

Step 4 consists in establishing the "strict order relation" on the identified characters. On the basis of the results of applying the "classic OCR" in the preceding step, the "strict order relation" is defined on the characters recognized by the preceding "classic OCR" on each identified page or over the whole document. This application may apply only to the characters liable to support an encoding or to a superset of those characters.

After this phase, it is possible to establish a virtual text consisting of the image of each character identified by the OCR phase. There is no obligation for this virtual text to be readable in the usual sense of the term. The signs and special characters associated with this concept of readability such as spaces, punctuation or accents do not necessarily have to be integrated into this virtual text if they do not themselves support encoding. The images representing the clusters that were the subject of the preceding "classic OCR" phase are retained either as they are or in an optimized form in order to support the subsequent phases. These images are referred to as "character vignettes" hereinafter.

In accordance with one particular embodiment of the invention, these "character vignettes" are determined by a specific process independent of the "classic OCR" phase apart from the capacity of association of these "character vignettes" with the "unitary characters" inventoried by the "classic OCR" phase. It is also possible to retain for practical purposes any additional information relating to the clusters that were the subject of the preceding "classic OCR" phase. This is the case but to a lesser extent with characteristics calculated during this phase and that could also be used again in subsequent steps.

Step 5 consists in extracting the code encoded on the "unitary characters". To these "character vignettes" is applied a specific OCR not intended for the recognition of the character itself but making it possible to detect the different variants enabling an encoding as described in the context of the invention. This specific OCR is referred to as "particular OCR" hereinafter.

For each "character vignette" that can support encoding, this new OCR process is applied in order to determine if the "character vignette" processed in this way is a representation of the corresponding character in its non-encoded version or in one of the variants corresponding to an encoding.

If the "character vignette" was determined in the "classic OCR" phase to be a lowercase "a" and the lowercase "a" is associated with 4 encoded variants, the present "particular OCR" phase makes it possible to determine if this is a non-encoded "a" or if this is the variant corresponding to the binary value (0,0) or (0,1) or (1,0) or (1,1).

In this case, the "a" and its four variants are considered as 5 different characters and the "particular OCR" is limited to the classification of the "a" among these 5 characters.

The "particular OCR" applied is specific to the "a", i.e. if another character, for example the lowercase "e" is associated with encoded variants, another "particular OCR" specific to the lowercase "e" is applied to it. There are therefore potentially as many "particular OCR" as different characters able to support an encoding.

In accordance with one particular embodiment, some or all of these "particular OCR" may be grouped through an overall "particular OCR" that is integrated or not with the "classic OCR" (which recognizes the characters independently of any encoding that these characters may encode); this OCR is referred to as "global particular OCR" hereinafter.

If at least one "global particular OCR" is defined, there may therefore be one or more "global particular OCR" that can co-exist or not with one or more non-global "particular OCR". In all cases, if a character supporting an encoding is recognized by a global or non-global "particular OCR", this supplies information compatible with computer data management. If the encoded character includes four variants, the result of these steps is the definition of two information bits. Any representation of data other than the classic binary representation is equally viable on condition that this data can be exploited by a computer.

The data deduced in this way from the exploitation of the "particular OCR" and/or the "global particular OCR" enable reconstitution of the encoded messages:

Compilation of the extracted information. The data supplied by decoding each character is compiled in order to supply a global data chain either for each identified page or for the processed document, and the compilation complies with the "strict order relation" of the encoded characters in the page or the document as determined beforehand. Thus if four characters are encoded and their order has been established by the determination of the "strict order relation", each of these characters encoding 2 bits, the complete decoding of these four characters supplies one byte in a classic data coding situation. On the same basis, a page or a document that contains around 4000 encodable characters with four variants for each encodable character makes it possible after decoding to define around one kilobyte of information the extraction of the usable portion of which is as defined hereinafter.

Extraction of the usable information. This usable information has been encoded in one or more "unitary encodings":

The "unitary encodings" are identified at the time of decoding by identification of the header or the like of these "unitary encodings", if these elements exist, as well as the termination of these "unitary encodings", whether defined implicitly or explicitly. If other structural information usable for decoding the usable information is encoded, it could be decoded at this level in order to facilitate the other decoding operations. There may be multiple distinct "unitary encodings" in the same page or the same document and likewise the same unitary encoding may be encoded more than once in the same page or the same document.

If an encryption was defined at the time of encoding, a decryption is applied at the time of decoding either before the identification of the "unitary encodings" or afterwards, depending on the nature of the encryption. Decryption may necessitate the knowledge of a specific key that is accessible to the decoding module in ways to be defined by the designer of the system. This key may also be defined or completed by the user who implicitly or explicitly activates the decoding of the "exploitable document".

If a plurality of "unitary encodings" is defined, each "unitary encoding" is possibly identified via the decoding of an index or the like inserted into the "unitary encoding" enabling its identification. The encoding of the usable information may be correlated with this identification. For example, the encoding of the usable part could use a different algorithm if the latter encodes alphanumeric information or a number, likewise the encoding structure of the usable part could differ according to whether the length of the usable information is fixed or variable. In particular, this concept may impact on the definition of the termination of the corresponding "unitary encoding". In accordance with one particular embodiment of the invention, the index is materialized by the sequencing of the unitary encodings. If there are 3 different "unitary encodings" per page and this number 3 is known at the time of decoding, the first "unitary encoding" found in the page will therefore correspond to that with index 1, the second to that with index 2 and the third to that with index 3. In the event of redundancy in this embodiment, the "unitary encodings" of order 3N+1 where N is an integer correspond to the "unitary encoding" of index 1, those of order 3N+2 to those of index 2 and those of order 3N to those of index 3. It is also possible to apply the same principle if the number of "unitary encodings" is other than 3 and the order of appearance of each "unitary encoding" is more complex. It is for example possible to have a particular "unitary encoding" appear twice as often as the other "unitary encodings" and produce a sequence of type 1, 2, 1, 3, 1, 2, 1, 3 and so on.

This organization of the information into a plurality of sub-sequences is distinct from and independent of the concurrent presence of a plurality of codes in the same page resulting for example from the insertion of citations each having its own encoding. In the case of sub-sequences, the different sub-sequences are produced by the decomposition of the same global information, complex or not, or of a set of interdependent information, whereas in the case of inserted citations the encodings can be independent of one another. Any combination of these two types can be envisaged; it is possible for a plurality of independent encodings to co-exist in the same unitary page, some or all of these independent encodings being reliant on a coding of subsequence form.

If a hashing key is inserted, it is identified and checked. If the check on this key depends on information that is not available at the time of decoding, this hashing key may be stored for subsequent checking. The usable information of the "unitary encoding" can be validated, invalidated or corrected after processing the hashing key. This processing is equally valid if the hashing is limited to the insertion of CRC type information.

If information redundancy is defined for a "unitary encoding", a diagnosis is effected on this redundancy. For example, if the same "unitary encoding" is inserted at least N times into a page, the message will therefore be considered valid if at least P messages are decoded successfully where P can take a value from 1 to N. In accordance with one particular embodiment, even if none of the N messages is decoded correctly or if a number of messages less than P is decoded correctly, the message could be considered valid if it can be reconstructed in a manner deemed sufficiently reliable by an appropriate algorithm from some or all of the N decoded occurrences, whether the decoding of each of these occurrences is valid or not.

Step 6 consists in establishing a diagnosis on the exploitation of the encoding. If this is necessary for the current operation on the "exploitable document", this diagnosis conditions this operation; otherwise, this diagnosis conditions the complementary options depending on the encoded code. This diagnosis is effected as a function of the different diagnoses effected during the preceding step on the decoded usable information, on the level of confidence associated with this decoding either partially, or globally. If this is dependent on the code extracted in the preceding steps, the diagnosis can authorize the processing to continue completely or partially or prohibit it or chain to a new attempt at decoding, whether the latter involves a new digitization or not.

If the different "unitary encodings" encode both necessary information and optional information, the diagnosis could have been defined as a function of the reality of the decoded information. If in the context of an authentication process the reference of the document is necessary information and the date the document was issued is optional information, the operation could therefore be aborted if the reference is not decoded in a satisfactory manner and the process that is in progress aims to obtain an authenticated copy. It could for example continue if the current process aims only to display the document with the optional display of the information encoded in accordance with the invention.

Figure 2A:
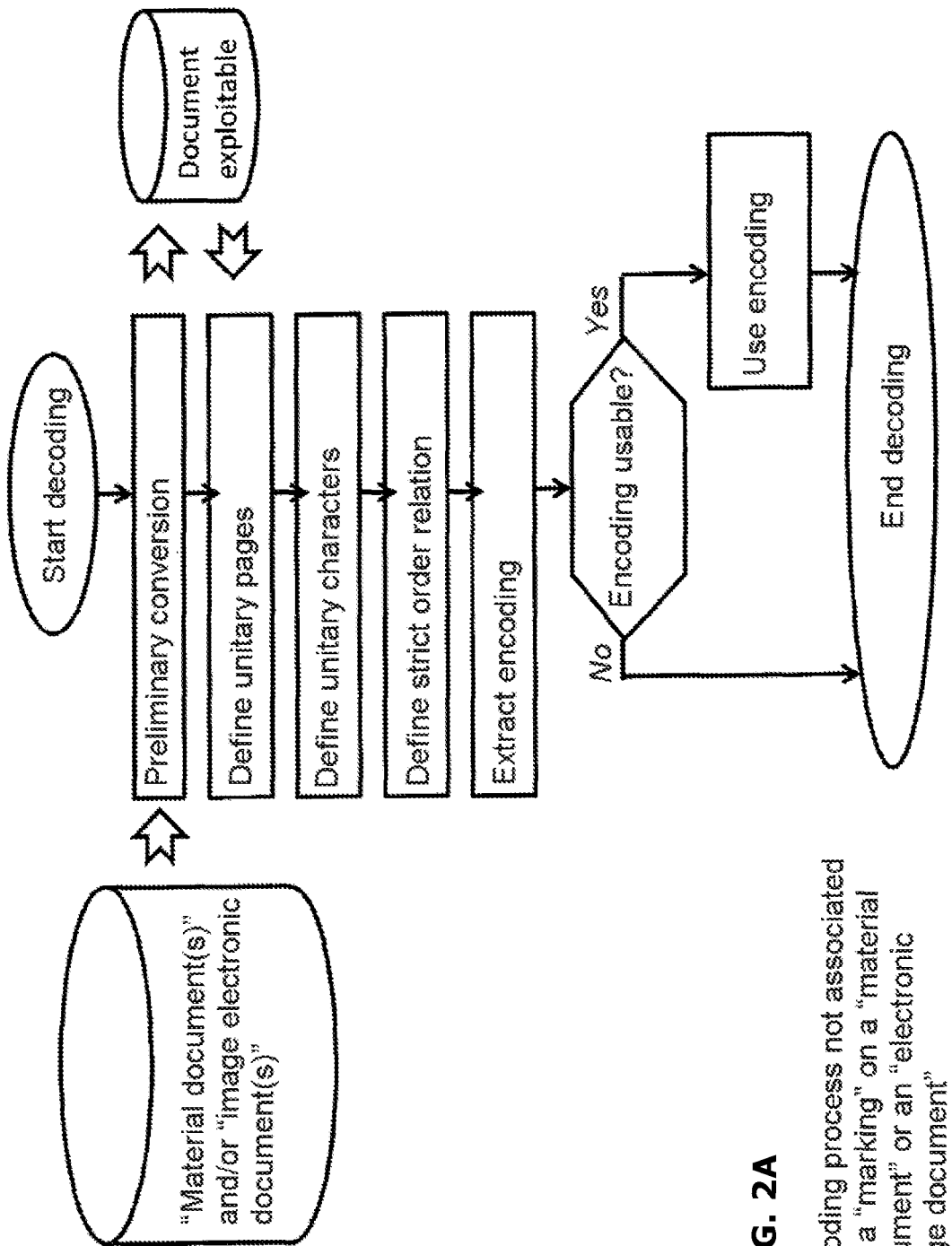
FIGS. 2A to 2D show different ways of decoding a document that has been encoded in the context of the invention. This decoding may be activated as soon as a document is subjected to a reproduction process and activated either by a specific action of the holder of the document or the person who has to use it.
Figure 2B:
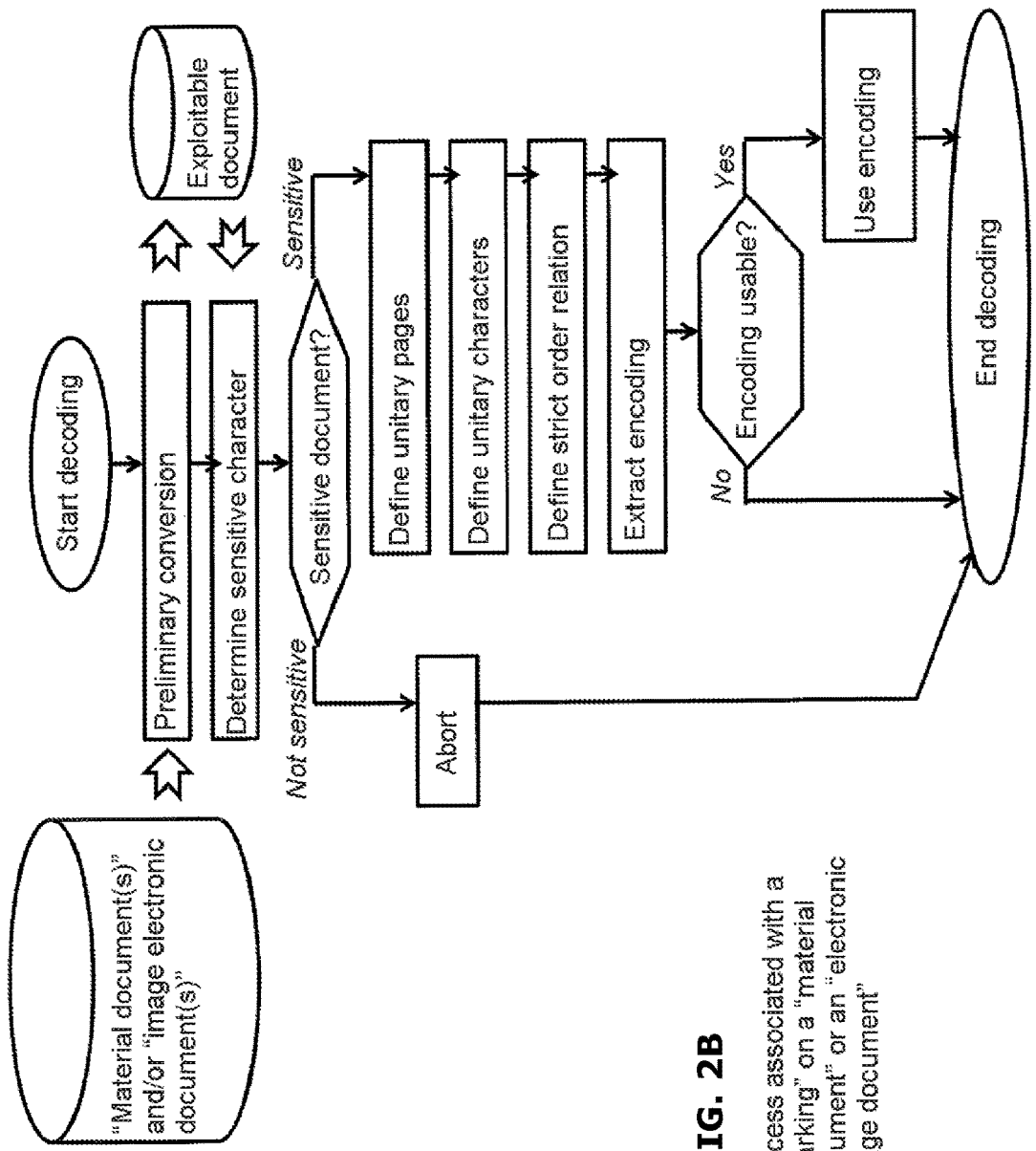

FIG. 2B illustrates the process of decoding a document encoded in the context of the invention coupled with the integration of a "marking" when the document is either a "material document" or an "image electronic document". The description of this figure is limited to the differences between this process and that characterized by FIG. 2A, which explains an identical process but one that is not coupled to the integration of a marking.

The first step consisting in converting the document to be decoded into an "exploitable document" remains unchanged compared to the process described with reference to FIG.

2A. However, the latter may stem from a digitization operation following on from a request for reproduction such as photocopying without there being an explicit authentication request. In this case the search for the "marking" is systematic on any reproduction request and the decoding operation is effected only if this search succeeds.

Following this step, there is a search for any marking on each page of the document. If the encoding is coupled to a marking, the encoding serves as rules defining the restrictions and rules for reproduction of the document, in particular in the case of identification of the authenticatable nature of a document.

The proposed encoding is indeed a graphic element corresponding to the definition of the rules. The marking may be defined by some other graphic element such as a list of points or a particular frame. In this case, the processing linked to the detection and extraction of an encoding are effected only if the detection of the "marking" is positive; otherwise, the document is considered classic and there are no searches for any coded characters and extraction of the corresponding code. If this search for a marking is effected within a process that can be applied only to sensitive documents, this process is aborted with the possible communication of a diagnosis to the overall process or to the user. This is the case for example if this search is effected on a document with a view to obtaining an authenticated copy that can be obtained only from an authenticatable copy considered a "sensitive document".

In accordance with one particular embodiment of the invention, the presence of a minimum number of character variants as defined in the present patent and encoding a value may also serve as marking, uniquely through its presence and not through the coded value. For example, if more than 10 coded characters are detected, that is to say character variants intended to code a value, for example in the case of four variants intended to code one of the binary values (0,0), (0,1), (1,0) or (1,1), then the page concerned will be deemed to possess a marking independently of the value coded by these characters and the possible consistency of a decoding of these values. The document will in this case be considered "sensitive" and otherwise the document will be considered classic. In this case, diagram 2B must be adapted in order for the split between a (non-sensitive) classic document and a sensitive document to be effected after the identification of the encoded character variants, which corresponds to the fifth step of diagram 2A. In this case, for optimization reasons, this step can be adapted in order for the counting of any character variants supporting encoding to be done before decoding as such.

Figure 2C:
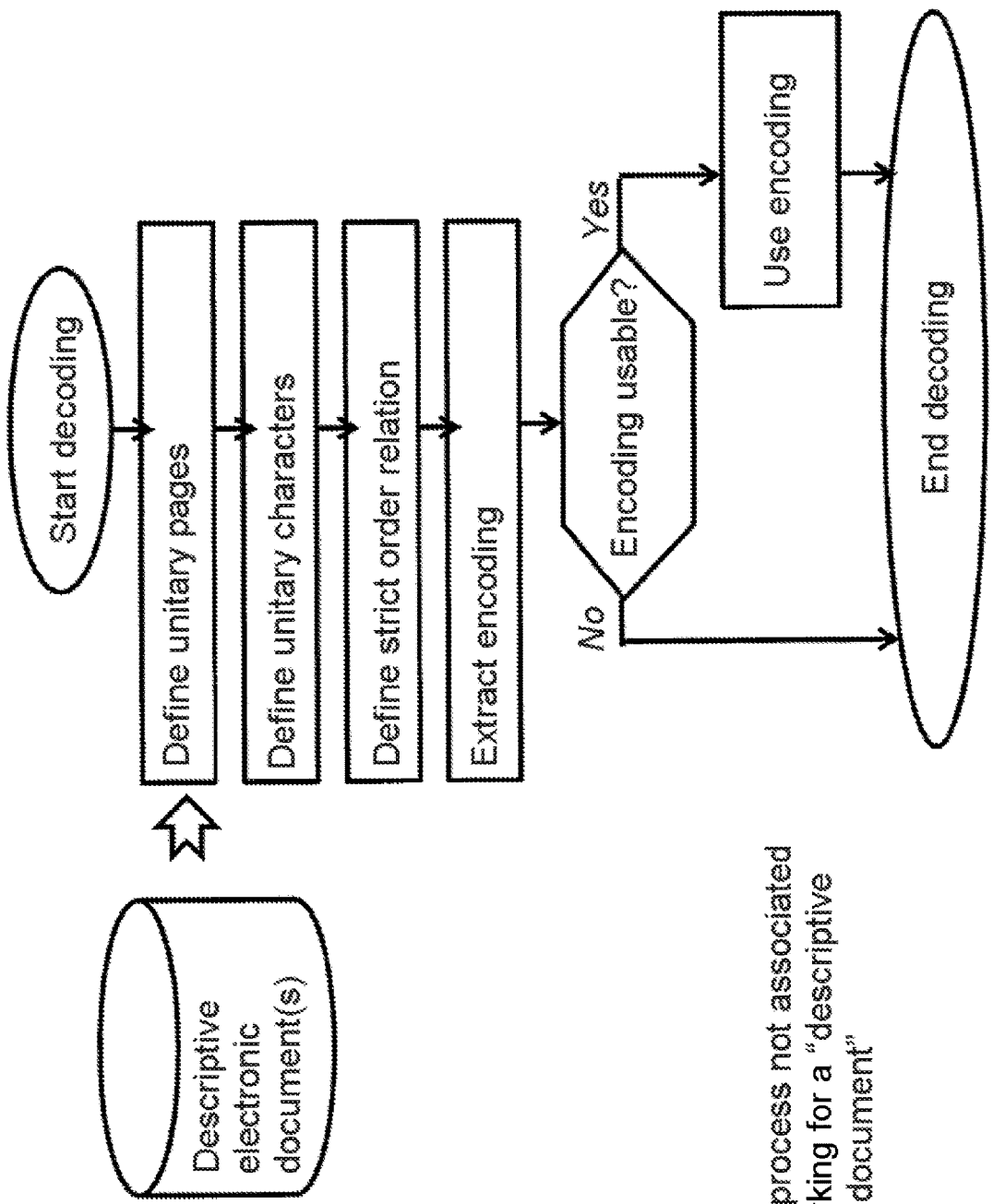

FIG. 2C shows the process of decoding a document encoded in the context of the invention coupled with the integration of a "marking" when the document is a "descriptive electronic document". The description of this figure is limited to the differences between this process and that characterized by FIG. 2A, which explains an identical process applied to a "material document" or to an "image electronic document".

In this context, this document is already an "exploitable document" and step 1 of FIG. 2A is not carried over.

Step 2 consists in the identification of the pages by a direct analysis of the "descriptive electronic document". In most formats of these files, the pagination is clearly defined, for example by the insertion of "NP" (new page) type commands or other elements defining a break or the initialization of a new page easily identifiable by an elementary search. In some cases, for example in old file formats, the page is defined by a line capacity and in this case the pagination is defined indirectly by counting lines. In some cases, the pagination is determined only on conversion into a "material document", and the pagination can in fact depend on printing parameters such as the definition of the technical margins of the printer. In all cases, the decoding process is effected separately on each page if this is possible or on the overall document otherwise or if the absence of definition of pagination at this level is not incompatible with subsequent processing. This may be the case if the decoding of the "unitary encodings" implicitly or explicitly makes it possible to define this pagination, for example.

Step 3 consists in effecting the inventory of the encoded characters. Using the "descriptive electronic document" makes it possible to select directly the characters bearing an encoding because these characters use one or more fonts specific to the implementation of the invention and the information indicating the font associated with a character is easily accessible either explicitly by a direct reference to the font associated with the definition of the character or implicitly. One case of implicit definition is for example looking up the last font referenced before the definition of the character. It is then possible to determine if a character is encoded by the position defined in the font or even directly by the definition of the font used. This determination also makes it possible to determine the code borne by the character.

Step 4 consists in establishing the "strict order relation". This can in some cases be determined simply: the order of appearance of the encoded characters in the "descriptive electronic document" establishing a de facto order relation, which is the case for example in most ".txt" or ".doc" type files when among other things there is no page header or footer definition and there is no definition of multiple columns.

In some cases, the order of appearance of the characters is not equivalent to an order relation. Numerous formats in fact make it possible to fill the page in a free order: for example, it is possible to define a text first before locating it at the bottom of the page and then a text top right and then a text middle left. In this case, it is necessary to redefine the absolute positioning of each character in the page and to retrieve the "strict order relation" as defined at the time of creating the document by defining a system of axes conforming to what was used at the time of creation, for example.

Step 5 is the same as that described in relation to FIG. 2A with the simplification resulting from the fact that the encoding associated with each character can have been determined already or can be determined by identification of the font used and/or the position of the character in the font. This direct determination of the encoding replaces having recourse to one or more "particular OCR".

Step 6 is identical to what has been defined for FIG. 2A. However, the decoded message may not be erroneous because of a recognition uncertainty because the principal information is readable directly. A diagnosis can nevertheless be defined if the decoding operation leads to suspicion as to the integrity of the "descriptive electronic document" being processed (that the latter may have suffered accidental damage or as a result of an alteration attempted by a third party).

Figure 2D:
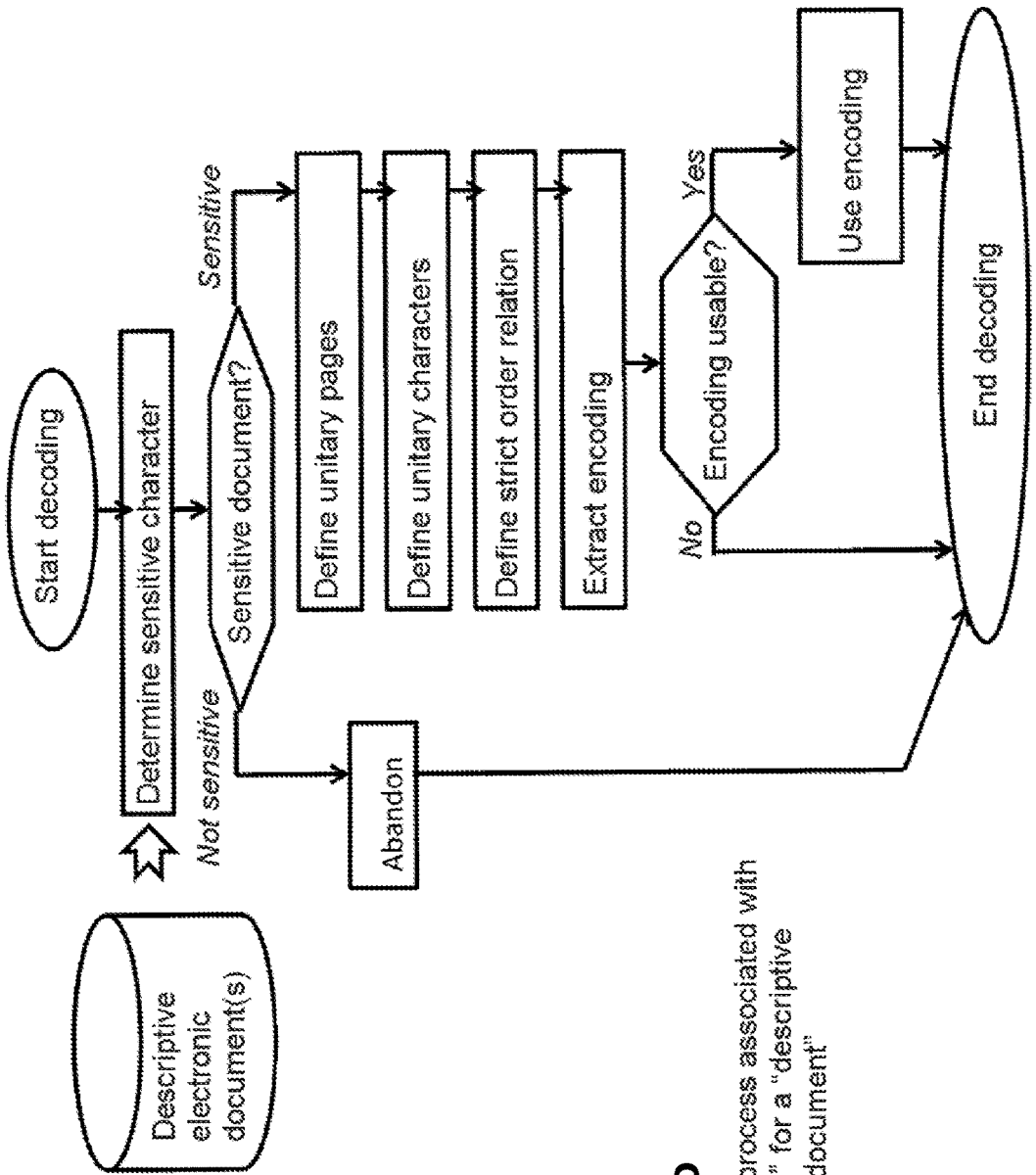

FIG. 2D shows the process of decoding a document encoded in the context of the invention coupled to the integration of a "marking" when the document is a "descriptive electronic document". The description of this figure is limited to the differences between this process and that characterized by FIG. 2C, which explains an identical process but one that is not coupled to the integration of a marking.

In the case of FIG. 2C, there was no definition of step 1. The search for the "marking" is therefore effected upstream of the step 2, thus constituting a new step 1, or simultaneously with this step 2.

For this step or in addition to this step, there is a search for any marking on each page of the document. If the encoding is coupled to a marking, the encoding serves as rules defining the restrictions and rules on reproduction of the document, in particular in the case of identification of the authenticable nature of a document.

The proposed encoding is indeed a graphic element corresponding to the definition of the rules when the document is converted into a "material document". The marking may be defined by another graphic element such as a list of points or a particular frame, and these graphic elements are nevertheless often defined descriptively in a "descriptive electronic file", which facilitates their detection.

In this case, the processing linked to the detection and extraction of an encoding is effected only if the detection of the "marking" is positive; otherwise, the document is considered classic and there is no search for any coded characters and corresponding code extraction. If this search for a marking is effected within a process that can be effected only on sensitive documents, this process is aborted with the possibility of communication of a diagnosis to the overall process or the user. For example, this is the case if this search is effected on a document with a view to obtaining an authenticated copy that can be obtained only from an authenticatable copy considered a "sensitive document".

In accordance with one particular embodiment of the invention, the presence of a minimum number of character variants as defined in the present patent and encoding a value may also serve as marking, uniquely by virtue of its presence and not by virtue of the coded value.

For example, if more than 10 coded characters are detected, i.e. character variants intended to code a value, for example in the case of four variants intended for coding one of the binary values (0,0), (0,1), (1,0) or (1,1), then the page concerned will be deemed to have a marking independently of the value coded by these characters and the possible consistency of a decoding of these values.

The document will then be considered "sensitive" and otherwise the document will be considered classic. In this case, FIG. 2D can be adapted in order for the split between a (non-sensitive) classic document and a sensitive document to be effected after the identification of the encoded character variants, which corresponds to the fifth step of FIG. 2C. For optimization reasons, this step can in this case itself be adapted in order for the counting of any character variants supporting encoding to be effected before the decoding as such.

FIG. 3 provides an example of a character set supporting an encoding in accordance with the invention.

The corresponding table comprises 5 columns. In the first column are represented characters as classically defined in a font such as the "Times New Roman" font. Thus there are represented the characters lowercase "a", lowercase "b", lowercase "e" and the digit "4". The encoding may bear on this character set as well as on any other character set with the use of some or all of the characters of a font whether these characters were defined specifically for the invention or not.

Also defined are four other columns headed "character coding 0", "character coding 1", "character coding 2", "character coding 3". The table gives in these columns characters that encode the value 0, the value 1, the value 2 or the value 3. In each of these columns are represented variants of the characters encoding the designated value of each column. Each of these characters is a variant of the corresponding non-encoded characters appearing in the first column of the same row. The different character variants provided in the 4 right-hand columns of the table are easily recognizable visually. It is possible to define variants less detectable to the eye by defining appropriate characteristics for the determination of the "particular OCR" responsible for identifying the different variants.

The number of variants, 4 in this case, is the optimum for encoding sufficient information and for ensuring good quality of detection of the different variants of a character by the particular OCR without sacrificing the esthetics of these variants compared to the original character. This number is recommended but is not imposed. This number is practical because it makes it possible to encode the equivalent of 2 information bits.

However, it is not necessary to define a power of 2 as the number of variants; it is possible to define any number starting from 2. However, too high a number would make the detection of the different variants by the "particular OCR" already described more difficult or would excessively deform the different character variants in order to make possible the detection of the latter by the "particular OCR", which would degrade the esthetics of the documents created in the context of the invention.

In a classic embodiment of the invention, at least two variants are necessary for the same character, because a single variant would make it possible to encode only the value "0" and would therefore make impossible, even by accumulation of these variants, encoding an exploitable computer value except to define computer values conditioned by the sequencing of the appearance of these characters.

In one particular embodiment of the invention, the non-modified character may be considered as bearing the code 0 so that the first variant bears the value 1 and so on if other variants have been defined. In this case, the definition of a single variant may suffice. This embodiment imposes either that all the encodable characters necessarily bear a value or that the encodable and encoded characters are identifiable during the decoding phase.

It is therefore possible to define that some parts of the document are necessarily encoded, for example. Likewise it is possible to define certain portions of the text via geographical definitions within the document or organizational definitions: phrase or word of a certain typology. It is also possible to define the eligible characters via relative positions.

Some or all of the subsequent characters or the characters that are defined via a remarkable element of the document or a remarkable text portion can determine the message to be decoded. If a "marking" is provided in the document, this "marking" can therefore also serve to define an origin point for the definition of an encoding and thereby to make it possible to determine the first character of a message, whether that character is included in the usable part or the structural part of the message. All these particular embodiments defined for the situation in which the non-modified carrier also bears an encoded value are applicable to the global case in which the non-modified carrier does not bear an encoded value.

The number of variants per character may be the same for each character or adapted for each character whether this number of variants includes the non-modified character or not. This number may be defined both as a function of the character and of the point size of the font. It can also depend on the density of the characters in a page.

In fact for encoding a page it is necessary to include a certain volume of information.

If the number of characters on the page is high, a limited number of variants may suffice for encoding the page, including taking account of the structural portions of the messages to be included and their redundancy.

If on the other hand the number of characters on the page is relatively low, it may then be necessary to define a greater number of variants in order to be sure of being able to encode the page with the minimum characteristics required for the structural portion of the messages and/or the required minimum redundancy.

This choice may be made even if it has a negative impact on the quality of decoding or even its execution, in particular on the effective rate of decoding the messages and/or the corresponding level of confidence.

If the number of variants used per character can be defined as a function of the encoded page, the decoding operation must include a phase of detection of this number by searching for either an explicit definition or an implicit definition. The explicit definition may have been added during the encoding phase either by adding an appropriate graphic element or by a detectable alteration when it is a question of producing a document in "material document" or "image electronic document" form.

In the case of a "descriptive electronic document", this definition can also be done through appropriate positioning of the computer components of this document. The implicit definition could be retrieved during the decoding phase on the basis of statistical elements of the page such as the number of characters that constitute it, this determination being limited to characters having certain characteristics such as the point size, for example.

Without this being exhaustive, to determine the implicit definition, account may also be taken of some or all of the following elements: the potential encoding power of the characters eligible to support an encoding, depending on the point size or not, the arrangement of the characters, the determination of the document production quality, for example the resolution for a "material document", the color or grayscale characteristics or binarization quality, the presence or absence of complementary graphic elements such as a background or images, and generally speaking any element making it possible to redefine the choice made at the time of encoding concerning the number of variants per character, whether this number depends or not on the characters eligible to support an encoding.

When the "particular OCR" that must detect the variants of the same character is defined on the basis of a set of characteristics of the character, an algorithm can be defined to obtain the different variants of the character that are most pertinent for an appropriate detection.

This algorithm will depend on the classification strategy used afterwards in the steps of analyzing the characters. This algorithm could equally be iterative, i.e. a certain number of elementary modifications could be defined whether those modifications are of absolute type or depend on parameters.

A modification is of absolute type when there is no parameter to enable it to be modulated. For example, one modification of absolute type is a rotation of the character by 0.1 degree in the anticlockwise direction. A modification depending on parameters is for example a rotation of the character for which the angle and possibly the direction must be defined.

Any elementary modification must enable a significant change to be brought about in the characteristics vector defined to distinguish the different character variants from one another. On the basis of a set of character variants obtained in the step P of the iterative processing, there is therefore calculated a measurement of distance or a criterion of separation between the characters obtained in the N-dimensional space of the N characteristics retained, i.e. the original character and its variants, or any equivalent information.

This measurement must enable classification between multiple samples by way of a classifier whether of the k-nearest neighbor (KNN), SVM or neural network form or of some other type. A quality criterion is defined for this set on the basis of the measured distances or their equivalents.

In this context the particular OCR used to enable the recognition of the different variants is therefore an "OCR using a statistical classification method".

Based on this position, each elementary modification that has been defined as being available is applied. In the set obtained for each of the elementary modifications applied independently to the set resulting from the step P, the distance or its equivalent is measured over the new set obtained made up of the original character and its new variants. The best quality criterion is sought deduced from the distances defining each set obtained, that from the step N and those from the step N+1.

The set corresponding to the best quality criterion serves as reference for the step N+1. If this set is equivalent to that of the step N, either because it is calculated from the set of the step N or from a set of the step N+1 but with a difference at the level of the quality criterion deemed insufficient, the iterative process stops and the set obtained in the step N is considered the definitive set obtained by the iterative process.

In addition to the quality criterion, it is possible to define a graphic acceptability criterion. This criterion determines that the set obtained cannot be retained because it is visually unsatisfactory in accordance with any objective or subjective criterion to be defined. If this criterion is defined by a human, the iterative process is reinitialized and restarted with parameter settings that avoid converging toward the rejected set.

If the criterion is defined by a computer, the iterative process is adapted to reject sets that do not satisfy this criterion.

If the set obtained by the iterative process is unsatisfactory for any subjective or objective reason after what is explained above has been done, the set of characteristics can be adapted by modification of old characteristics, by elimination of old characteristics, by addition of new characteristics or by a combination of these possibilities.

The iterative process can therefore be restarted on this new set of characteristics. The iterative process can equally be adapted to define an additional level of iteration on the definition of the characteristics, primarily when the latter can be adapted by a computer mechanism.

FIG. 4 shows the method of encoding values by using the character variants. The table shown in this figure gives examples of encoding when the characters encoded constantly have 4 variants. It is possible to define an encoding on the same principle as that which this figure explains or any other number N of variants. It is equally possible to effect a satisfactory encoding even if the encodable characters have non-identical numbers of variants. For example, if it is necessary to encode bytes, i.e. entities of 8 bits, or 256 values from 0 to 255, it is possible to initialize an encoding on a first identified encodable character and continuing on the subsequent encodable characters until this potential of 256 values is obtained.

For example, the word "immature" can therefore encode up to 2×6×6×4×3×4×2×4 values, i.e. 27648 values, if the number of variants per character is as follows:
2 variants for the "i",
6 variants for the "m",
4 variants for the "a",
3 variants for the "t",
4 variants for the "u",
2 variants for the "r",
4 variants for the "e".

To obtain a byte, the first 4 letters are sufficient because they enable encoding of up to 288 values which is more than the 256 values of a byte. The encoding of a first byte can therefore start on the "i" and end on the "a", the encoding of the second can then start on the "t"; the last four letters of the word, i.e. the character string "ture" enabling encoding of only 96 values, it will be necessary to continue the encoding on the subsequent encodable characters. A letter that has 3 variants will suffice to complete the byte.

It is mathematically possible to define that the encoding of a byte can start on the same character as that which terminated the encoding of the next byte. This is above all possible if the character can encode a large number of values. This can be done simply, for example if the character encodes at least 4 values and the preceding byte necessitates only one bit for encoding it, which makes it possible to have at least one bit available for initializing the next byte.

Another method consists in using the total power of the encoding and defining the bytes formed by a polynomial calculation of successive powers of 256 if these are bytes that are encoded or any other value such as 26 for example if the requirement is to encode only the characters of the alphabet with no concept of uppercase/lowercase.

If the number of variants is fixed, it is possible to define a unitary encoding via a constant number of encoded characters. For example, if each character has four variants it is possible to associate with each pair of encoded characters a value from 1 to 16 (or from 0 to 15). In this case the first character encodes two bits and the second also two bits.

In the table in FIG. 4, there is therefore indicated in the first column the variant used for the first character and in the second column that of the second character of the pair. The first variant of one or the other therefore encodes the binary value (0,0), the second (0,1), the third (1,0) and the fourth (1,1). In this example, the first character encoding the more significant bits and the second the less significant bits in accordance with the big endian principle already referred to hereinabove, there is obtained the binary value represented in column 3. It is of course possible to reverse the role of the characters. This also supplies the value encoded to base 16 that appears in column 4.

To enable reliable decoding, it may be necessary to reserve certain sequences of bits for structural elements of the encoding such as the header that enables identification of the start of coding of a unitary message. For this, it may be beneficial to prohibit certain binary values such as the quadruplet (0,0,0,0) in the portion of the message outside the header. By excluding other combinations of values such as (0,0,0,1) and/or (1,0,0,0) it is possible to increase the reliability of the encoding and more easily to avoid false header coding in the body of the message.

In this context, it is possible to define a usable encoding to a base lower than 16 which is the maximum power available in this case. One column of FIG. 4 therefore describes an encoding to base 15, and two others to base 14 and to base 13, and, finally, a final column to base 10; these examples are not exhaustive.

Likewise it is possible to define an encoding on a combination including another number of characters; coding on 3 characters enables coding of 64 values and on 4 characters coding of 256 values, equivalent to one byte. A message possibly containing multiple portions, including within the structural portion and/or the usable portion, it is possible to adapt the coding to these different portions each of which will be coded on an appropriate number of characters, the encoding supported for the same character as described above being shared over two successive encodings.

FIGS. 5 show different possible structures of messages in the context of supporting the encoding that is the subject of the invention but are not exhaustive.

Figure 5A:
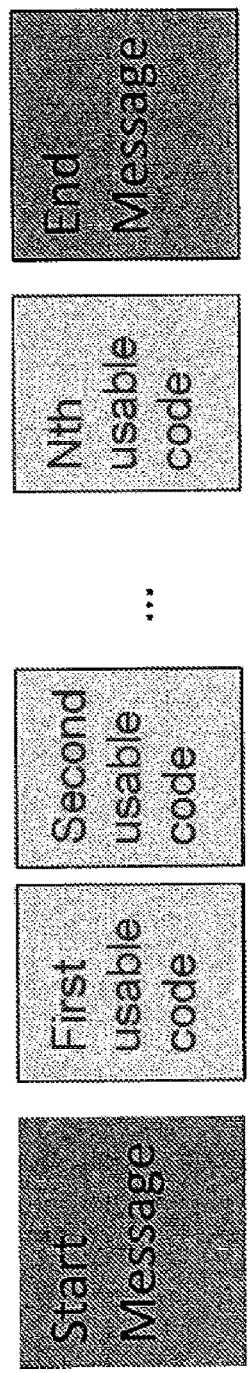

FIG. 5A shows a first message structure for which the usable part is constituted of N usable codes, each usable code corresponding to an exploitable computer data structure such as a byte or a set of bits when using a binary data description system. It is possible to use non-classic data representation systems such as a definition to base 3 as well as any system enabling the encoding of information.

As a function of what has been defined above, one of the preferred modes of the invention is to use pairs of characters each having 4 variants and in this case each usable code is a value from 0 to 15.

It is equally possible to use all the combinations of characters already described or that can be deduced from them. If each usable code is defined by a pair of characters that potentially encodes a value from 0 to 15, the message contains N of these codes. The unitary message is initialized by a specific "start message" sequence that enables the decoding phase to detect the start of a unitary message. A specific "end message" sequence is defined for terminating the message, its detection during the decoding phase enabling identification of the end of the message that is being decoded.

There could be used for the "start message" and "end message" sequences codes of exactly the same length as the usable codes used for the body of the message or different lengths. The unitary usable code is therefore made up of two characters that encode a value from 0 to 15, and a specific value from 0 to 15 could equally serve as "start message" or "end message". If the value 0 is used as "start message" and the value 15 as "end message", it will be possible to avoid using these values in the usable part in order to optimize the recognition of these "start message" and "end message" structural portions.

Based on FIG. 4 and the column that defines a definition to base 10, the coding to base 10 using codes that include at most only one binary "0" at the most significant end and at most 2 binary "0" at the less significant end, it is possible to have 4 consecutive binary "0" in the usable part of the message unless there is a reading error. In this case this enables the "start message" defined by this quadruplet of 4 consecutive "0" to have a more discriminating role and to facilitate decoding. The fact of using an "end message" that is not used in the usable message portion also makes it possible to have a variable number N of usable codes because the usable portion stops when the "end message" is found.

Decoding is based on character recognition technologies and may be of limited reliability. It may therefore prove necessary to be able during decoding to verify that the code read is valid or at least that there is a high probability that the read data is valid. For this, in FIG. 5B, a CRC is added compared to FIG. 5A. The decoding process is similar to that adopted for FIG. 5A in which the "start message" and "end message" structural data is identified, enabling identification of N usable codes.

Figure 5B:
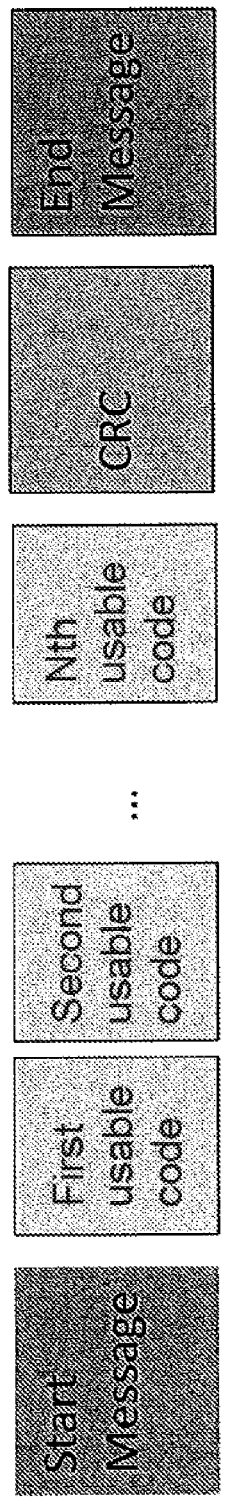

In the case of FIG. 5B, the "start message" and "end message" structural data makes it possible to identify the N usable codes as well as another structural data item denoted "CRC". This "CRC" is classically applied to the sequence of usable data but there is nothing to prevent placing this structural data item at any other agreed place in the message on condition that this place can be identified in order for both the CRC and the usable data to be decoded. The CRC may therefore be located anywhere in the usable portion of the data between the first usable code and the Nth usable code or even between the "start message" and the first usable code or between the Nth usable code and the "end message" or before the "start message" or after the "end message".

The CRC (cyclic redundancy check) is a value that is calculated from the usable value of the message during the encoding phase. This calculation may also integrate elements of the structural portion. During the decoding phase it suffices to recalculate this CRC on the basis of the usable value of the decoded message and to compare it to the CRC value that has been read. If there is no reading error, the CRC calculated during the decoding phase should correspond to the value of the CRC that has been read, calculated during the encoding. If the value that has been read corresponds to the recalculated value, it is considered that there is no reading error or that there is a low probability of a reading error. If the value that has been read does not correspond to the recalculated value, there is necessarily a reading error during the decoding on the usable part and/or the CRC. In this case the corresponding unitary message is rejected.

In some cases, the CRC also makes it possible to verify the accuracy of the values that have been read to be able to correct the latter more or less effectively if an error is detected. The CRC function may be simple, like the "proof by 9" function which determines the remainder of the sum of the values after division by 9 or more complex, integrating sophisticated hashing functions.

The CRC retained may be specifically oriented to detect at least one reading error on a character. In this field the prior art is sufficiently developed to make it possible to determine a CRC suited to the use thereof in the context of the invention. It will in particular be noted that it is possible to calculate the probability of error as a function of the length of the CRC. Various algorithms also make it possible to verify the integrity of the transmission of a message and sometimes even to correct the latter in the event of a transmission error. It is entirely feasible to integrate this kind of approach into the encoding of messages in the context of the invention where it is nevertheless recommended that there should be a compromise between security and the size of the CRC. Indeed, the more characters the CRC uses the greater the risk that the CRC itself will lead to rejection of the message through its wrong decoding.

Figure 5C:
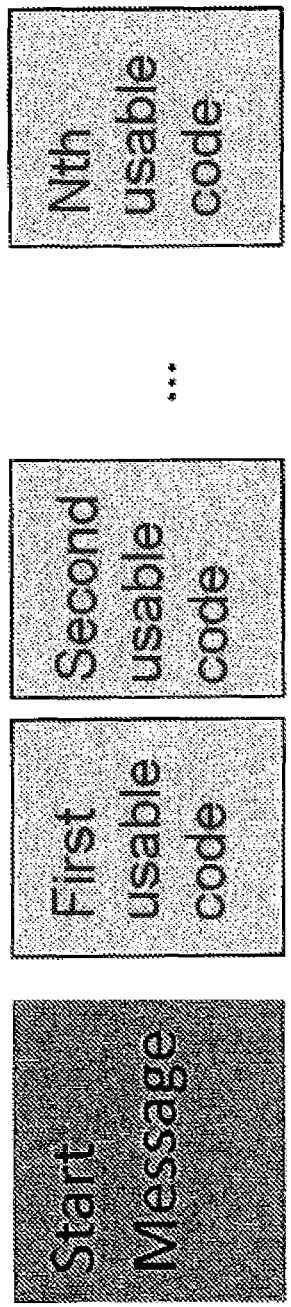

FIG. 5C is identical to FIG. 5A with no "end message" integrated into the structural portion. On the other hand, the number of usable codes of the unitary message is fixed and in the present case is equal to N. The end of the message is therefore detected not by identification of the "end message" structural portion but by counting the usable codes. It is nevertheless possible to define a variable length on condition that this information is inserted into the usable portion of the message; the length information is classically the first item of usable information in the message in this case.

Figure 5D:
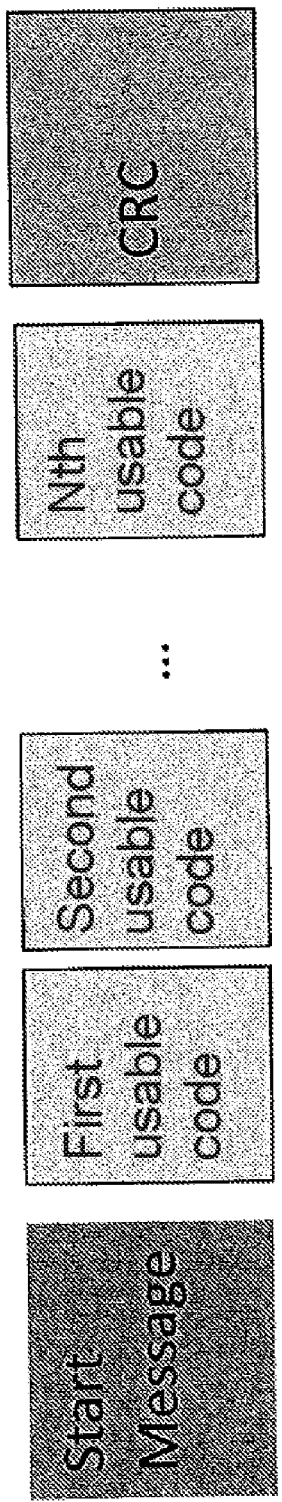

FIG. 5D is identical to FIG. 5B with no "end message" integrated into the structural portion. On the other hand, the number of usable codes of the unitary message is fixed and in the present case is equal to N. The end of the message is therefore detected not by identification of the "end message" structural portion but by counting the usable codes. The CRC is also identified according to its position relative to the usable portion and makes it possible to validate and where appropriate correct the usable portion of the message.

FIGS. 6 show different possible message structures in the context of supporting the encoding that is the subject matter of the invention when the encoding is effected via multiple encoding sub-sequences.

Figure 6A:
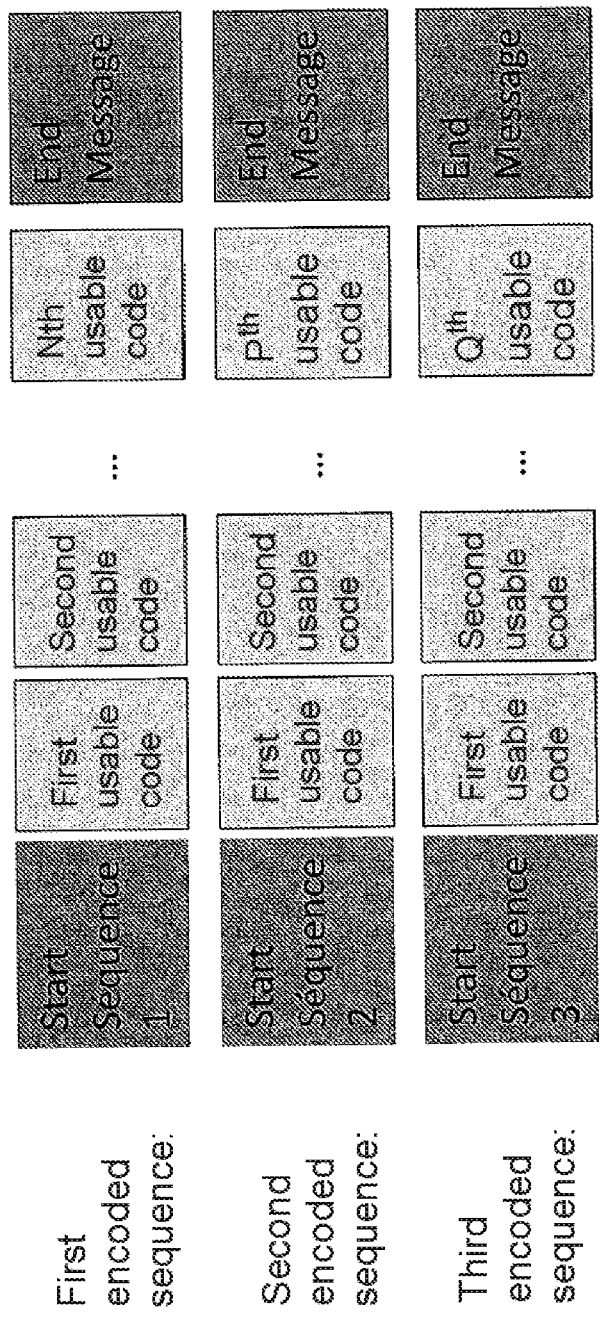

FIG. 6A shows encoding using three sub-sequences. When a document or a page is encoded, the encoding may be more or less voluminous independently of the number of items of information to be encoded.

The longer a unitary message the higher the risk of erroneous reading. In the case of a 99% efficiency of the "particular OCR", the percentage of correct reading of a unitary message including 20 characters, inclusive of the usable portion and the structural portion, is therefore around 80% ($0.99^{20}$). If the length is 60 characters, this drops to 54% ($0.99^{60}$). With a 99.5% efficiency of the "particular OCR" [rates] of around 90% and 75%, respectively, are obtained.

In order to avoid two large number of rejections, it may therefore be advantageous to encode the usable information in the form of multiple sub-sequences rather than only one. This advantage is increased if redundancy is used, i.e. if each unitary message is encoded more than once in the page.

If the efficiency of the "particular OCR" is 99%, and if each unitary message is encoded twice in the page, the probability of decoding a message of 60 characters encoded twice is approximately 79% ($1-0.46^2$). For a message of 20 characters encoded twice, the probability is approximately 96% ($1-0.20^2$). For a message of 60 characters encoded in the form of three sequences, each encoded twice, the probability is approximately 88% ($0.96^3$).

If the efficiency of the particular OCR is 99.5%, the probability under the same conditions of decoding a message of 60 characters is approximately 93%, as opposed to approximately 97% if the message is divided into three sub-sequences of 20 characters. Apart from the improvement in terms of reliability, division into sub-sequences allows a spatial disposition that is better suited to decoding in a photographic or video mode as described with reference to the subsequent figures.

To perform this encoding a plurality of messages is defined, each corresponding to a particular sub-sequence, each sub-sequence being determined by its own "start message" structural data item. This "start message" may comprise a common first part that indicates the start of a sub-sequence without determining the initialized sub-sequence and completed by a second portion that defines the initialized sub-sequence.

If the coding is effected by pairs of characters that code up to 16 positions, the first character pair that follows the "start message" common to all the sub-sequences therefore identifies the type of sub-sequence that follows. This allows up to 16 distinct sub-sequences.

However, the coding of the sub-sequence identifier can be defined with its own coding different from the coding of the usable portion of the message, in particular with respect to the number of characters used, the permissible combinations of those characters and their meaning in terms of corresponding sub-sequences. It is therefore possible on the basis of characters having 4 variants each encoding a binary value on two bits to encode 4 distinct sub-sequences with only one associated character, 16 with 2, 64 with 3 and so on.

The real number of encodable sub-sequences may be restricted because certain combinations of bits may be prohibited for decoding reliability reasons. The usable portion of the encoding of each sub-sequence is carried out in exactly the same way as described for the encoding of the usable portion of a single sequence.

However, the encoding of this usable portion could be adapted to suit the information of the sub-sequence. A sub-sequence that would encode numerical information such as a postcode (e.g. in France a number between 0 and 99999) could therefore be encoded with five pairs of characters each encoding one digit (one number) i.e. coding to base 10 as indicated in the "base 10" column of FIG. 4. Encoding to a base other than 10 is also possible subject to the use of a polynomial expansion of successive powers of B, where B is the base used. Based on FIG. 4, which is not exhaustive, B can take the value 10, 13, 14, 15 or 16.

If a family name must be encoded, assuming that the name is defined only with uppercase letters from A to Z, i.e. 26 letters, it is possible to encode up to 5 letters using a polynomial expansion with an encoding to base 16 with 6 usable codes. If two letters enable encoding of a usable code of 2 bits (16 positions) 12 characters would therefore be required to encode the usable portion of a sub-sequence encoding 5 characters. As well as encoding 5 characters, it is possible to use in addition to 26 letters an additional sign such as a hyphen ("-") or space (" "). Indeed, $27^5$ (=14348907, 27 because 26 characters plus one sign) is less than $16^6$ (=16777216). A second sign is not allowed because this time $28^5$ (=17210368) is greater than $16^6$. Generally speaking, if N usable codes are used each of which can take P values and it is required to encode a unitary message including these usable codes with letters, digits or the like from a space that contains Q elementary signs, it is possible to encode up to M signs such that $Q^M \leq P^N \leq Q^{(M+1)}$. If the space in question is the set of all the digits, Q=10; if it is the set of alphanumeric characters, i.e. the ten digits and only the lowercase or uppercase letters of the alphabet, then Q=62 (26+26+10). It is also possible to effect an encoding if each usable code does not have the same potentiality in terms of the number of variants associated with a value and/or in the case where the letters, digits or the like to be encoded belong to spaces with different dimensions. It then suffices for the encoding potentiality of the unitary message that is obtained as the product of the potentiality of each usable code forming it be greater than or equal to the combination of the information to be coded obtained as the product of the dimensions of the spaces associated with each letter, digit or the like to be encoded. A code such as H524 that has as its format an uppercase letter followed by 3 digits therefore represents a combination of 26000 values.

If the encoding capacity of a unitary message is not sufficient to encode an item of information in the context of what has been defined, a plurality of sub-sequences could be used to encode that information. If it is required to encode a name possibly preceded by the first letter of the forename on 10 characters it would therefore be possible, based on the foregoing definitions, to encode the first 5 characters in a first sub-sequence and the remainder in a second sub-sequence.

In the case of the definition of sub-sequences and a redundancy, it is possible to define the same redundancy for each sub-sequence or to define it as a function of the sub-sequence. Some sub-sequences may have a priority character and could be associated with a stronger redundancy than the sub-sequences considered to have a lower priority. Two sub-sequences can therefore be defined that define an authenticable document referencing enabling authenticated copies to be obtained; these sub-sequences are denoted sub-sequences 1 and 2 and in the present example are considered to have priority. Other sub-sequences can be defined to carry control information of the document such as the name or the address of the addressee of the document that makes it possible to verify directly and without accessing an external service the validity of certain visible information. These sub-sequences are denoted sub-sequences 3, 4 and 5 and are in the present example considered to have a lower priority. As a function of the encoding capacity of the page there could be defined within the limits thereof a redundancy of 3 for the sub-sequences 1 and 2, a redundancy of 2 for the sub-sequence 3 and a redundancy of 1 for the sub-sequences 4 and 5.

The usable content of a message may be a database reference and therefore, rather than encoding an address, which may be complex because of the multiplicity of possible definitions and the extremely variable length of the names used, it is more rational to employ a database of known addresses for a given country.

For France, there exist such databases that are marketed with regular updating. Such a database contains fewer than 20 million entries for France, which is of the same order of magnitude as the potentiality of the concatenation of 6 usable codes each of which can encode 16 values. It is therefore possible subject to certain optimizations to code the reference of an address on a unitary message.

If this unitary message does not offer sufficient potentiality, it is possible to use 2 or more distinct unitary messages to encode these addresses. For example, if the number of addresses referenced in a database is less than 20 million and a unitary message can encode a value from 0 to 10 million, a first sub-sequence, namely the sub-sequence P enables an address to be defined included in the codes 1 to 10 million and the sub-sequence P+1 will make it possible to reach an address in the remainder.

The referencing of the sub-sequence is free and likewise the referencing of the addresses does not necessarily have to comply with an established order. It is moreover recommended that the latter be as erratic as possible in order to prevent a malicious person discovering a code correspondence by a process of deduction.

It is possible in the same way to define databases of known "names" or known "forenames" for a referencing of the same type. These three databases (addresses, names, forenames) can coexist without violating privacy provided that they do not make it possible to associate two elements with each other (for example a name and an address).

These databases could be integrated directly into the decoding tool in order to enable decoding without necessitating a connection. They could be accessible via the network and therefore necessitate in order to be defined a specific connection at the time of the decoding operation for which the correspondence with the extracted value would be supplied by an external service in response to a specific request. These databases could be the subject of updates employing the various techniques that already exist in the field, in particular where the modified or obsolete elements are concerned, the reference of which has potentially already been used.

In some cases the extracted code could serve to verify the validity of a visible item of information; the billing address on the document processed could therefore be read and that same address could be coded in reference form in the watermarking proposed by the invention. In this case, over and above extracting the information defined in the watermarking proposed by the invention, the processing of the document could use a classic OCR technique associated with an LAD/RAD technique to seek the address that is visible in the document. These two items of information, "visible address" and "code of the address extracted from the watermarking in the context of our invention" are sent to a remote service that in return sends a validity diagnosis: the two items of information are compatible or not. The same approach may be used for other information (name, forename, date, amount, etc.). This diagnosis will obviously be usable to the entity or the person exploiting the document processed in this way.

Figure 6B:
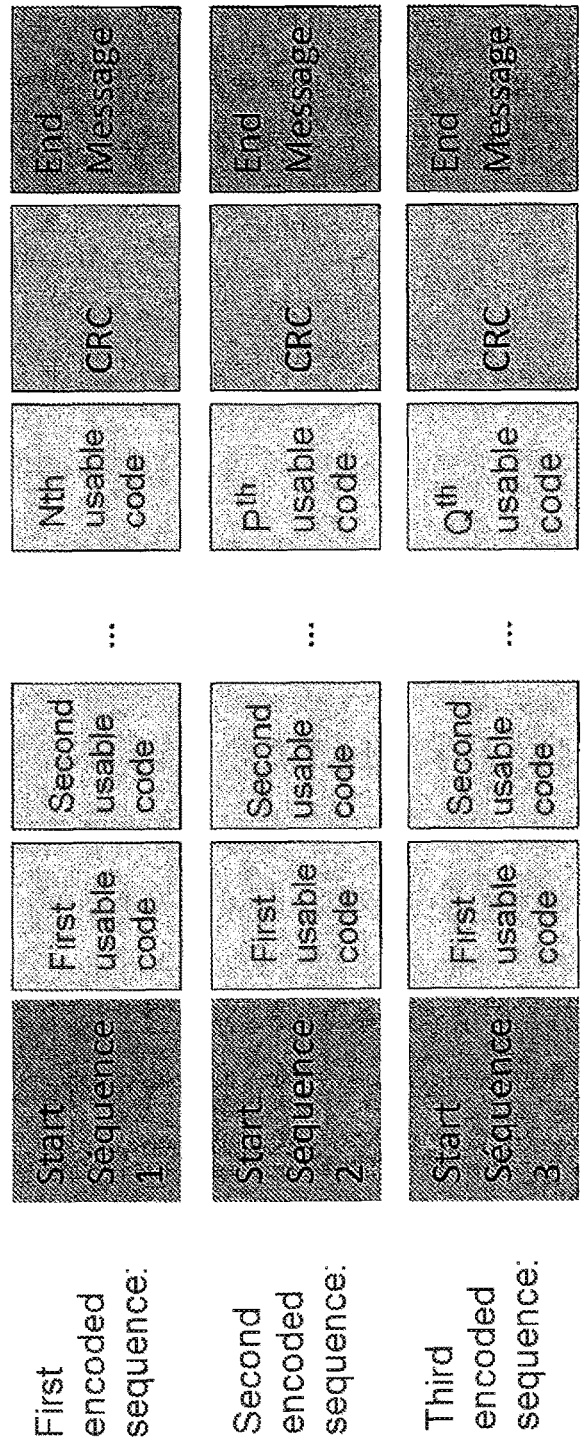

FIG. 6B is an adaptation of FIG. 6A by virtue of the introduction of a CRC as described for FIG. 5B compared to FIG. 5A. If the CRC is specific to each elementary message, the description for FIG. 5B may be applied here, only the "start message" structural data being different compared to FIG. 5A and not modifying the general principle of application of a CRC.

It is possible to reserve one or more unitary messages for the encoding of a global CRC covering some or all of the encoded data of the page or the document. This CRC can cohabit or not with other usable information. The CRC defined in this way may be either autonomous and substituted for CRC encoded on each unitary message or defined in addition to all or part of the CRC defined in each unitary message.

As indicated in the description of FIGS. 5C and 5D, the use of a fixed usable information length, whether for all or some of the sub-sequences, makes it possible to dispense with the use of "end messages" for the sub-sequences concerned. The "end message" could be used anyway with a view to making the decoding more reliable.

Figure 9:
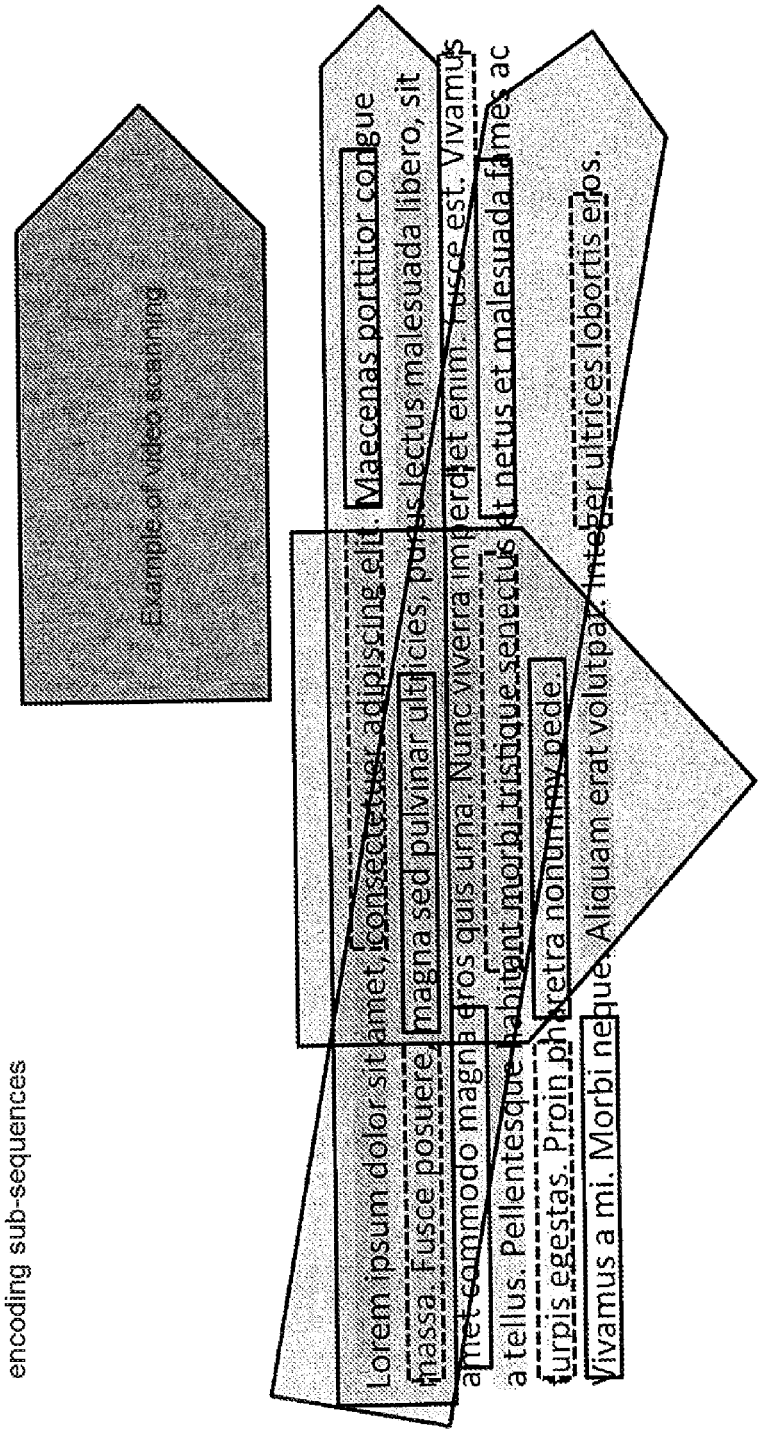

FIG. 7 and likewise FIGS. 8 and 9 are figures that have already been referenced in one of my recent patents. They define the optimum dissemination of "rules" in a document in order for them to be easily exploitable via a smartphone (intelligent telephone) or PDA (tablet computer) equipped with an optical system that can be controlled by these devices either for taking a single photo or multiple photos or for shooting video. The fact that the photos or the video defined in this way are produced via devices having computer intelligence makes it possible to exploit the resulting images in the context of the invention in a satisfactory way. This computer intelligence can also be exploited in controlling taking the photo or shooting the video in order to optimize the result with a view to the exploitation envisaged in the context of the invention.

This FIG. 7 indicates, when "rules" include 3 sub-sequences, one way of imposing the latter on a document essentially consisting of text when the encoding of the text can be supported by the text. The present invention, which enables each character to encode computer type information, conforms to what is required in my earlier patent. In particular, on the basis of four character variants defined for each unitary character, each of these variants corresponding to the encoding of one of the following binary values (0,0), (0,1), (1,0) and (1,1), a line of text in fact enables coding of 3 sub-sequences in the same line. This possibility is obviously not limiting on the invention, and there may be envisaged any other definition of encoding per character such as described in the context of the invention as well as any other definitions of the encoding sub-sequences whether that be in the context of a "rules" application or any other application necessitating watermarking.

One of the possible encodings using the invention may be defined as follows:

Each encodable character is associated with four variants detectable by a particular OCR.

Each encodable character variant encodes one of the binary values (0,0), (0,1), (1,0) and (1,1).

A basic usable code uses two encodable characters and is therefore a binary value on 4 bits, encoding a value between 0 and 15.

The encoding of the sub-sequences conforms to the definitions of FIG. 6B with no "end message" used as described in relation to this figure.

The "start message" consists of:

A succession of 3 character variants all associated with the binary code (0,0), this set therefore encoding the binary value (0,0,0,0,0,0).

There follows a character indicating which sub-sequence is associated with this message. In the case of FIG. 7 explained here, 3 values are necessary whereas a character can encode 4 of them. It is therefore possible to associate the code (0,1) with the sub-sequence 1, the code (1,0) with the sub-sequence 2 and the code (1,1) with the sub-sequence 3. If more than 4 sub-sequences must be defined, the definition of the sub-sequence may use 2 characters or more according to what is required. For example, a set of 2 characters enables encoding of the values 0 to 16. If the number of sub-sequences to be defined does not exceed 14, the values 0 and 1 will not be used. These values being associated with the binary values (0,0,0,0) and (0,0,0,1), not using them makes it possible to minimize the possibility of accidentally finding the remarkable value (0,0,0,0,0,0) in the body of the message as explained hereinafter.

An encoding usable portion made up of 6 usable codes, i.e. 12 characters (2 characters per usable code). It is preferable not to use the usable codes associated with the binary values (0,0,0,0) and (0,0,0,1). No usable code starting with three "binary 0" and no usable code being able to finish with at most 3 "binary 0", it is not possible, in the absence of a reading error, to have a succession of 6 "binary 0" coinciding with the first portion of the "start message". Using a coding to base 13 as indicated in the corresponding column of FIG. 4, there will be at most 2 "binary 0" at the beginning of the usable code and at most 2 "binary 0" at the end of the usable code, which allows at most, and in the absence of reading errors, a succession of 4 "binary 0" in the usable portion of the message, which further limits the accidental appearance of the succession of 6 "binary 0".

The CRC is chosen so as to be defined on 3 encodable characters, which defines a binary value on 6 positions. If the CRC calculated during the encoding phase is equal to (0,0,0,0,0,0) this could be replaced with (1,1,1,1,1,1) in order to prevent the inopportune appearance of the specific initialization sequence of the "start message". In this case, at decoding time, if the CRC calculated from the message that has been read is equal to (0,0,0,0,0,0), it will be considered correct if the CRC that has been read is equal to (1,1,1,1,1,1), the probability of the code (1,1,1,1,1,1) being generated accidentally being virtually zero, above all if the CRC is chosen in this sense. To prevent the code (0,0,0,0,0,0) appearing accidentally through concatenation of the CRC with the usable portion of the message that precedes it or the beginning of a subsequent message, the CRC code defined in this way on 6 binary 0/1 positions may be framed by two "binary 1", and this therefore defines for the CRC block a sequence of 8 binary 0/1 positions that necessitates the use of 4 characters.

Based on this definition, a sub-sequence necessitates 20 characters, that is to say:

4 characters for the "start message" if the limit is 3 sub-sequences, 12 characters for the usable part of the message, 4 characters for the CRC, no characters for the "end message", which is not used in this example.

In the case of using a 12-point font, the approximate capacity of a line is around 80 characters, which makes it easy to define 3 sub-sequences that necessitate only 60 of the 80 potential characters.

Figure 14:
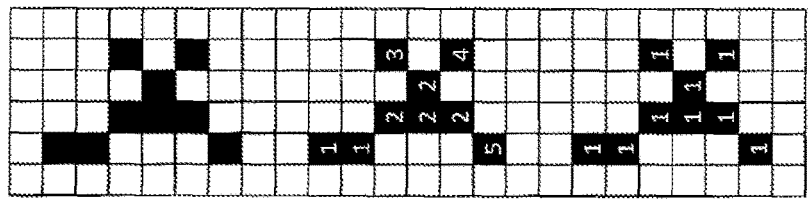

If coding to base 14 is used for the definition of the usable portions of the messages as defined in the corresponding column of FIG. 14, a sub-sequence potentially encodes up to 7529536 values. With three sub-sequences it is possible to encode more than 4 times $10^{20}$ values, which is satisfactory for encoding rules including complex rules integrating referencing and encryption.

For watermarking applications, strategic information from the document may easily be self-supporting on a single line of the document, either by a direct definition or by referencing a database accessible locally or remotely. It is therefore equally possible on a single line of an electronic book as displayed on a tablet computer to show a reference that identifies both the work with which said line is associated and the example of that work. The watermarking defined in this way makes it possible to improve security in terms of author's rights:

If the work purchases is copied, it is easy to find out who owns the work that was copied, which involves the liability of the holder of the copy of this work and therefore limits their willingness to produce illegal copies.

If the copied work is intentionally converted so as no longer to integrate the watermarking as defined in the context of the invention or to render it inoperative, it is easy to identify the work that is copied and that the copy is illegal, which makes the operation hazardous from the penal point of view and therefore dissuasive.

Going beyond this example, it is possible to provide other encodings and other combinations of sub-sequences in the context of diverse applications necessitating watermarking compatible with the invention and with reading the latter by a mobile terminal such as a smartphone or PDA taking a photo and/or shooting a video.

In the example referred to above, for this watermarking to be optimized vis à vis taking a photo and/or shooting a video, if 3 sub-sequences are defined, namely the sub-sequences SS1, SS2 and SS3, they are disposed as follows in the page:

Lines 1 and 1 modulo 3 (i.e. lines 4, 7, 10, etc.), the sub-sequences are coded in the order SS1, SS2 and SS3 leaving at the ends and between these codings a blank space that is not coded and is a function of the available space.

Lines 2 and 2 modulo 3 (i.e. lines 5, 8, 11, etc.), the sub-sequences are coded in the order SS2, SS3 and SS1 leaving at the ends and between these codings a blank space that is not coded and is a function of the available space.

Lines 3 and 0 modulo 3 (i.e. lines 6, 9, 12, etc.), the sub-sequences are coded in the order SS3, SS1 and SS2 leaving at the ends and between these codings a blank space that is not coded and is a function of the available space.

This produces a set of sub-sequences SS1, SS2 and SS3 sufficient for reconstituting the complete encoding throughout the elementary text space (partial, vertical or skewed extraction). This disposition is obviously given here by way of example, and any other decomposition into encoding sub-sequences enabling easy reconstitution in numerous cases of partial extraction is equally satisfactory. This method of imposition is also compatible with any classic processing of the page by classic digitization in the case of a "material document" or by computer processing of an "electronic document".

In the presence of encoded sub-sequences in the document, the decoding operation identifies each sub-sequence present in the page or the page extract that is being processed. The valid sub-sequences are identified and in the case of redundancy of certain sub-sequences, the latter is used to define the content of each viable sub-sequence, possibly with a diagnosis as to the confidence attributed to the extracted value. If this diagnosis is satisfactory, some or all of the values extracted from the watermarking are used in the associated processing. The global diagnosis pertaining to the extraction of the watermarking from the page can take account of the priority character of certain sub-sequences. Thus if the optional sub-sequences are decoded with a satisfactory confidence diagnosis but one or more of the priority sequences have an insufficient confidence diagnosis, then the processing could be aborted completely or partly just because of this.

With this description, a paragraph of a few lines is sufficient for inserting a reference to the work from which it is extracted with additionally the possibility of encoding the original (i.e. the commercial copy from which it is extracted and therefore the identification of the proprietor of that commercial copy), or even also the page of the work from which the paragraph is extracted.

It is therefore possible to have coexist on the same page multiple paragraphs from different works and different commercial copies. For this it suffices that the decoding process has provision for decrypting a multiplicity of references in the same "unitary page". In this case, this multiplicity of references can be processed during the decoding of the unitary page by an additional step identifying the potentially independent sub-portions of the page and able to support a specific encoding distinct from the other portions of the page.

To resolve this requirement for multiple encoding on the same page, it is also possible to redefine the encoding of the page to prevent confusion on decoding, so that the sub-sequences of a first encoding will have the numbers 1, 2 and 3, those of a second encoding 4, 5 and 6, and so on. In this case, if a paragraph results from an insertion with an encoding of sub-sequences 1, 2 and 3 at the time of insertion, that encoding is recalculated to be compatible with the other concurrent encodings of the page if the page is fixed. This principle applied when constructing the page may be combined with an appropriate analysis when decoding it.

Based on a disposition of encoding sub-sequences conforming to the description of FIG. 7, FIG. 8 shows the compatibility of this encoding with taking a photo via an appropriate mobile interface such as a smartphone ("intelligent mobile telephone") or PDA (tablet computer).

Thus if the photo of the document is sufficiently large, in many cases it will integrate at least one occurrence of each encoding sub-sequence, i.e. in the present illustration the sub-sequences SS1, SS2 and SS3. Taking the photo may then be controlled by dedicated software that optimizes the shooting parameters or even apply the necessary image corrections in order to enable decoding of each sub-sequence included in the photo taken, including any checks on the validity of the decoding effected if the encoding allows this.

This software can optimize the taking of a photo by introducing information redundancy by in fact taking a plurality of photos over a certain time period, preferably a short period. Pooling the images enables a person skilled in the art to introduce algorithms enabling deduction therefrom of the equivalent of a single image of better accuracy than each of the images from which it is derived or with characteristics more appropriate to the required decoding processing. This resulting image equivalent consequently authorizes decoding of the encoding sub-sequences that is more accurate than results from taking a single photo.

On the basis of this decoding of the encoding sub-sequences and the corresponding reconstitution of the complete watermarking or a sufficient portion thereof, the device controlling the taking of the photo can therefore chain to appropriate processing, such as for example the obtaining of authenticatable copies and/or authenticated copies as could be allowed by classic digitization.

Based on a disposition of encoding sub-sequences conforming to the description of FIG. 7, FIG. 9 shows the compatibility of this encoding with video scanning via an appropriate mobile interface such as a smartphone ("intelligent mobile telephone)) or PDA (tablet computer).

The video scanning can then be controlled by dedicated software that will optimize the shooting parameters or even effect the necessary image corrections in order to enable decoding of each sub-sequence included in each photo constituting the video by deducing the decoding from the decodings effected on the basis of each of the photos in the scan. This software can also pool the various images constituting the video scan in order to construct the equivalent of a single image of better accuracy than each of the images from which it is derived or with characteristics more appropriate to the required decoding processing. This resulting image equivalent consequently allows decoding of the encoding sub-sequences that can be more accurate and/or more reliable than pooling the results obtained from each of the photos constituting the video scan.

Figure 10:
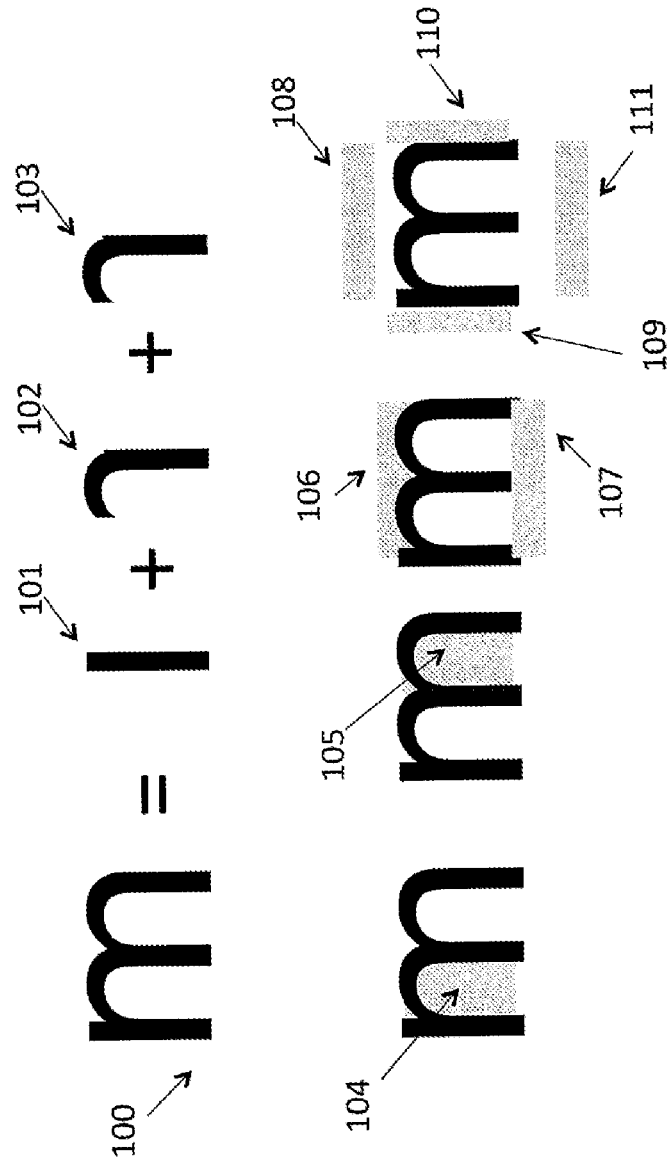
Figure 11:
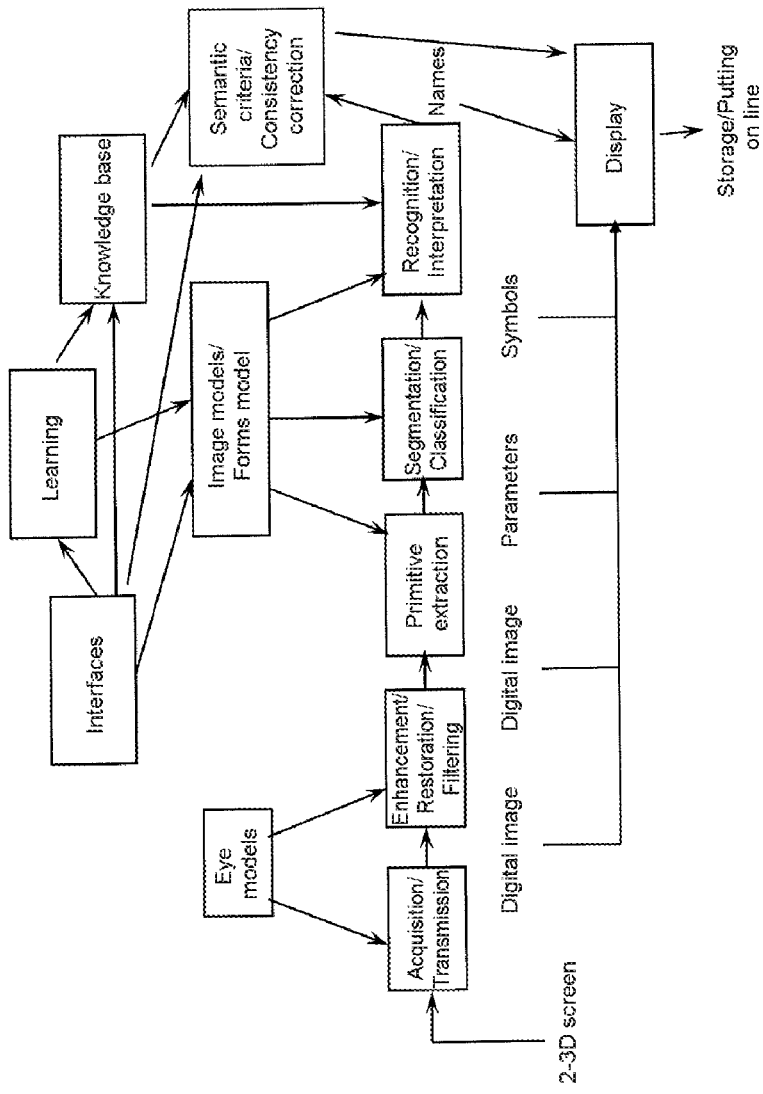

FIG. 10 shows the decomposition of a character into graphemes. In this figure the character "m" labeled "100" is defined as the aggregate of 3 graphemes labeled "101", "102" and "103".

In this example the graphemes "102" and "103" are considered identical; these two particular graphemes will be identical for the unmodified reference character "m" or different as a function of the font used.

Similarly these graphemes could also be integrated into the decomposition into graphemes of other characters; thus for some fonts the "n" is made up of the graphemes "101" and "102" used to define the "m". With a set of specifically defined graphemes it is possible to reconstitute all or part of the set of characters used in a font.

In the same way as an entire character, a grapheme can therefore be associated with a certain number of grapheme variants each encoding a value. The number of variants associated with a character can be relatively small, the power of the encoding being compensated by the multiplicity of graphemes constituting a character. Thus if the grapheme "101" is associated with two variants and the graphemes "102" and "103" are each associated with three variants, an encoding power of 2×3×3 is obtained, in other words 18 variants for the character "m".

It is also easier to consider that the unmodified grapheme also encodes a value on the same basis as what would have been defined for the characters. In this case, using the same example, there is obtained an encoding power of (2+1)×(3+1)×(3+1), i.e. 48 values. If for ease of detection there are retained only the combinations in which at least one of the graphemes used is a variant, then 47 combinations are obtained (48 less the combination of the three unmodified graphemes).

This encoding mode is particularly suitable for certain Asiatic alphabets including a very large number of characters but a more limited number of graphemes. It is possible to provide mixed encoding, i.e. an encoding of the base character complemented by an encoding on the complementary graphemes. Thus for certain fonts an "m" may be considered as the combination of an "n" and the grapheme "103". If the "n" is associated with 4 variants and the grapheme "103" with three variants, there is therefore obtained an encoding power of 12 values, or 16 values if it is considered that the non-modified value grapheme "103" also encodes a value. The same principle may be applied to accented characters as well as to certain special characters:

the "é" may be considered as the combination of the character "e" and the grapheme " ′ " (acute accent), the "ç" may be considered as the combination of the "c" and the "cedilla" grapheme.

As well as the basic encoding materialized by character variants and/or grapheme variants, the graphemes can encode complementary information thanks to a variation of gray level. In a classic use, the characters are printed using black ink on white paper. If the document is digitized by effecting a quantization with representation of the values of the pixels by gray levels between 0 and 255 (encoding on 8 bits), the "black", characterizing form information, may be associated with the minimum value 0.

Scientific studies have shown that the human eye does not respond to luminous intensity differences in a linear manner but in a logarithmic and environmentally contextual manner. In a bright environment, the eye could therefore easily detect small differences of gray levels in relatively light tones but would have much greater difficulty in detecting differences of gray levels of the same order of magnitude in relatively dark tones. In an equivalent way, in a weakly lit environment, for example at night, the opposite phenomena could be observed.

In the context of the present invention, this phenomenon may be used to introduce a small variation of gray level over the characters. This difference of gray level that is difficult for a human eye to perceive by comparison with the value used by default can on the other hand be detected in an image processing phase following digitization. If the character already encodes a value by means of the associated variants, the use or non-use of a specific gray level therefore encodes a complementary information bit, for example 0 if the "black" of gray level 0 is used for the character and 1 if another gray level value is used, for example 20.

Ignoring the gray level used by the character, the associated variants therefore enable the encoding of 4 values, and the complementary use of the gray level 0 or 20 therefore enables the encoding of 8 values (4×2) and, if more than one gray level can be used, i.e. without being detected by the eye but being identifiable in an image processing phase after digitization, and finally to complement the gray level 0 black there may for example be used a "black" at level 10 and a "black" at level 20; from the four values encoded by the variants it is possible to arrive at up to 12 encoded values, and so on if the number of "black" levels identifiable by image processing following digitization is increased.

The different black levels used may be determined by the application of intervals or thresholds and where appropriate after a calibration operation making it possible to tell which is the reference black level of the document or the character.

Any other type of method may be used enabling correct distinction of the different black levels after digitization. A greater combination is obtained by not applying these "black" variants to the entire character but instead to some or all of the graphemes that constitute it.

With two "black" levels, such as 0 and 20, for example, if the "m" enables the encoding of 18 values uniquely by applying the variants either to the character or to the graphemes that constitute it, the variations with two black values on each of the graphemes "101", "102" and "103" that constitute it therefore make it possible to expand the encoding to a total of 144 values (18×2×2×2). With three detectable "black" levels, up to 486 values are encoded (18×3×3×3), and so on.

In all cases, the use of an encoding based on graphemes could necessitate positioning each of those graphemes separately in the page at the time of definition of the corresponding file with application of the associated black level if necessary. Thus rather than positioning a character in the page, each grapheme will be positioned separately with its associated black level (gray level).

If the characters are printed in color, the black variation may be replaced by any color variation detectable by processing the result of digitization, whether this is an elementary variation in one of the base colors or a value resulting from the application of these colors such as the brightness. Such an encoding necessitates a sufficiently precise knowledge of which color is normally assigned to the encoded character in order to detect the variation to which it has been subjected. The application of an extension of the encoding by the use of gray or color levels may be systematic or defined on a selection of characters or graphemes by their encoding process as a function of its parameter settings.

Applying the same principle, it is also possible to enlarge the encoding borne by a character using the white or similar areas of the character, although the eye is more sensitive to white variations than to black variations. These zones inside or outside the characters must be definable by their position relative to the character. Thus in the context of black and white printing, or rather black on white printing, the normally white zones, correspond to a gray level of 255 or a near value. The white zone of the "m" defined between the graphemes "101" and "102" i.e. the zone "104", and identically the zone "105" defined between the graphemes "102" and "103" may therefore be slightly grayed, for example with a gray level of 235, in order not to be easily perceptible to the eye but to be detectable by processing the image resulting from digitization. In this case, a gray level of 255 in the zone "104" or the zone "105" could correspond to the binary value 0 while the value 235 would correspond to the binary value 1. The different white levels used may be determined by the application of intervals or thresholds and where applicable after a calibration operation that makes it possible to know which is the reference white level of the document or the character. The coding of each of the zones "104" and "105" in accordance with this principle makes it possible to encode an information bit in addition to the other encoding possibilities already defined on the character. It is therefore possible to define other white zones in the space linked to the serif of the character such as the zones 106 to 111, each of these zones enabling the encoding of an information bit. If the white levels detected by processing the result of digitization are multiplied, it is possible to obtain an even greater encoding power, so that with 3 white levels including the unmodified reference white it is possible to encode over the white areas 104 to 111 up to 38 values, i.e. 6561 values, if there are associated therewith the black zones 101 to 103 themselves able to support 3 black levels including the reference black, then 311 values are obtained i.e. 177147 values. If these black and white zone variations are associated with grapheme variants as defined above, up to 177147×47 i.e. 8325909 values are obtained which is virtually the encoding power of 3 bytes (to be precise slightly more than 22 bits). Generally speaking, taking account of the fact that the character "m" is a character that enables easy encoding, each character can bear more than one information byte, i.e. richer information than what it carries directly if read in the classic way. If the encoding must be effected regardless of the font used, coding via the white and black zones as defined in this way could be substituted for encoding by means of character variants.

In a preferred embodiment of the invention, using the black level of the graphemes of a character supporting encoding and the white level of the different white zones of the character or connected thereto makes it possible to complete the encoding capacity of such an encoded character.

In another preferred embodiment of the invention, the black level of the graphemes of a character supporting encoding or not and the white level of the different white zones of the character or connected thereto are used as "marks" of the document or the page. In other words the use of such black or white levels in accordance with a predefined standard defining some or all of the subsequent elements. There can be determined in this way the presence of a marking if any one or any combination of the following conditions is satisfied:

one or certain graphemes or one or more characters use predetermined black levels or black levels included in a predetermined black level interval, one or certain white zones of a character or connected thereto use predetermined white levels or are included in a predetermined white level interval, the black levels or the white levels used in this way on a character encode the equivalent of a predetermined numerical value or a value belonging to a predetermined set, the combination of the black levels or the white levels defined in this way for a set of characters itself defined by a predetermined or statistical algorithm conforms to a pre-established dissemination rule.

For example, it could therefore be established that a mark is present if at least 5 characters have at least one grapheme that has a black level between N−20 and N−30 if N is the reference black. The reference black is ideally 0 but because of uncertainties linked to printing and digitization, it may have a different value such as 5 or 10, for example.

The proposed solution functions in an ideal way if only one font is used in the document, i.e. the same font, the same point size and the same style. It is possible also to use other fonts that would not support encoding on condition that the decoding process is able not to take account of the characters using these fonts, thus avoiding considering them as encodable and/or encoded characters. These characters can be eliminated easily if they belong to zones of the document or of the unitary page when the decoding process is able to determine that they do not support encoding. This may be the case using an LAD/RAD system that could select only the zones eligible for encoding. Certain algorithms also make it possible to determine which font is used or its characteristics such as its point size or style. In this case, the application of such an algorithm makes it possible to retain only the text portions eligible for encoding.

It is possible in the context of our invention to have our encoding supported by different fonts, possibly integrating the different declinations of the same font with distinct characteristics such as point size or style. The decoding processing could then be effected as in the "single-font" situation after application of processing to determine the font and/or the characteristics such as style and point size of the character to be decoded. However, this recognition can be optimized by inserting the encoding of complementary information indicating the font and its characteristics such as point size or style of the character to be decoded.

The variations of graphemes or white zones as defined above can therefore play this role. The black level of the graphemes of the character, whether it supports encoding or not, and the white level of the different white areas of the character or connected thereto are used to define some of the characteristics of the character. A particular combination of these white levels and black levels will therefore make it possible to define which font is used and/or the style used and/or the point size of the font used. This combination could be defined on the basis of a single character or on the basis of a set of characters that can be combined during the digitization process by an appropriate algorithm. The resulting definition could apply to these characters or to any other set of characters, whether comprising some or all of these characters or not.

If it is required to authorize the use of 16 fonts, each of which can be used with 4 different point sizes and 4 different styles, this therefore yields 256 "font" characteristic possibilities of the associated characters. To identify this "font" characteristic, two black levels may therefore be used in addition to the reference black level for the graphemes of the character.

The first character of a line including at least one grapheme using a black different from the reference black but corresponding to one of the two-pre-established black levels determines the presence of a characteristic encoding on the basis of the next character. Each next character has on average two graphemes, each grapheme enclosed one information bit according to whether it uses one of the two pre-established blacks different from the reference black. 8 bits would be required to encode one of the 256 font possibilities, and this encoding is on average established with 4 characters. On the basis of the next character, generally the 6$^{th}$, there follows decoding as defined classically in the context of the invention, integrating the use of black levels and white levels or not. The font characteristic defined in this way could be considered as applying to the subsequent characters of the line, the paragraph or the page or any other text density such as the content of a column, for example. It would equally be considered as valid until the detection of a new font characteristic definition occurrence. The characters encoding the characteristic could also support a classic encoding if the latter is compatible with the font characteristic encoding. This encoding mode is not limiting on the invention, and any other mode enabling the decoding phase to identify the font used by each encodable character is satisfactory.

The invention has numerous advantages. A paper or electronic book can therefore be watermarked with no overcost caused by this phase even though each page, or even each elementary page portion, could include different watermarking. It is therefore easy to identify the purchaser of a digital book on each portion of the latter, for example, which is an undeniable advantage for the proper payment for author's rights.

This method may easily be completed by technologies for watermarking non-text portions of the document. The images from any documents, for example, because of their complexity, enable the use of watermarking methods that are already sufficiently effective and have already been mastered, for example. The solution proposed by the present invention therefore makes it possible to render secure any document consisting entirely or partially of text, which encompasses inter alia documents of administrative type, public or private documents associated with transactions and also new documents such as electronic books, the expansion of which is limited at present because of the lack of checks on pirate copies. For the latter, the solution in accordance with the invention makes it possible to define effective watermarking of the latter guaranteeing compliance with author's rights if a copy is requested.

The invention claimed is:

1. A method of watermarking a document containing at least one text portion, the method comprising:
    determining one or more character fonts including a plurality of encodable characters, each encodable character being represented by of an original graphic and one or more variants of said original graphic, each variant being associated with a different encoded value;
    creating an encoding in the at least one text portion of the document by encoding information using the one or more character fonts by replacing at least one original graphic of at least one encodable character with one of the variants of the respective encodable character,
    wherein the original graphic and the variants of each of the encodable characters are identified as a single character by a first optical character recognition (OCR) process and identified as a plurality of characters by a second OCR process,
    wherein the second OCR process is adapted to determine if each encodable character in the at least one text portion is represented by the original graphic of the respective encodable character or one of the variants of the respective encodable character, and
    for each encodable character determined to be represented by one of the variants, the second OCR process is adapted to determine which of the variants is represented;
    wherein a "strict order" relation exists between the encodable characters in order to establish in what order the encodable characters are processed during decoding of the at least one text portion.

2. The document watermarking method as claimed in claim 1, wherein the encoded information is decoded by effecting the following steps:
    applying the first OCR process to the document to identify the encodable characters within the at least one text portion,
    establishing a "strict order" relation on the identified encodable characters in order to determine their sequencing in the document in conformance with that defined at the time of creating the encoding,
    applying the second OCR process to the identified encodable characters in the document, and determining whether each encodable character is represented by the original character of the respective encodable character or one of the variants of the respective encodable character, and for each of the identified encodable characters represented by one of the variants, determining which of the variants is used and determining the encoded value associated with the variant used, assembling the encoded values in accordance with the "strict order" relation in order to reconstruct all or part of the encoded information.

3. The document watermarking method of claim 2, wherein images captured by a mobile terminal, whether from a succession of still photographs or a video sequence, are assembled by a dedicated process to generate a single image which is decoded.

4. The document watermarking method of claim 2, wherein before applying at least one of the first OCR process and the second OCR process, applying at least one of a noise reduction algorithm and a deformation compensation algorithm to an electronic version of the document.

5. The document watermarking method of claim 2, wherein before applying at least one of the first OCR process and the second OCR process, decomposing the at least one text portion into connex components, wherein:

the decomposed at least one text portion retains at least one cluster of pixels that corresponds to encodable characters, or the decomposed at least one text portion includes character vignettes independent of the first and second OCR processes, or the decomposed at least one text portion serving as a preparatory phase for at least one of the first OCR process and the second OCR process, or the "strict order" relation is refined or rectified at least after the first OCR process to improve identification of the sequencing of the characters.

6. The document watermarking method of claim 2, wherein the second OCR process comprises a plurality of secondary OCR processes, such that application of the second OCR process comprises applying a distinct and dedicated one of the secondary OCR processes for each encodable character identified by the first OCR process.

7. The document watermarking method of claim 2, further comprising applying at least one third OCR process to the document to decode the at least one text portion, the third OCR process being capable of identifying the original graphic and the variants thereof for some or all of the encodable characters.

8. The document watermarking method of claim 2, wherein the encoding includes one or more distinct unitary encodings, and in response to one of the unitary encodings being decoded erroneously, a reconstruction of the erroneously decoded unitary encoding is attempted, whether the reconstruction is validated or not, or a new digitization attempt or decoding attempt for the erroneously decoded unitary encoding is performed, or if a portion of the erroneously decoded unitary encoding is successfully decoded, the portion is validated.

9. The document watermarking method of claim 2, wherein creating the encoding includes inserting a marking identifying the document as sensitive, and wherein:

decoding is effected if a reproduction operation detects the marking, the marking is materialized by the presence of a predefined minimum number of encodable characters which constitute variants of one or more of the original graphics and which encode a marking value which provides an extracted code serving as rules for the reproduction operation for the document.

10. The document watermarking method of claim 2, wherein at least a portion of the information to be encoded in the at least one text portion is converted into a number value using a first polynomial calculation, and the number value is converted into a sequence of encoded characters using a second polynomial calculation, and wherein the number value is exploitable directly or points to a database, and wherein when the number value points to the database, a correspondence is obtained by calling an external service, or the encoded values extracted from the encoded at least one text portion are associatable with corresponding other values extracted from the document as viewed by an LAD/RAD technique in order to be sent together to an external service that determines a consistency thereof and returns a diagnosis of the consistency.

11. The document watermarking method of claim 2, wherein when decoding is effected on the basis of a photo taken by a mobile terminal, a dedicated application installed on the mobile terminal optimizes photo capture characteristics so that the photo is compatible with decoding processes.

12. The document watermarking method of claim 2, wherein when decoding is effected on the basis of a video scan effected by a mobile terminal, a dedicated application installed on the mobile terminal optimizes video capture characteristics so that the resulting video is compatible with decoding processes, and wherein decoding of the video is obtained by one of pooling decoding results effected on images resulting from the video scan or by pooling images obtained from the video scan decoding the pooled images.

13. The document watermarking method of claim 1, wherein at least one of the encodable characters comprises one or more graphemes, and wherein each of the variants of the at least one of the encodable characters comprises at least one of the graphemes that distinguishes the respective variant from at least one of the original graphic and another one of the variants.

14. The document watermarking method of claim 1, wherein the document is divided into a plurality of unitary pages, each unitary page including a portion of the encoding, and wherein the potion of the encoding on each unitary page is specific to each respective unitary page.

15. The document watermarking method of claim 14, wherein each unitary page includes a plurality of independent encodings.

16. The document watermarking method of claim 14, wherein the unitary pages and any sub-portions of the unitary pages are delineated after decoding, with delineation being determined at least implicitly by an overall result of decoding.

17. The document watermarking method of claim 1, wherein creating the encoding comprises searching for one or more of the encodable characters within the at least one text portion of the document, establishing a diagnosis in order to determine if encoding the information within the at least one text portion is possible, and adjusting characteristics of the encoding being created in response to the established diagnosis.

18. The document watermarking method of claim 17, wherein the characteristics adjusted include at least one of a content of the encoded information and a redundancy of the encoded information.

19. The document watermarking method of claim 1, wherein for each encodable character, the variants are associated with distinct encoded values and are integrated into distinct positions within the one or more character fonts, the encoded value of each variant being effected by the position of the variant in the one or more character fonts.

20. The document watermarking method of claim 1, wherein the one or more fonts includes a first font comprising the original graphics and at least one additional font, each additional font including one of the variants for each original character and representing one of the encoded values, and wherein the encoded value associated with one of the encodable characters in the document is effected by a change in font.

21. The document watermarking method of claim 1, wherein:
the one or more fonts includes a first font comprising the original graphics and one or more additional fonts,
a first character and a second character are integrated into at least one of the one or more additional fonts,
the first character encodes a first encoding value,
the second character has no encoding value or encodes a second encoding value distinct from the first encoding value, and
each original graphic and each occurrence of the variants associated with each original graphic are integrated into the at least one of the one or more additional fonts, and
wherein creating the encoding includes a font substitution for effecting the encoded value associated with at least one of the encodable characters.

22. The document watermarking method of claim 1, wherein the encoding of an electronic document is transcribed via contextual attributes of the electronic document, and the contextual attributes are transcribed onto the characters when the electronic document is converted into a material document.

23. The document watermarking method of claim 1, wherein an encoded document is decoded upon submission to a reproduction process.

24. The document watermarking method of claim 1, wherein an encoded document is decoded in response to a specific action of a holder or user of the encoded document.

25. The document watermarking method of claim 1, wherein the first OCR process is limited to recognizing only potentially encoded characters.

26. The document watermarking method of claim 1, wherein the encoding includes one or more distinct unitary encodings, wherein:
each unitary encoding is encoded one or more times in the document, or
each unitary encoding uses an encoding mode that is specific to the respective unitary encoding with or without using encryption or a hashing key, or
each unitary encoding is encoded one or more times in the document, such that a number of occurrences of each unitary encoding on the same page is a function of an importance of each unitary encoding relative to the other unitary encodings, and wherein an identification of each unitary encoding is defined either explicitly in its content or implicitly through the order of occurrences.

27. The document watermarking method of claim 1, wherein decoding is effected on an electronic document by direct exploitation of contents of the electronic document without application of the first or second OCR processes, the characters and their variants being discerned by a programmable computer process.

28. The document watermarking method of claim 1, wherein four default variants per encodable character are defined so that each encodable character is usable to encode two information bits, thereby enabling the second OCR process to detect the original graphic and the respective variants for each encodable character with a satisfactory level of confidence whilst maintaining the esthetics of the variants close to the esthetics of the original graphic.

29. The document watermarking method of claim 1, wherein the original graphic of each encodable character is associated with a distinct encoded value, and wherein only certain text portions are encoded, such certain text portions being identifiable at the time of decoding.

30. The document watermarking method of claim 1, wherein a number of variants per encodable character is variable, and the number of variants for each encodable character depends on one or more of the encodable character or on the document to be encoded, and if the number of variants depends on the document, the number of variants is deduced during decoding by explicit information integrated into the document or by implicit information included in the document.

31. The document watermarking method of claim 1, wherein for each encodable character, the second OCR process distinguishes between the variants and the original graphic by comparison of a number N of identified characteristics of the respective encodable character, and wherein a certain number of elementary modifications are defined, the elementary modifications influencing the values of the number N of identified characteristics.

32. The document watermarking method of claim 1, wherein the at least one text portion comprises an encoded unitary message which integrates a message body that is a usable portion of the message and structural portions for identifying the message during decoding, validation of the decoded message body in during decoding, or a mode of decoding the message body.

33. The document watermarking method of claim 1, wherein the at least one text portion is encoded as a plurality of sub-sequences, and wherein a redundancy applied to each sub-sequence is correlated to the importance of the information conveyed and to an encoding capacity of the document.

34. The document watermarking method of claim 1, wherein each variant comprises one or more of:
gray level variations in order to increase encoding potentiality of each encodable character, and
gray level variations over white zones associated with each respective variant, wherein the white zones are definable by a position relative to the respective variant.

35. The document watermarking method of claim 1, wherein the document to be encoded includes a plurality of fonts, said fonts differing by respective characteristics, including at least one of as point size and style, the respective differing characteristics being used to create the encoding.

36. The document watermarking method of claim 1, wherein a number of variants for each encodable character is variable and defined as a function of the respective encodable character.

37. The document watermarking method of claim 1, wherein a number of variants for each encodable character is variable and depends on a point size of the font.

38. The document watermarking method of claim 1, wherein the second OCR process uses a classification strategy for the analysis of the characters.

* * * * *